United States Patent [19]

Fadem et al.

[11] Patent Number: 4,744,077
[45] Date of Patent: May 10, 1988

[54] LINK FLOW CONTROL IN TIME SLOT PROTOCOL DATA TRANSMISSION OF A DATA PROCESSING NETWORK

[75] Inventors: Richard J. Fadem, Roslyn Heights; David C. Speyer, Northport, both of N.Y.

[73] Assignee: NCR Corporation, Dayton, Ohio

[21] Appl. No.: 938,691

[22] Filed: Dec. 5, 1986

[51] Int. Cl.$^4$ .............................................. H04J 3/02
[52] U.S. Cl. .................................... 370/85; 370/96
[58] Field of Search ..................... 370/85, 94, 96, 86, 370/90; 340/825.5, 825.51, 825.06, 825.15

[56] References Cited

U.S. PATENT DOCUMENTS

| | | | |
|---|---|---|---|
| 4,475,192 | 10/1984 | Fernow | 370/94 |
| 4,499,576 | 2/1985 | Fraser | 370/94 |
| 4,597,074 | 6/1986 | Demichelis et al. | 370/85 |
| 4,607,363 | 8/1986 | Platel et al. | 370/94 |

Primary Examiner—Douglas W. Olms
Attorney, Agent, or Firm—Wilbert Hawk, Jr.; Edward Dugas; Floyd A. Gonzalez

[57] ABSTRACT

In a data processing network using time slot protocol to transmit characters from a host computer to a plurality of users and to transmit a keystroke from a specified user back to the host computer, a terminal device for generating a first link flow control command in a designated time slot for stopping the transmission of characters which are being transmitted from the host computer to the terminal device at a rate faster than the rate at which they are first being outputted by the terminal device. The terminal device generates the link flow control command responsive to storing a first set number of characters received from the host computer. The terminal device further generates a second link flow control command for restarting the transmission to it of characters after it has outputted sufficient characters such that a number of characters less than or equal to a second set number is stored.

8 Claims, 44 Drawing Sheets

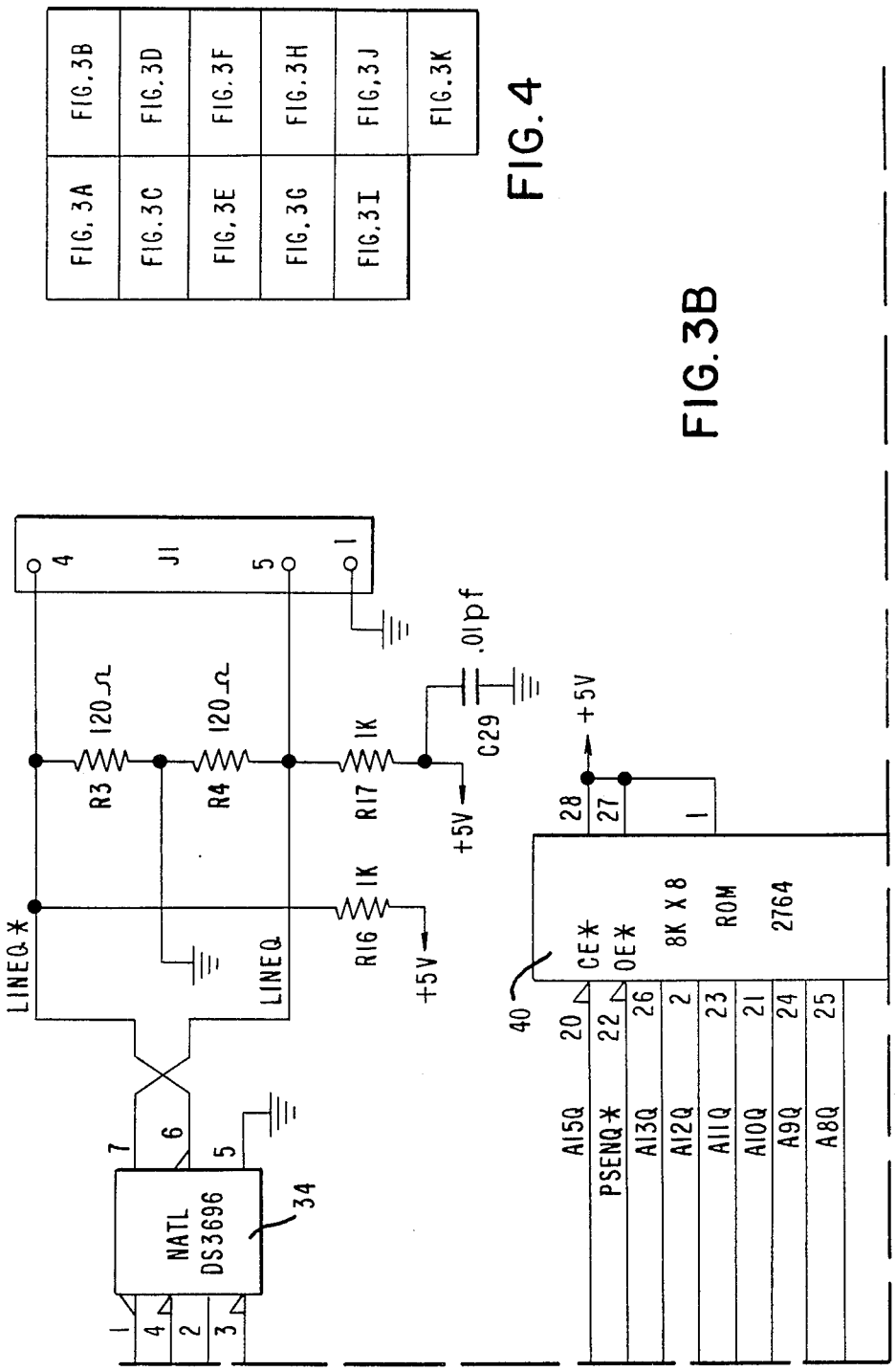

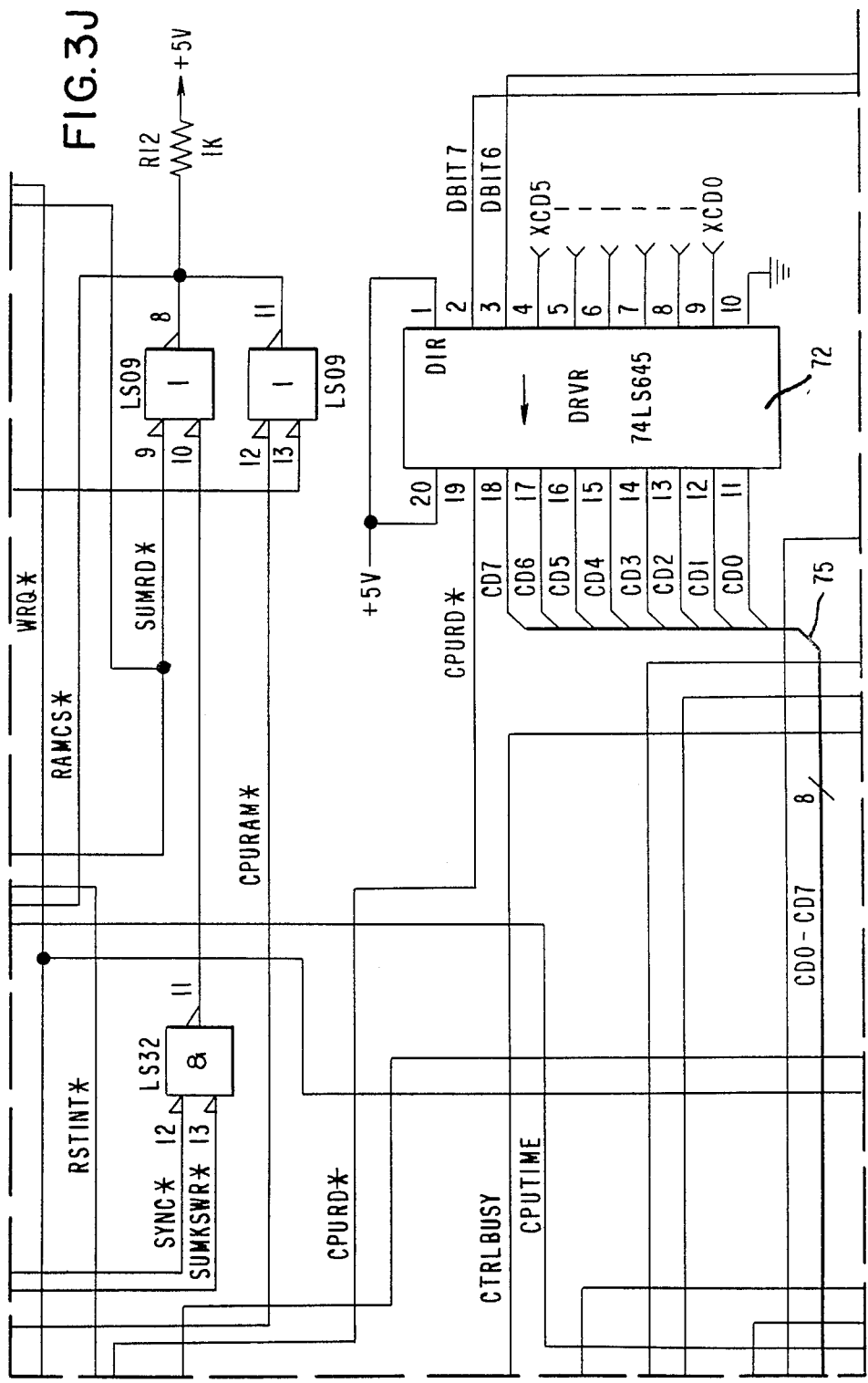

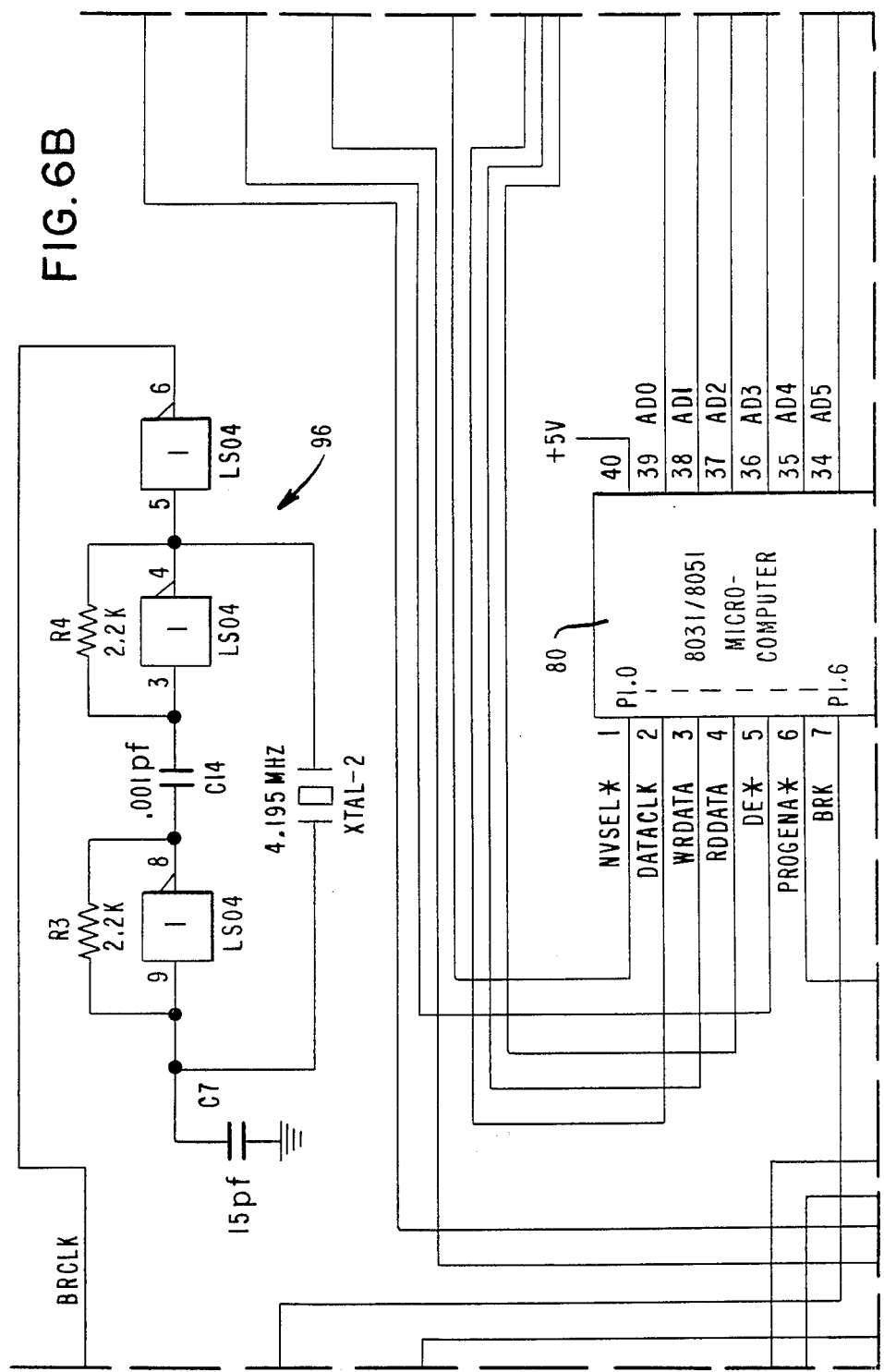

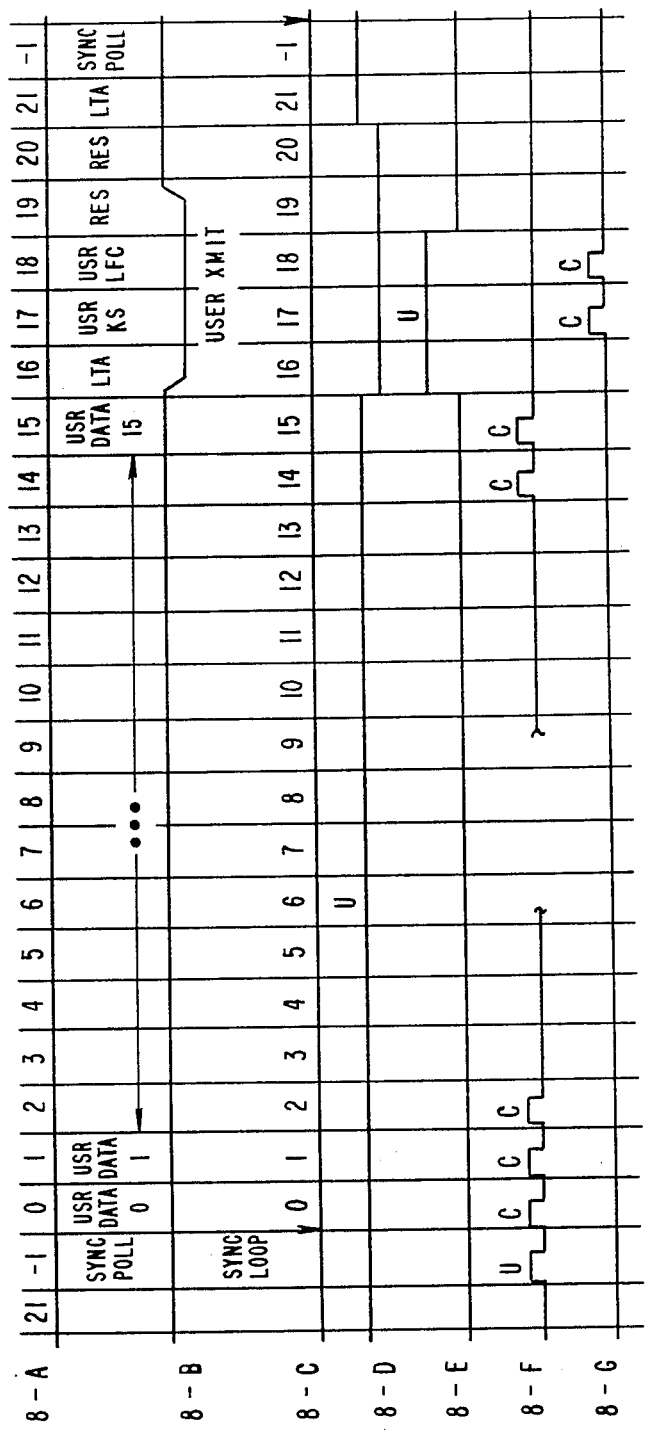

TRANSMIT RAM MAP

ADDRESS
32
CONTIGUOUS
LOCATIONS

|      | P    | 7 | 6 | 5 | 4 | 3 | 2 | 1 | 0 |
|------|------|---|---|---|---|---|---|---|---|
| 10-A | EVEN | 1 | 0 | 0 | 0 | USER ID | | | |
| 10-B | ODD  | 8 BIT BINARY | | | | | | | |
| 10-C | ODD  | 8 BIT BINARY | | | | | | | |
| 10-D | ODD  | 0 | 1 | 0 | 1 | 0 | 1 | 0 | 1 |
| 10-E | ODD  | 1 | 0 | 1 | 0 | 1 | 0 | 1 | 0 |
| 10-F | ODD  | 0 | 1 | 1 | 0 | 0 | 1 | 1 | 0 |

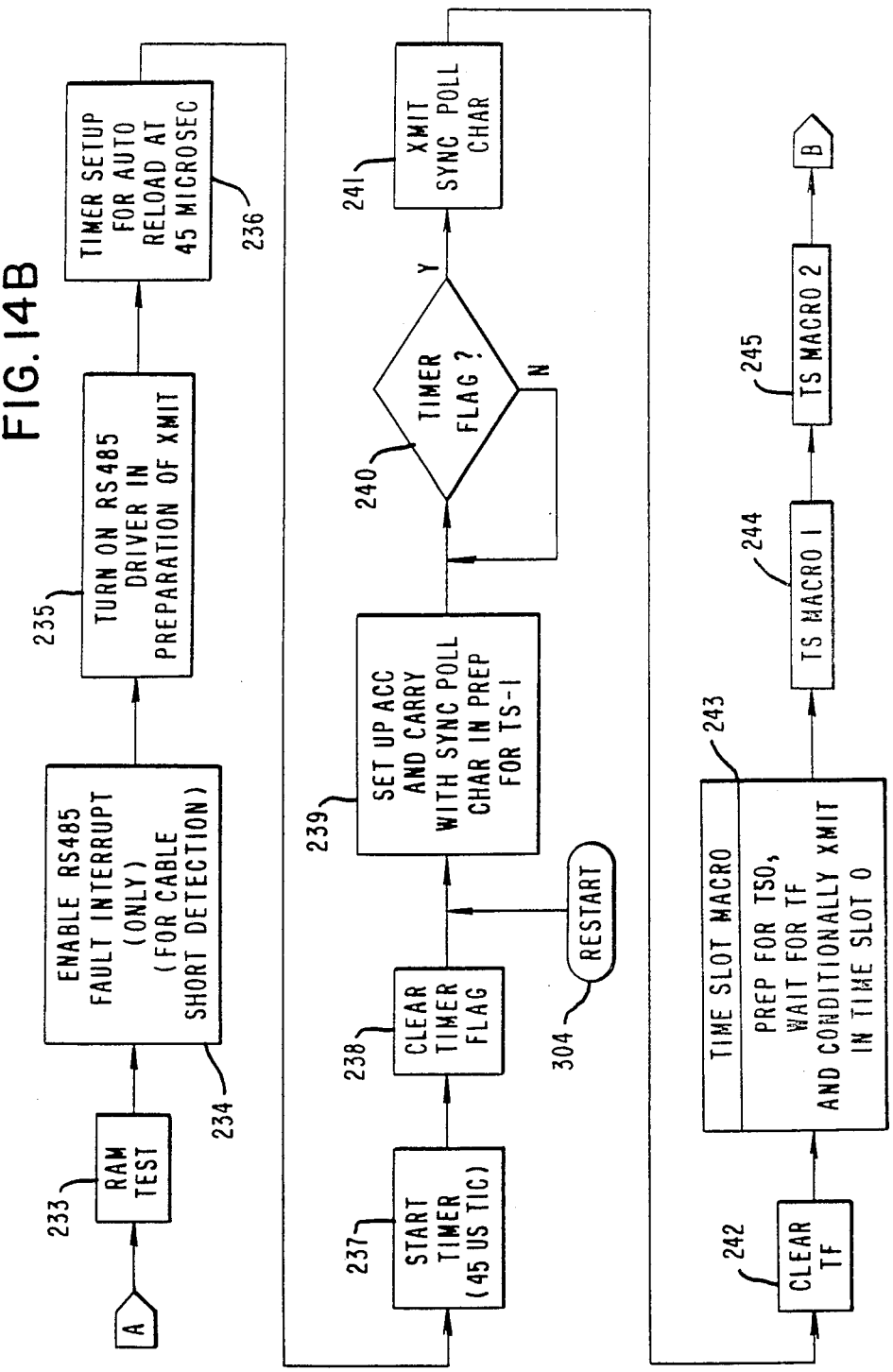

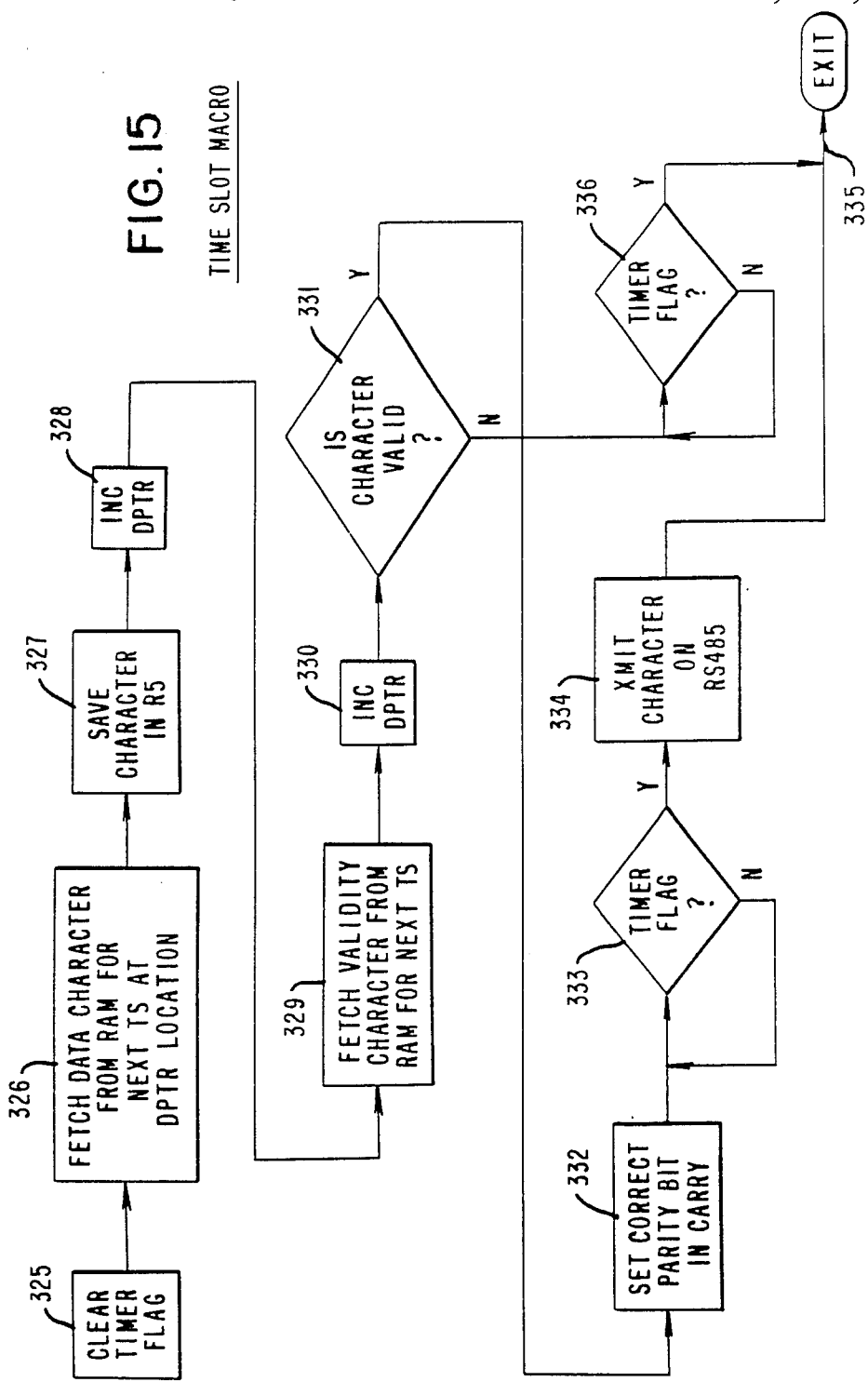

FIG. 17E
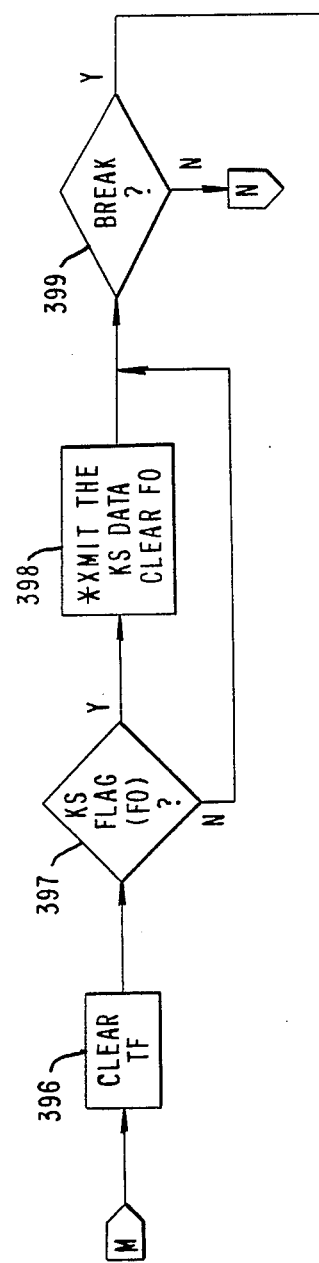
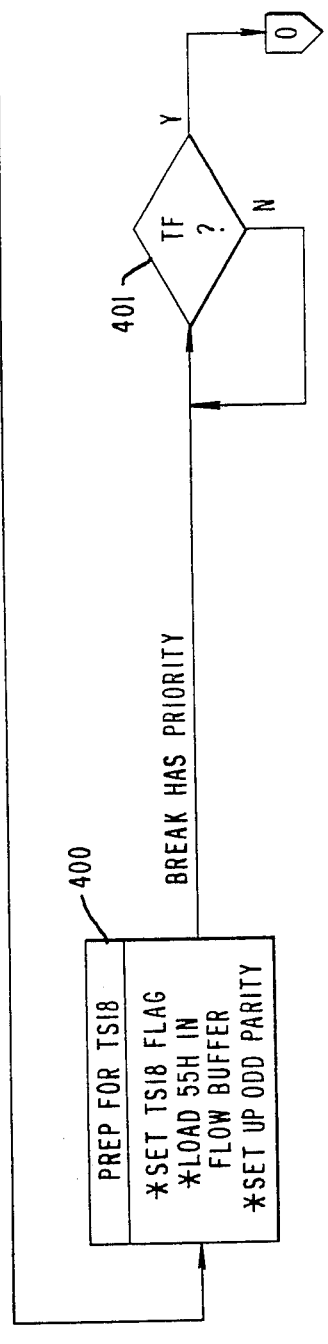

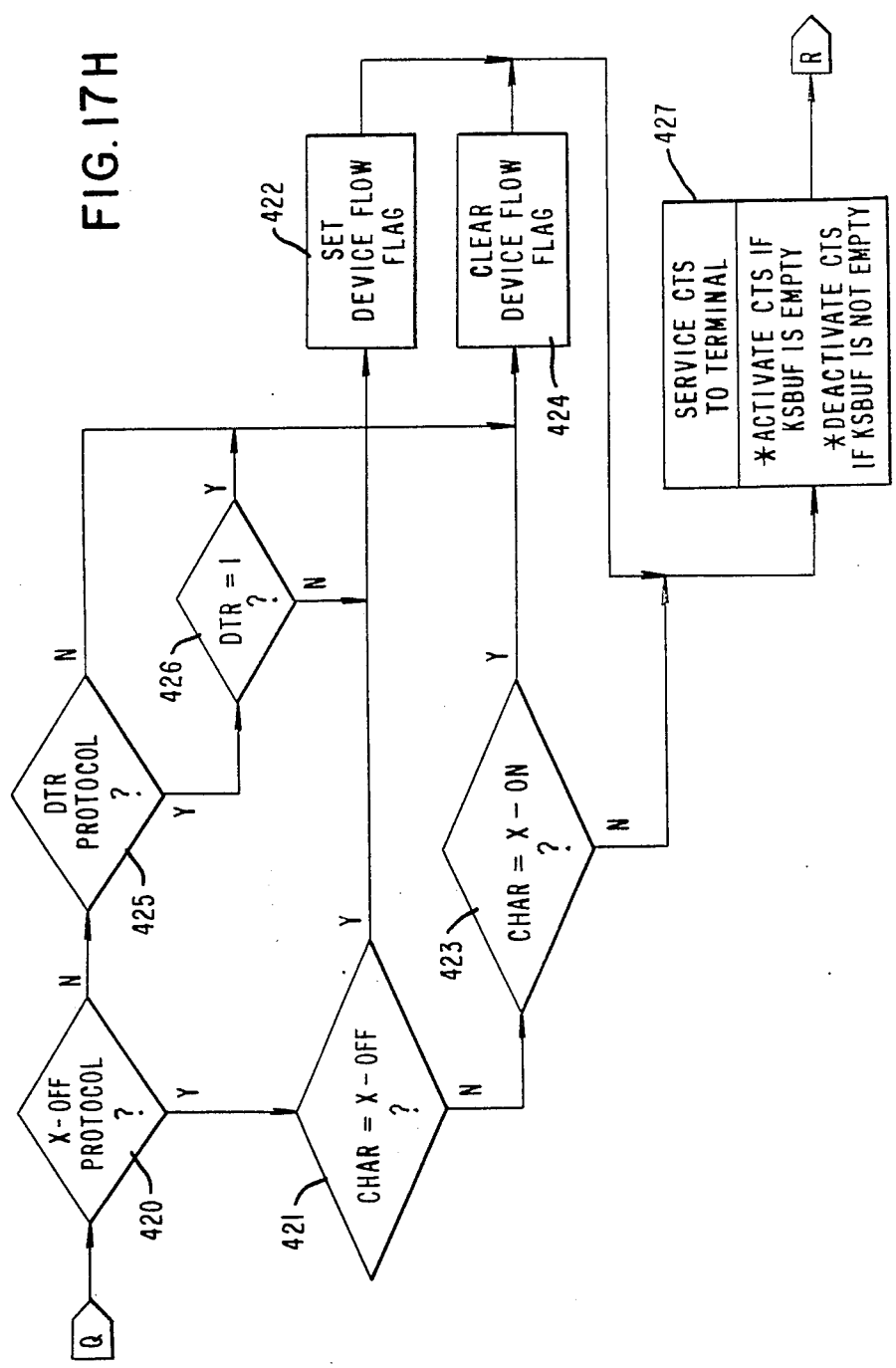

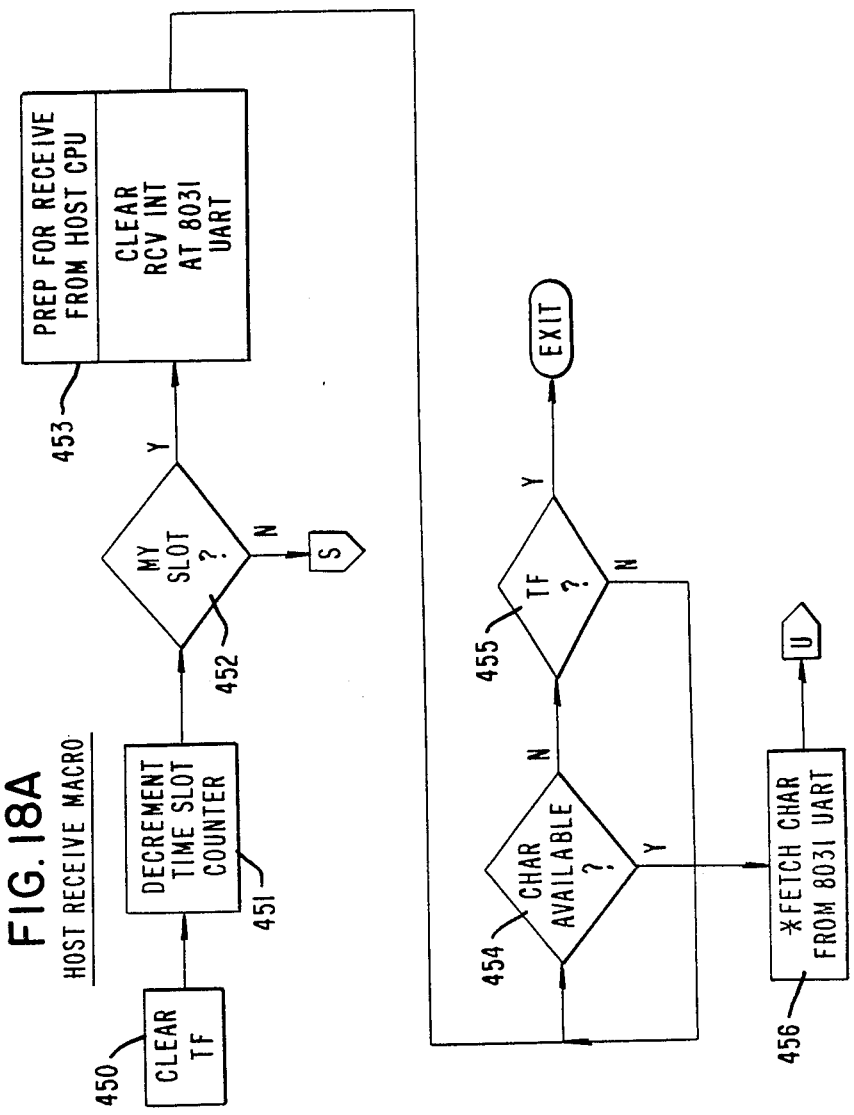

LINK FLOW CONTROL IN TIME SLOT PROTOCOL DATA TRANSMISSION OF A DATA PROCESSING NETWORK

BACKGROUND OF THE INVENTION

The present invention is related to the transmission of data between a host computer and users in a data processing system, and is more particularly related to providing link flow control of the transmission line in time slot protocol data transmissions.

Various protocol arrangements have been established for the communication of data between a host computer and a community of users in a data processing system network. One such arrangement is a time positioned or time slot protocol in which each user is assigned a time slot in a frame of data in which to send or receive data in the frame.

U.S. Pat. No. 3,784,752, to Peron, issued Jan. 8, 1974 for "Time Division Data Transmission System", discloses a telephonic data transmission system for transmission of data through a chain of cascaded, asynchronous, time-division switching networks in which a number of time slots employed for the transmission of data is variable, and is subject to the flow of information to be transmitted.

U.S. Pat. No. 3,787,631, to Lewis, issued Jan. 22, 1974 for "Time Slot Number Compensating Arrangement", discloses a telephonic data transmission system having a plurality of port circuits, with each port circuit having an individual shift register for defining the time interval during which a connection may take place. A circulating bit is used to assign a port circuit to a specific-time slot.

U.S. Pat. No. 4,161,629, to Kits van Heyningen, issued July 17, 1979 for "Communication System With Selectable Data Storage", discloses a communication system wherein a predetermined number of time slots is provided for each of sequentially occurring scans of the sending stations, with each slot providing for the transmission of a preset number of data samples. Switching circuitry and registers are employed for enabling the available time slots to be assigned to stations in accordance with the average data rate of a message.

U.S. Pat. No. 4,229,792, to Jensen et al., issued Oct. 21, 1980 for "Bus Allocation Synchronization System", discloses a bus allocation system for controlling a time division multiplexed digital data bus used by a plurality of signal sources in which no single signal source controls the bus. Each signal source has an address counter which operates in conjunction with an allocation vector. Each address counter is synchronized during or following the receipt of a message to prevent interference by more than one device using the bus at a given time.

U.S. Pat. No. 4,236,203, to Curley et al., issued Nov. 25, 1980 for "System Providing Multiple Fetch Bus Cycle Operation", discloses a data communications system wherein information may be transferred by the requesting unit having the highest priority during an asynchronously generated bus transfer cycle. Logic is provided for enabling a master unit to request information from a slave unit during a first bus transfer cycle, wherein the information from the slave unit is transferred from the slave unit during a series of later slave generated bus cycles.

U.S. Pat. No. 4,241,444, to Kister, issued Dec. 23, 1980 for "Arrangement for Time-Division Multiplex PWM Data Transmission", discloses a time-division multiplex data transmission system in which each subscriber on the system has a programmable counter which can be reset synchronously with the programmable counters of the other subscribers for determining the end of a time frame.

U.S. Pat. No. 4,340,961, to Copel et al., issued July 20, 1982 for "Distributed Multi-Port Communications System", discloses a distributed multi-port communications system wherein terminals may communicate with one another during sequential poll cycles to fulfill low data rate requirements, or during a burst cycle to fulfill high data rate requirements. Each poll cycle includes a number of time slots with at least one time slot assigned to each terminal. Each terminal may either transmit data to any other terminal or request a burst cycle during its time slot.

U.S. Pat. No. 4,535,446, to Mountain, issued Aug. 13, 1985 for "Digital Transmission Systems", discloses an aligner which can operate as a time switch to avoid clashes between reading and writing to a store by allowing slippage of one frame.

SUMMARY OF THE INVENTION

In a specific embodiment, a communication network is disclosed having a host computer and a plurality of users, wherein characters of data are sent from the host computer to the users in designated time slots in a time frame and a keystroke is sent from a designated one of the users to the host computer in a designated time slot in the time frame. The communications network includes a data bus connected between the host computer and the users, the data bus transmitting data between the host computer and the users. A host receive queue is provided in at least one of the users connected to the data bus for receiving and storing characters of data sent from the host computer in a succession of time frames. A first threshold sensor is responsive to the characters of data in the host receive queue and generates a first link flow control command responsive to the storage of a set number of characters of data in the host receive queue. A link flow control transmitting device is connected to the data bus and transmits the first link flow control command over the data bus to the host computer in a designated time slot of a designated time frame. A storage device connected to the data bus in the host computer stores the first link flow control command such that it may be detected by the host computer, and the sending of characters of data to the host receiver queue may be stopped responsive thereto.

It is an object of the present invention to provide link flow control commands in a specific time slot in a time frame of a data processing network wherein characters are sent to a plurality of users from a host computer and a keystroke is sent from a specific user back to the host computer.

It is also an object of the present invention to provide in a data processing network using time slot protocol, a terminal device which may generate a link flow control command stopping the transmission of data characters which are being transmitted from a host computer to the terminal device at a rate faster than the rate at which they are being outputted by the terminal device.

It is a further object of the present invention to provide a terminal device which may restart the transmission of data characters from a host computer to a specified user over a network using time slot protocol.

These and other objects of the present invention will become apparent from the description of the preferred embodiment and the drawings herein.

BRIEF DESCRIPTION OF THE DRAWINGS

FIGS. 3A-3K, arranged as shown in the map of FIG. 4, form a schematic diagram of the communication controller of FIGS. 2A-2B;

FIGS. 6A-6F, arranged as shown in the map of FIG. 7, form a schematic diagram of the terminal element circuit of FIG. 5;

FIG. 8 is a timing diagram for the network of FIG. 1;

FIGS. 14A-14F form a flow chart of the program of FIG. 13;

FIG. 15 form a flow chart of a time slot macro of the program of FIG. 13;

FIGS. 17A-17I form a flow chart of the program of FIG. 16; and

FIGS. 18A-18B form a flow chart of a host receive macro of the program of FIG. 16.

DESCRIPTION OF THE PREFERRED EMBODIMENT

A previous, co-owned application was filed Aug. 5, 1986 by Richard J. Fadem for "Time Slot Protocol In The Transmission of Data In A Data Processing Network" U.S. Ser. No. 893,510, and discloses a similar communications network.

Figure 1:
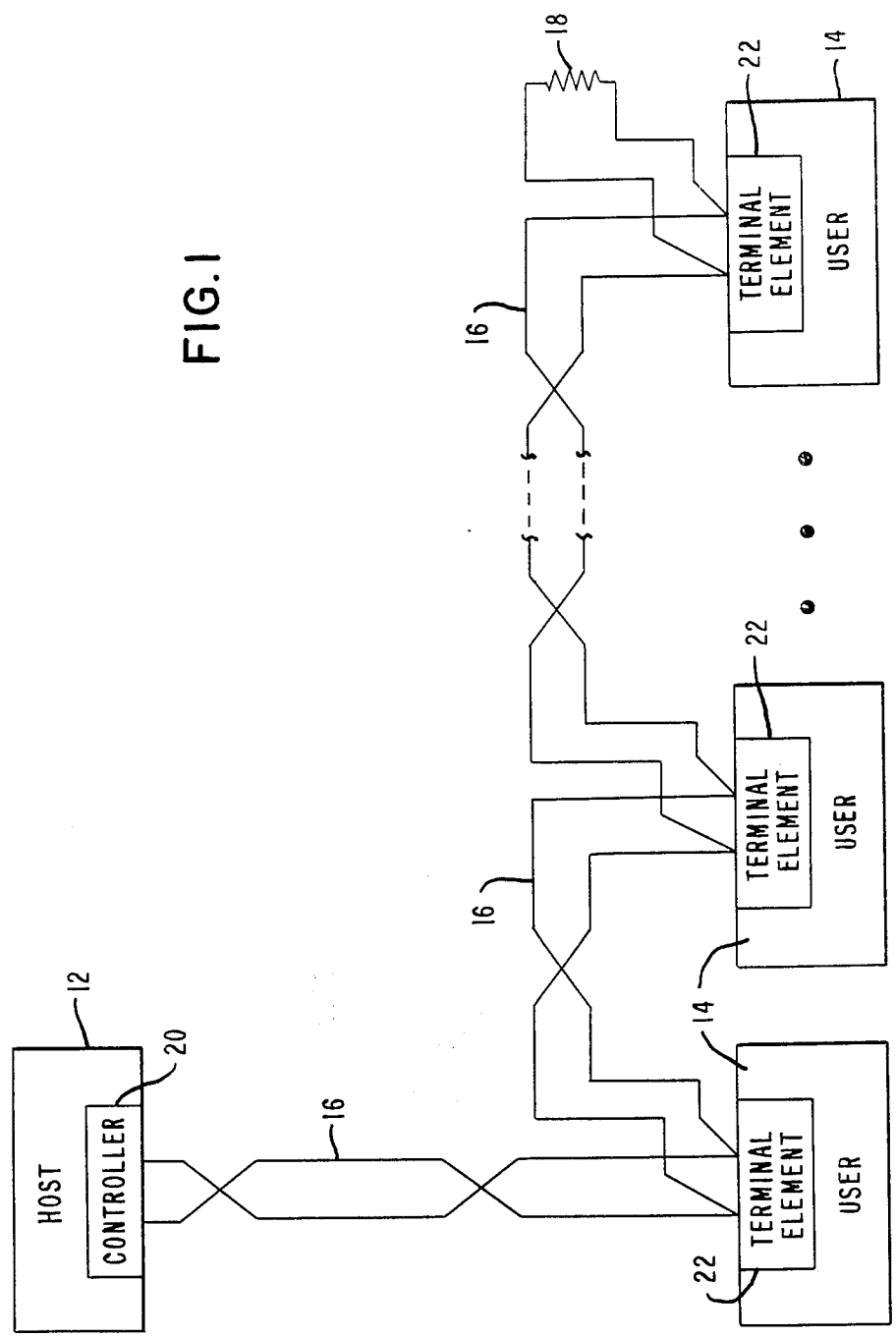
FIG. 1 is a diagrammatic representation of a communications network utilizing the present invention.

Referring to FIG. 1, a diagrammatic representation of a communications network utilizing the present invention is shown. The network includes a host computer 12, and a plurality of users 14. The maximum number of users 14 of the present example is sixteen, however the number of users may be increased if clock rates are increased for the data and for the microcomputer.

The host computer 12 communicates with the users 14 over a 120 ohm characteristic impedance twisted pair shielded cable 16 which is daisy chained between the users 14. A 120 ohm line termination resistor 18 is provided at the last user, as is known. The maximum length for the cable 16 is about four thousand feet. The host computer 12 has a controller 20 connected to its back plane (not shown) for providing communication between the host 12 and the community of users 14. Each user 14 includes a terminal element 22 for providing communications between itself and the host computer 12. In the present configuration, it is contemplated that each user 14 will communicate only with the host 12, but since each user 14 receives all of the communications sent over the cable 16, commands from the host 12 could be established telling a first user 14 that all messages from a designated second user 14 are to be received by the first user. In this way, communication between users can be established.

A host computer 12 may be an IBM PC, an IBM PC AT personal computer, an NCR PC 8 personal computer, or any computer device capable of providing data for transmission to the controller and capable of receiving user data from the controller. The users 14 may be one of the VP+E, VP60+, or 3220 data terminals available from ADDS, Hauppauge, New York, or a 7930 data terminal available from the NCR Corporation, Dayton, Ohio. A user 14 may also be a low data rate device, such as a serial printer or a modem. In a low data rate device, data flow control discipline between the host computer 12 and the low data rate device of user 14 is needed to avoid loss of data due to the rate of the host computer 12 being higher than can be received. The terminal element 22 of each user 14, may also be an external unit which communicates with the terminal via a standard 25 pin EIA connector or may be located internal to the terminal of the user 14. For an external configuration, the terminal can be any standard ASCII terminal.

Figure 2A:
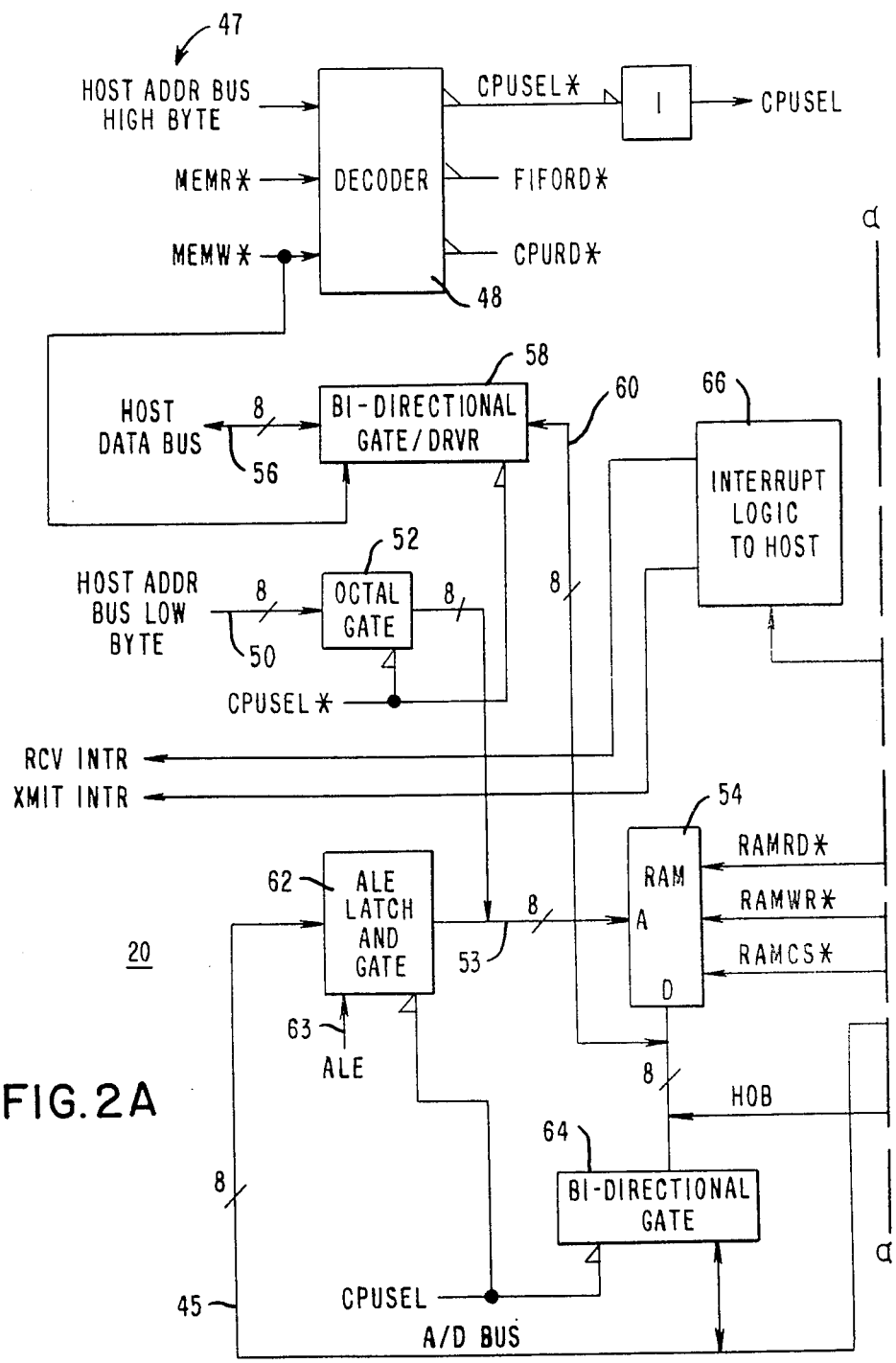
FIGS. 2A and 2B, connected along line a—a, form a functional block diagram of a communication controller of the network of FIG. 1.
Figure 2B:
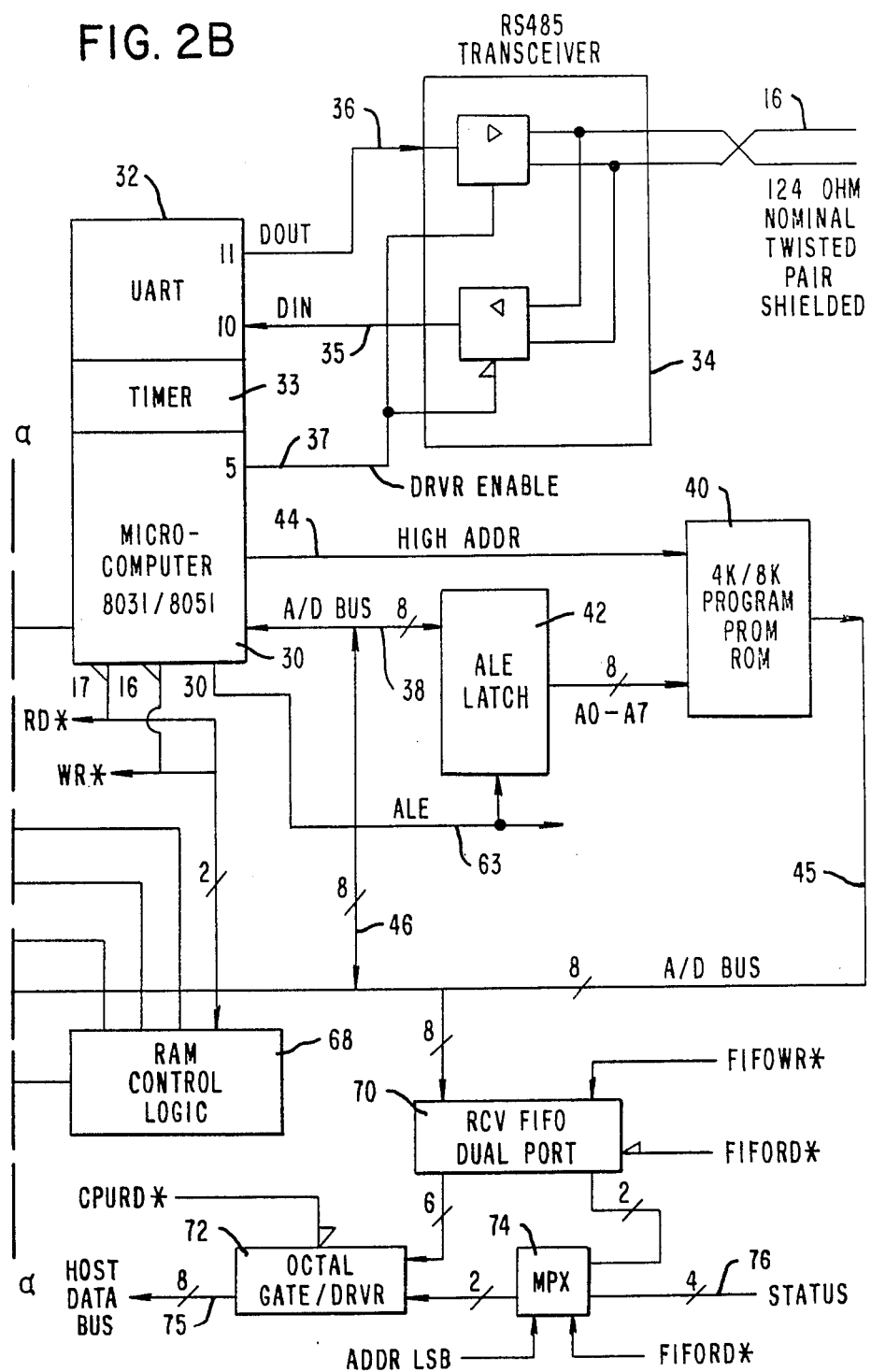

FIGS. 2A and 2B, connected along line a—a, form a functional block diagram of the communications controller 20 of FIG. 1. The controller 20 includes an 8031 microcomputer 30, available from Intel Corporation, and is fully explained in the publication "An Introduction to the Intel ® MCS-51 ™ Single-Chip Microcomputer Family" by John Wharton, Intel Corporation, 1980.

The microcomputer 30 includes an internal universal asynchronous receiver-transmitter (UART) 32 for reading serial data from the twisted pair cable 16 via an RS485 transceiver 34 over a DIN conductor 35, or writing data to the twisted pair cable 16 via the RS485 transceiver 34 via a DOUT conductor 36. The microcomputer 30 also includes a timer 33 which is programmed to act as a master timer for formatting the transmission of data between the controller 20 and the users 14, as will be explained. The transceiver 34 may be a NATL DS 3696 device. The direction of the data transmitted between the UART 32 and the cable 16 is controlled by the DRVR ENABLE signal on conductor 37 from pin 5 of the microcomputer 30.

The microcomputer 30 is connected to an eight bit address/data (A/D) bus 38 over which the low order byte of an address is transmitted, and over which data may either be read to or written from the microcomputer 30. A programmable PROM or ROM (referred to herein as a ROM) 40 is provided to store programming for the microcomputer 30, as will be explained. An address latch enable latch 42 is provided to latch the low byte from the A/D bus 38, and is controlled by the address latch enable (ALE) signal on conductor 63 from pin 30 of the microcomputer 30. The high byte of the ROM address is transmitted from the microcomputer 30 to the ROM 40 over a high address bus 44. As is known, when an instruction is to be fetched from the ROM 40, it's low byte address is placed on the A/D bus 38, and it's high byte address is placed on the high address bus 44. The ALE signal latches the low address byte in latch 42. Fetch instruction data is then outputted by the ROM 40 on the A/D bus 45, which places the instruction data on the A/D bus 38 via bus extension 46. If the programming is kept to less than four thousand bytes, an 8051 microcomputer may be used which has a four thousand byte program memory onboard the microcomputer chip. In that case, the ROM 40 and latch 42 may be eliminated.

As will be explained, character data may be sent from the host computer 12 to each user 14, and keystroke data may be sent from each user 14 to the host computer 12. The controller 20 has two separate data paths, a transmit path for transmitting characters from the host computer 12 to the users 14, and a receive path for receiving keystrokes from the users 14 to the host computer 12. Link flow control (LFC) characters may also be sent from a user 14 to the host computer 12 over the receive path, as will be explained.

The transmit path includes a connection (not shown) to the host address bus in the back plane of the host computer 12. This connection includes a host address high byte bus 47 over which control instructions and the memory read (MEMR*) and memory write (MEMW*) signals from the host computer 12 are sent to a decoder circuit 48, and an eight bit host address low byte bus 50 over which addresses are sent via an octal gate 52 and an address bus 53 to the address terminals of a random access memory device (RAM) 54. An alternate configuration (not shown) for latch element 62 and RAM element 54 is the use of a dual ported FIFO which frees the host computer of the requirement to output data for transmitting only during a relatively narrow time interval provided by the 8031 microcomputer 30 for this function. An eight bit host data bus 56 is connected to the host data bus (not shown) in the back plane of a host computer 12, and is further connected to a bi-directional gate/driver device 58. An eight bit bus 60 is connected between the bi-directional gate/driver 58 and the data terminals of the RAM 54. An ALE latch and gate device 62 has its inputs connected to the A/D bus 45, and its outputs connected to the address bus 53. The latch portion of the device 62 is controlled by the ALE signal on conductor 63 from pin 30 of the microcomputer 30, and the gate portion of the device 62 is controlled by the CPU select (CPUSEL) signal, to be discussed. Also controlled by the CPUSEL signal, is a bi-directional gate 64 for passing data between the data terminals of the RAM 54 and the A/D bus 45.

To transmit characters from the host computer 12 to the users 14, the host computer 12 passes the data on host data bus 56 to RAM 54 via gate 58 and bus 60 at the address reserved for the desired user to the RAM 54 via bus 50, gate 52, and the bus 53. The microcomputer 30 then sequentially reads characters stored in the RAM 54 by means of the ALE latch and gate device 62 and gate 64, and outputs each character read from the RAM 54 in a time positioned sequence, to be discussed, on the twisted pair cable 16 via conductor 36 and RS 485 transceiver 34. After the microcomputer 30 has sent the characters in the RAM 54 to the users 14 in the time sequence to be described, a transmit interrupt (XMIT INTR) signal is unconditionally enabled by an interrupt logic circuit 66. The XMIT INTR signal starts the CPU TIME signal, during which time, access to the RAM 54 is given to the host computer 12 for storing characters to be sent to the users 14.

A RAM control logic circuit 68 is provided to check the validity of each character read from the RAM 54 before it is transmitted by the microcomputer 30 to the users 14. If the high order bit (HOB) of a flag character (to be explained) has been cleared, the associated character is not transmitted. After a character has been fetched from the RAM 54 by the microcomputer 30, the high order bit of its flag character is cleared by the RAM control logic 68, and the cleared high order bit is read back into the RAM 54, such that that associated character will not be again transmitted by the microcomputer 30. Thus, a new character must be written at that location in the RAM 54 by the host computer 12 in order for the new character to be transmitted by the microcomputer 30 to the users 14.

The receive path for keystrokes from the users 14 to the host computer 12 includes the twisted pair cable 16, the RS485 transceiver 34 and the DIN conductor 35. The keystroke data and an identification (ID) of the user sending the keystroke is outputted by the microcomputer 30 over the A/D buses 38 and 46 to a dual ported receive first-in-first-out (RCV FIFO) device 70. The RCV FIFO 70 is loaded when the WR* signal of the microcomputer 30 is active. When data is sent to the RCV FIFO 70, the microcomputer 30 instructs the interrupt logic 66 to enable the receive interrupt (RCV INTR) signal to tell the host computer 12 that data has been stored in the RCV-FIFO 70. When the host computer 12 is ready to read the RCV FIFO 70, an appropriate command is sent to the decoder 48. In response to this command, the FIFORD* and CPURD* signals are made active. The FIFORD* signal unloads keystroke data from the RCV FIFO 70 to an octal gate/driver 72 via a multiplexer 74, also controlled by the FIFORD* signal. The gate/driver device 72 controlled by the CPURD* signal, gates the keystroke data onto a host data bus 75, which is connected to the host data bus (not shown) in the back plane of the host computer 12. In addition to keystroke data, a user may transmit LFC characters, as needed, to stop or start the transmission of data to the user. A link flow control character is detected by the controller and stored in the RCV FIFO 70 in a special format where it may be read and acted on by the host computer 12.

If status bits are to be read by the host computer 12, an appropriate command is sent to the decoder 48. In response to this command, only the CPURD* signal is made active. In this case, status bits on bus 76 are passed by multiplexer 74 and gated by the gate/driver device 72 onto the host data bus 75. This allows status bits to be passed from the microcomputer 30 to the host computer 12 without first having to be stored in the RCV FIFO 70.

FIGS. 3A-3K, arranged as shown in the map of FIG. 4, form a schematic diagram of the communications controller circuit 20 of FIGS. 2A and 2B. The manufacturer's part number is shown with each symbol of each component of the schematic. Decoder 48 is a programmable array logic device (PAL) programmed in accordance with Table I.

TABLE I

```
CPUSEL  = CA19*CA18*/CA17*/CA16*/CA15*/CA14
CPURAM  = CA19*CA18*/CA17*/CA16*/CA15*/CA14*/MEMR+
          CA19*CA18*/CA17*/CA16*/CA15*/CA14*/MEMW
FIFORD  = CA19*CA18*/CA17*/CA16* CA15*/CA14*/MEMR
CPURD   = CA19*CA18*/CA17*/CA16* CA15*/CA14*/MEMR+
          CA19*CA18*/CA17*/CA16* CA15* CA14*/MEMR
```

FUNCTION TABLE

| CA 19 | CA 18 | CA 17 | CA 16 | CA 15 | CA 14 | MEMR | MEMW | CPU SEL* | CPU RAM* | FIFO RD* | CPU RD* |
|---|---|---|---|---|---|---|---|---|---|---|---|
| L | L | L | L | X | X | X | X | H | H | H | H |
| H | L | L | L | X | X | X | X | H | H | H | H |
| L | H | L | L | L | L | L | L | H | H | H | H |
| H | H | L | L | L | L | H | H | L | H | H | H |
| H | H | L | L | L | L | H | L | L | L | H | H |
| H | H | L | L | L | L | L | H | L | L | H | H |
| H | H | L | L | H | H | X | X | H | H | H | H |
| H | H | L | L | H | L | H | X | H | H | H | H |
| H | H | L | L | H | L | L | X | H | H | L | L |
| H | H | L | L | L | H | L | X | H | H | H | L |

\* = And
/ = Inverse
+ = Or
X = Don't Care

As will be discussed further, the character data for each user 14 occupies two storage locations in the RAM 54, and the keystroke data, or LFC character, and user ID occupies two storage locations in the RCV FIFO 70. To write data into or read data from the RAM 54, the host computer sends addresses from C0000(H) to C001F(H) to the decoder 48. To read data from the RCV FIFO 70, the host computer sends an address of C8000(H) followed by C8001(H) to the decoder 48. To perform a status read, the host computer 12 sends the address C4000(H) to the decoder 48. These addresses are decoded by the decoder 48 to address the correct device at the location specified, as described. It will be understood that one of ordinary skill in the art can assemble a controller 20 in accordance with the diagram of FIGS. 3A-3K.

Figure 5:
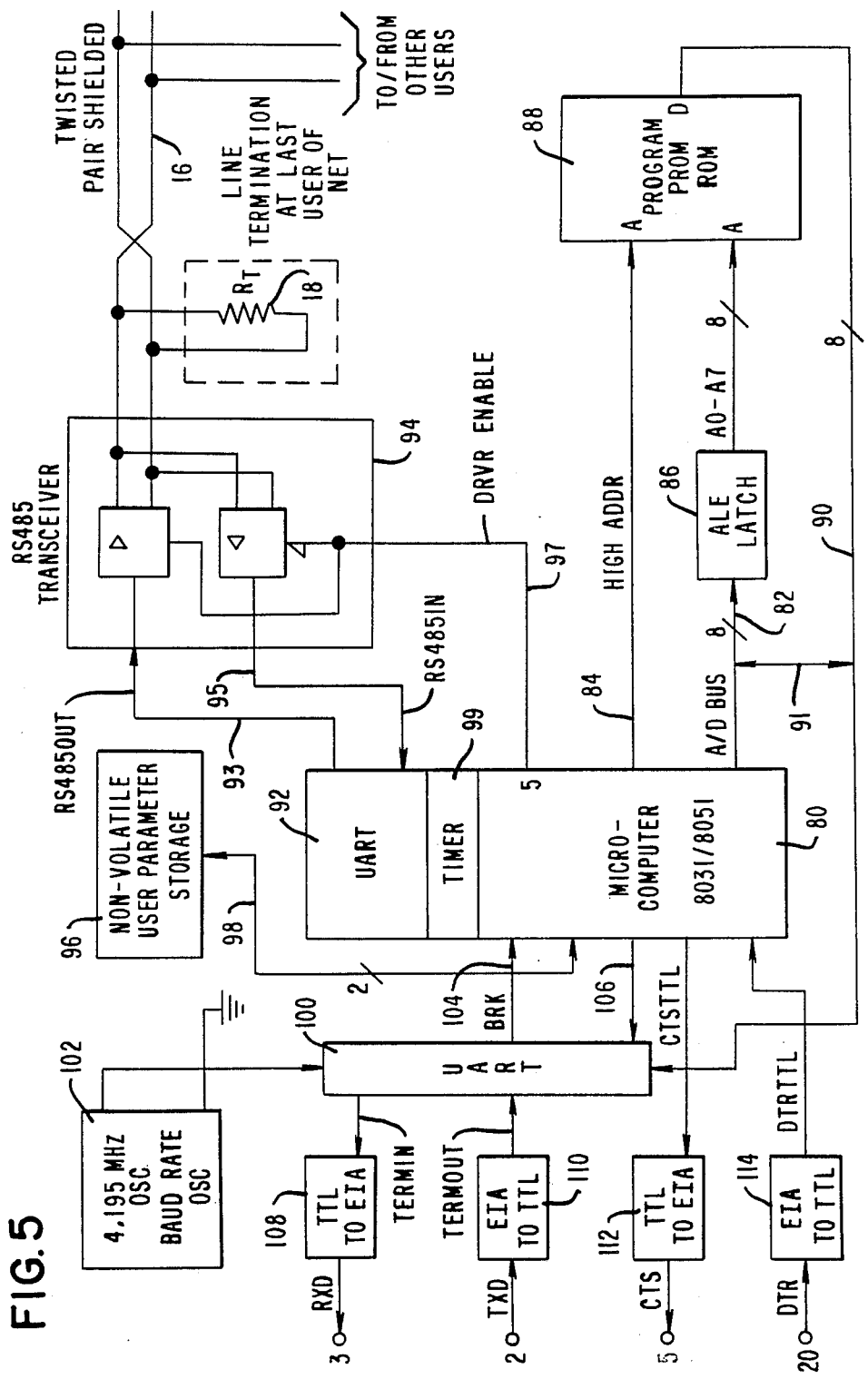
FIG. 5 is a functional block diagram of a terminal element circuit of each of the users in the network of FIG. 1.
Figure 6A:
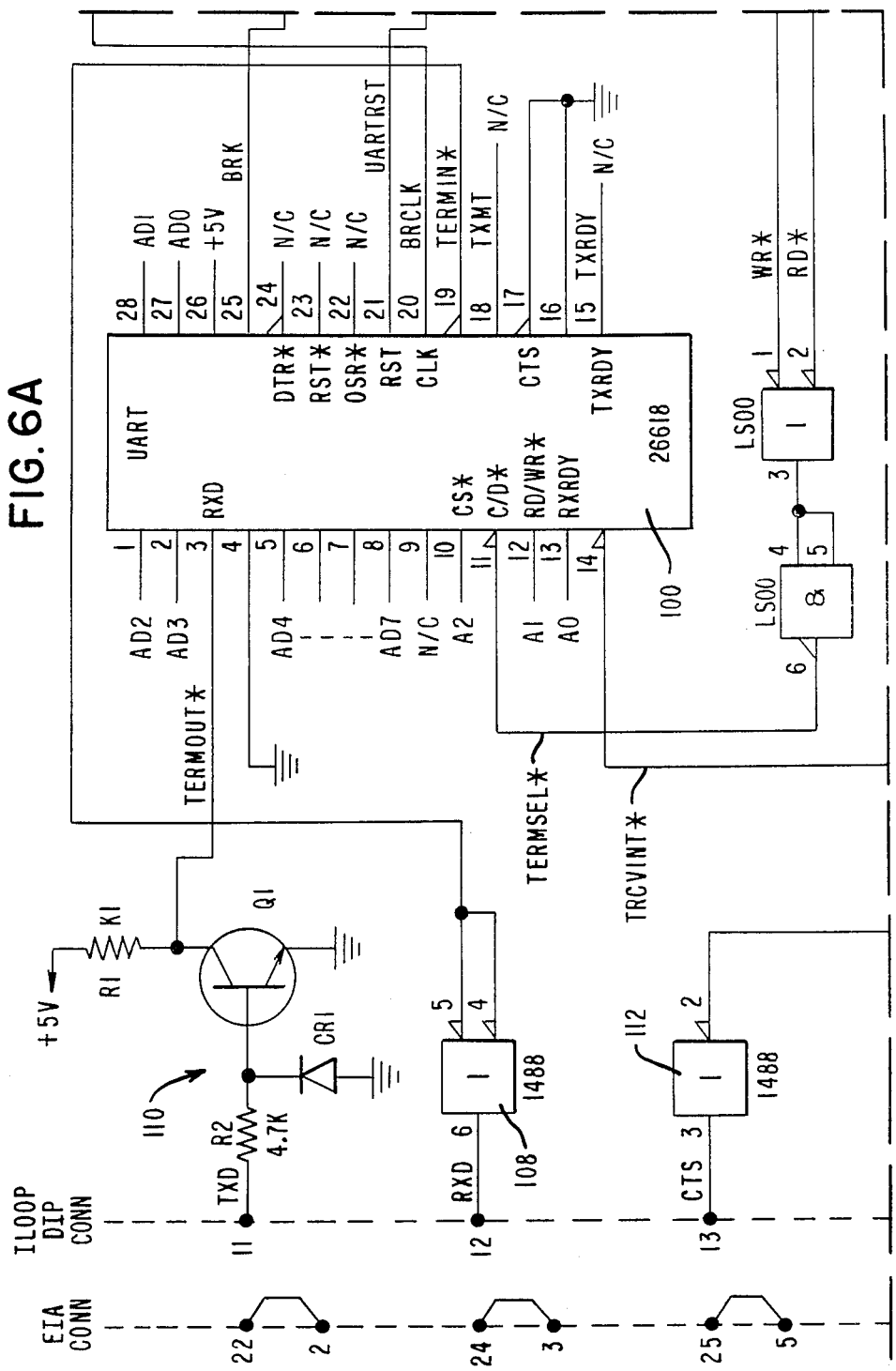
Figure 6C:
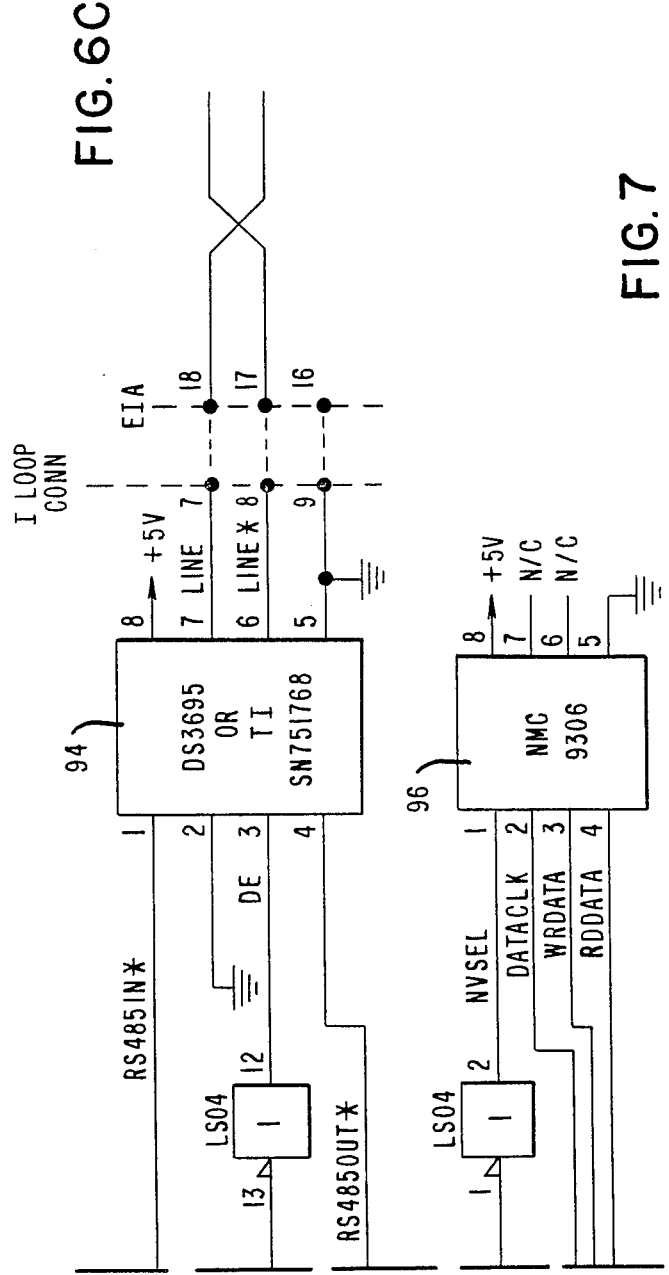

FIG. 5 is a functional block diagram of the terminal element 22 of each user 14. The terminal element 22 includes an 8031 microcomputer 80 connected to an eight bit A/D bus 82, and a high byte address bus 84. The A/D bus 82 is connected to an ALE latch 86, whose output is connected to the low byte address terminals of a PROM or ROM 88 (referred to herein as a ROM). The data terminals of the ROM 88 are connected to an eight bit A/D bus 90 which is connected to the A/D bus 82 by bus extension 91. This provides for storage of a program in the ROM 88, as discussed in connection with the ROM 40 of FIG. 2B. If the program is kept to less than four thousand bytes, the program may be installed on an 8051 microcomputer which may be used in place of the 8031 microcomputer, the latch 86 and the ROM 88.

The built-in UART 92 of the microcomputer 80 outputs serial data to the twisted pair cable 16 via an RS4850UT conductor 93 and an RS485 transceiver 94, and receives serial data from the twisted pair cable 16 via a RS485IN conductor 95 and the RS485 transceiver 94. The direction of the data through the transceiver 94 is controlled by a driver enable (DE) signal on conductor 97 from pin 5 of the microcomputer 80.

The microcomputer 80 also includes a built-in timer 99 which is programmed, as will be explained, such that the operations of all of the terminal elements 22 are synchronized with the master timer 33 of the microcomputer 30 of FIG. 2B.

A non-volatile storage device 96 is provided having a non-volatile memory for storing the identification or ID of the user 14 to which the terminal element 22 of FIG. 5 is assigned. The nonvolatile storage device 96 is connected by a pair of serial data conductors 98 to two ports of the microcomputer 80. In response to prompts, a user may assign a user ID from 0 to F(H) during an initial power-up routine. The user ID in storage 96 is then used by the microcomputer 80 to receive characters from and send keystrokes to the host computer 12.

An external UART 100, timed by a baud rate oscillator 102, is connected to the A/D bus 90 for receiving data from and sending data to the microcomputer 80. Break and control signals between the UART 100 and the microcomputer 80 are transmitted over a break (BRK) conductor 104 and a control conductor 106, respectively. Serial data is sent from the UART 100 to a data terminal (not shown) via a TTL-to-EIA converter 108 to the RXD terminal of an RS232 EIA connector. Serial data is received from the TXD terminal of the RS232 EIA connector via an EIA-to-TTL converter 110.

A Clear To Send (CTS) signal is sent from the microcomputer 80 to the CTS terminal of the RS232 connector via a TTL-to-EIA converter 112, and a Data Terminal Ready (DTR) signal is sent from the DTR terminal of the RS232 connector to the microcomputer 80 via an EIA-to-TTL converter 114. Although connected to the interrupt pins of the microcomputer 80, the CTS and DTR signals do not actually cause an interrupt, but are sampled to determine the condition of the data terminal (not shown) of the user 14 to determine if it is ready to send or receive data.

Figure 7:
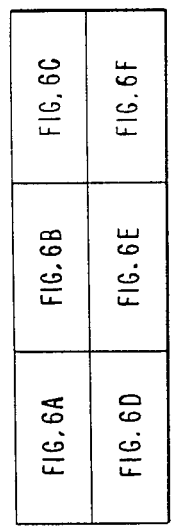

FIGS. 6A-6F, arranged as shown in the map of FIG. 7, form a schematic diagram of the terminal element 22 of FIG. 5 with the manufacturer's part number shown with each component of the schematic diagram. It will be understood that one of ordinary skill in the art can assemble a terminal element 22 in accordance with the diagram of FIGS. 6A-6F.

At this time, the time based transmission of data will be discussed. Referring to FIG. 8, data is transmitted between the host computer 12 and the users 14 of FIG. 1, during time frames each of which is divided into time slots. A designated number of time slots is defined for sending characters to users, one time slot being assigned to each user. Since all of the users receive all of the data transmitted, the user selects the character transmitted to it from it's assigned time slot. Each time frame is started with a sync/poll character from the host computer 12. Each user detects the sync/poll character and, responsive to that character, starts its own timer 99 such that it operates in synchronism with the host computer 12 and all other users 14. Each time frame also includes a time slot reserved for the transmission of a single keystroke and a time slot reserved for the transmission of an LFC character from a user to the host computer 12. The sync/poll character includes a user ID which identifies the user 14 which is permitted to send a keystroke and LFC character to the host computer 12 during the current time frame. Thus, in a network having sixteen users, a complete cycle would include sixteen time frames. Each time frame in the cycle provides for the transmission of one character from the host computer 12 to each of the sixteen users 14, and for the transmission of one keystroke and one LFC character from one designated user to the host computer 12. Thus, in a complete cycle of sixteen time frames, sixteen characters may be sent from the host computer 12 to each user 14, and each user may send one keystroke and one LFC character to the host computer 12.

In a typical case, the network operates with parity in a half duplex protocol at 375 kilobaud, with each data terminal operating in full duplex at 19.2 kilobaud. If the user 14 is a low data rate device, it may operate at, for example, 1200 baud by using the LFC character ability of the present invention. Each time slot has a forty-five microsecond time interval, and a frame has twenty-three time slots, as will be discussed. As discussed, a complete frame cycle has sixteen frames, each frame starting with a sync/poll character comprised of an eight bit character plus parity. The sync/poll character is transmitted by the controller 20 and received by the terminal elements 22 of all of the users 14. The time of arrival of the sync/poll character defines the start of all of the user time bases, and the low nibble (low four bits) of the sync/poll character defines which user is permitted to use the assigned time slots in the current frame for the transmission of keystroke data and an LFC character to the host computer 12.

FIG. 8, 8-A shows the timing frame divided into twenty-three time slots numbered −1 to 21. Each time slot has a duration of forty-five microseconds, and the frame has a total duration of 1035 microseconds. In the present configuration, character reception from the host computer 12 to a user 14 is effectively at 9600 baud, and each user may send about sixty keystrokes per second to the host computer 12. Time slot -1 is reserved for the sync/poll character previously described. Time slots 0 to 15 are reserved for sending user character data from the host computer 12 to the sixteen users (O-F(H)). Time slot 16 is reserved to allow for line turnaround time (LTA) wherein the twisted pair cable 16 of FIG. 1 is changed from transmitting character data in one direction, to transmitting keystroke data in the other direction. Time slot 17 is reserved for the transmission of keystroke data from a polled user 14 to the host computer 12. Time slot 18 is reserved for the transmission of an LFC character from the polled user 14 to the host computer 12. Time slots 19 and 20 are not used and time slot 21 is used for line turn around to change the direction of data transmission back to its original condition.

FIG. 8, 8-B shows the time that a polled user may transmit data to the host computer 12. During time slots 16 and 21, the line turns around, as explained. During time slot 17, the polled user transmits keystroke data to the host computer, and during time slot 18, the user may transmit an LFC character to the host computer 12. Time slots 19 and 20 are reserved and not used in the present invention.

FIG. 8, 8-C shows the user time slots. In time slot −1, the user is in a loop waiting for a sync/poll character. When the terminal element 22 detects a sync/poll character, the timer 99 internal to its 8031 microcomputer (see FIG. 5) is started such that the terminal element's time base matches the timing of the time slots of 8-A. The terminal element 22 also checks the low nibble of the sync/poll character to see if it is authorized to transmit a keystroke during time slot 17 and an LFC character during time slot 18.

FIG. 8, 8-D shows the enabling of the RS485 transceiver 34 of FIG. 2B by the microcomputer 30 of the controller 20. The RS485 transceiver 34 of FIG. 2B is enabled unconditionally from the start of time slot 21 of the previous time frame through the end of time slot 15.

FIG. 8, 8-E shows the enabling of the RS485 transceiver 94 of FIG. 5 by the microcomputer 80 of the terminal element 22. The RS485 transceiver 94 is enabled unconditionally from the start of the time slot 16 to the end of the time slot 18. It will thus be understood that time slots 16 and 21 are provided for the line turn around as previously discussed.

FIG. 8, 8-F shows the transmission of character data by the controller 20 to the terminal elements 22. The sync/poll character is unconditionally transmitted at the beginning of each time frame. Character data is transmitted to specific users during their time slots on a conditional basis only if the controller 22 has a character to send to a user in its designated time slot.

FIG. 8, 8-G shows the transmission of keystroke data and an LFC character by the polled terminal element 22 as designated in the sync/poll character. The polled terminal element 22 conditionally transmits a keystroke in time slot 17 only if it has keystroke data to transmit and an LFC character in time slot 18 only if it has an LFC character to transmit.

Referring to FIG. 8-A, the CPU TIME signal (see FIG. 3C) starts slightly after the beginning of time slot 16, and ends at the end of the time slot 20. This is the time during which the host computer 12 may write character data into the RAM 54 without interfering with character data being read from the RAM 54 by the microcomputer 30 for transmission to the users 14 (see FIG. 4). The XMIT INTR signal from the interrupt logic circuit 66 of FIG. 2 is enabled at the beginning of the CPU TIME signal near the beginning of time slot 16 to signal the host computer 12 that it may start writing data to the RAM 54. The RCV INTR signal from the interrupt logic circuit 66 of FIG. 2A is enabled at about the beginning of time slot 21 when keystroke data or an LFC character is placed in the RCV FIFO 70 of FIG. 2, and remains enabled until all keystroke data is removed from the RCV FIFO 70 by the host computer 12, as previously explained.

Figures 9, 10:
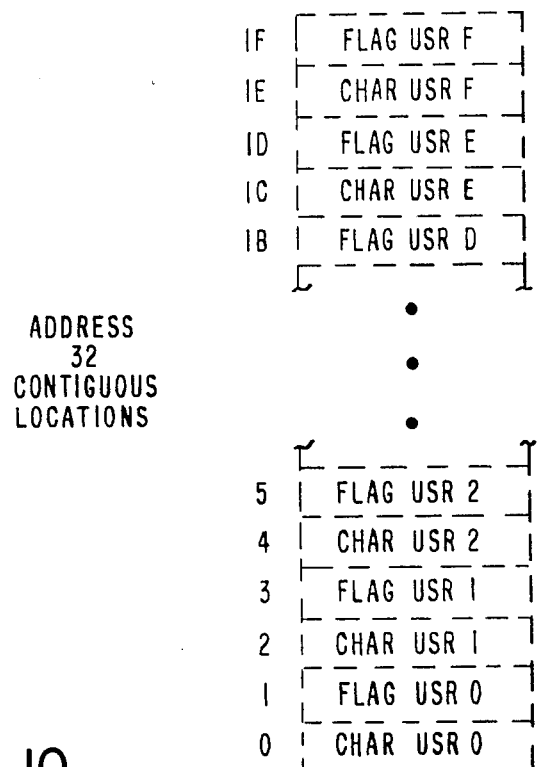
FIG. 9 is a memory map of character data stored in a RAM of FIG. 2.
FIG. 10 shows the formats of data sent between a host computer and the users of the network of FIG. 1.

FIG. 9 is a memory map of the character data stored in the RAM 54 of FIG. 2A by the host computer 12 of FIG. 1. The character data is stored in thirty-two contiguous locations in the RAM 54, with two eight bit bytes for each character. The high order byte contains a flag character having eight bits, with the high order bit reserved as a validity bit. The low order byte is used to store the character either in a seven bit ASCII format or in an eight bit format. Since in a seven bit ASCII format the eighth bit is always zero, the eighth bit of an ASCII character received by a terminal element 22 serves as an additional verification that the received character is valid.

The high order bit of the high order byte contains a flag to indicate to the microcomputer 30 of FIG. 2B, whether the character data in the RAM 54 has been transmitted. When the character data is written into the RAM 54 by the host computer 12, the high order flag bit is set as a one. When the character data in the RAM 54 is transmitted over the cable 16 by the microcomputer 30, the high order bit is cleared to a zero. Thus, by checking the high order flag bit of the flag character data in RAM 54, the microcomputer 30 can determine whether or not the associated character data has been transmitted. Thus, the character data for a specific user is transmitted in its assigned time slot only if its associated flag character high order bit read from the RAM 54 is a one.

FIG. 10 shows the formats of data sent over the cable 16, hereinafter referred to as link data. The link data format of the sync/poll character is shown in FIG. 10, 10-A. The low order nibble contains the user ID (O-F(H)), the first three bits of the high order nibble are zeros, and the high order bit of the high nibble is set to a one. The link data format includes a ninth bit (P) for parity. Even parity is used for the sync/poll character.

FIG. 10, 10-B shows the link data format for character data sent from the host computer 12 to a user 14. The character data may be either a seven bit ASCII format, or may be in an eight bit ANSI format, as desired. Odd parity is used. If the ASCII format is used, the high order eighth bit should always be zero, thus providing an additional character validity check for the terminal element 22.

FIG. 10, 10-C shows the data link format for keystroke data going to the host computer 12 from a user 14. The first seven bits may contain the keystroke in ASCII format wherein the eighth bit is a zero. In this case, the controller 20 may check the eighth bit as a validity bit, as desired. The user may also transmit data in an eight bit ANSI format. Thus, both seven bit and eight bit formats may be used as long as the host computer 12 knows which format to transmit and receive for each user. Odd parity is used.

FIG. 10, 10-D, 10-E and 10-F show the data link formats of LFC characters sent to the host computer 12 by a user 14 in time slot 18. FIG. 10, 10-D shows a break character whose value is 55(H). The break character is sent by the terminal element 22 in response to an operator keystroke.

FIG. 10, 10-E shows an LFC-OFF character having a value of AA(H). The LFC-OFF character is sent by the terminal element 22 to indicate a potential overflow condition, as will be explained.

FIG. 10, 10-F shows an LFC-ON character having a value of 66(H). The LFC-ON character is sent by the terminal element 22 when the LFC-OFF condition no longer exists. Odd parity is used for the LFC character data link formats.

The use of the LFC characters will now be explained. The LFC characters are sent in time slot 18. The break character 55(H) is sent to indicate that the operator has sent a break, and always has priority of the other LFC characters.

Where the user 14 is a low data rate device, such as a printer, a host receiver queue (HRQ) must be established to buffer the incoming data which is coming from the host at a faster rate than it is being outputted by the low data rate device. In the present embodiment, a sixty-four byte HRQ is implemented in the programming of the microcomputer 80 of FIG. 5 of the terminal element 22. The HRQ has conventional FIFO load and read pointer control. Since the host computer 12 receives LFC data from a polled user 14 every sixteen frames, during which time sixteen characters could be sent to that user, a fifty percent point of thirty-two characters is established as a threshold to avoid an overflow condition. When the threshold is exceeded, the terminal element 22 sends an LFC-OFF character the next time it is polled, instructing the host character 12 to stop sending character data to it. The terminal element 22 program also sets an LFC-OFF flag. When the contents of the HRQ have decreased to a low threshold point where characters can again be stored therein, the terminal element 22 sends an LFC-ON character telling the host computer 12 to resume sending data characters to it. The LFC-OFF flag is also cleared. In the present invention, a threshold of eight characters is the lower threshold for sending the LFC-ON character and clear the LFC-OFF flag. The terminal element 22 does not send an LFC-ON character if the LFC-OFF flag has not been set.

The terminal element 22 of a low data rate device is also programmed to honor all X-OFF, X-ON or DTR data terminal flow requests, as may be provided by appropriate parameters initialized by the terminal element firmware at initialization.

Returning to the RCV FIFO 70 of FIG. 2B, the RCV FIFO 70 contains two eight bit characters for each keystroke received from a user 14. The first eight bit character contains the first eight bits of the link character discussed in connection with FIG. 10, 10-C. The low order nibble of the second FIFO character contains the four bit ID of the user 14 from which the keystroke data came. The first or low order bit of the high order nibble of the second FIFO character contains a zero, the second bit contains the result of a parity error check of the data (1=parity error and 0=no parity error), and the third bit contains a zero. The high order or fourth bit of this high nibble contains the state of the MORE output on pin 21 of the RCV FIFO 70 (see FIG. 3I). Thus, if there are more entries in the RCV FIFO 70, the MORE bit will be a one, and if there are no more entries in the RCV FIFO 70, the MORE bit will be zero.

LFC characters are also stored in the RCV FIFO 70 of FIG. 2B for the host computer 12. Two eight bit characters are also stored in the RCV FIFO 70 for each LFC character. The first character stored is 20(H) for a break character, 80(H) for an LFC-OFF character, and 00(H) for an LFC-ON character. In the second stored character, the lower nibble contains the ID of the polled user from which the LFC character came, the first or low order bit of the high nibble contains a zero, the second bit contains a parity error check bit, the third contains a one, and the fourth contains the MORE bit discussed. Thus, by examining the third bit of the high order nibble of the second eight bit character (bit 6), the host computer can determine if the character in the first eight bits is a keystroke character or an LFC character from the user identified by the ID. A zero would indicate a keystroke character, and a one would indicate an LFC character.

Figure 3A:
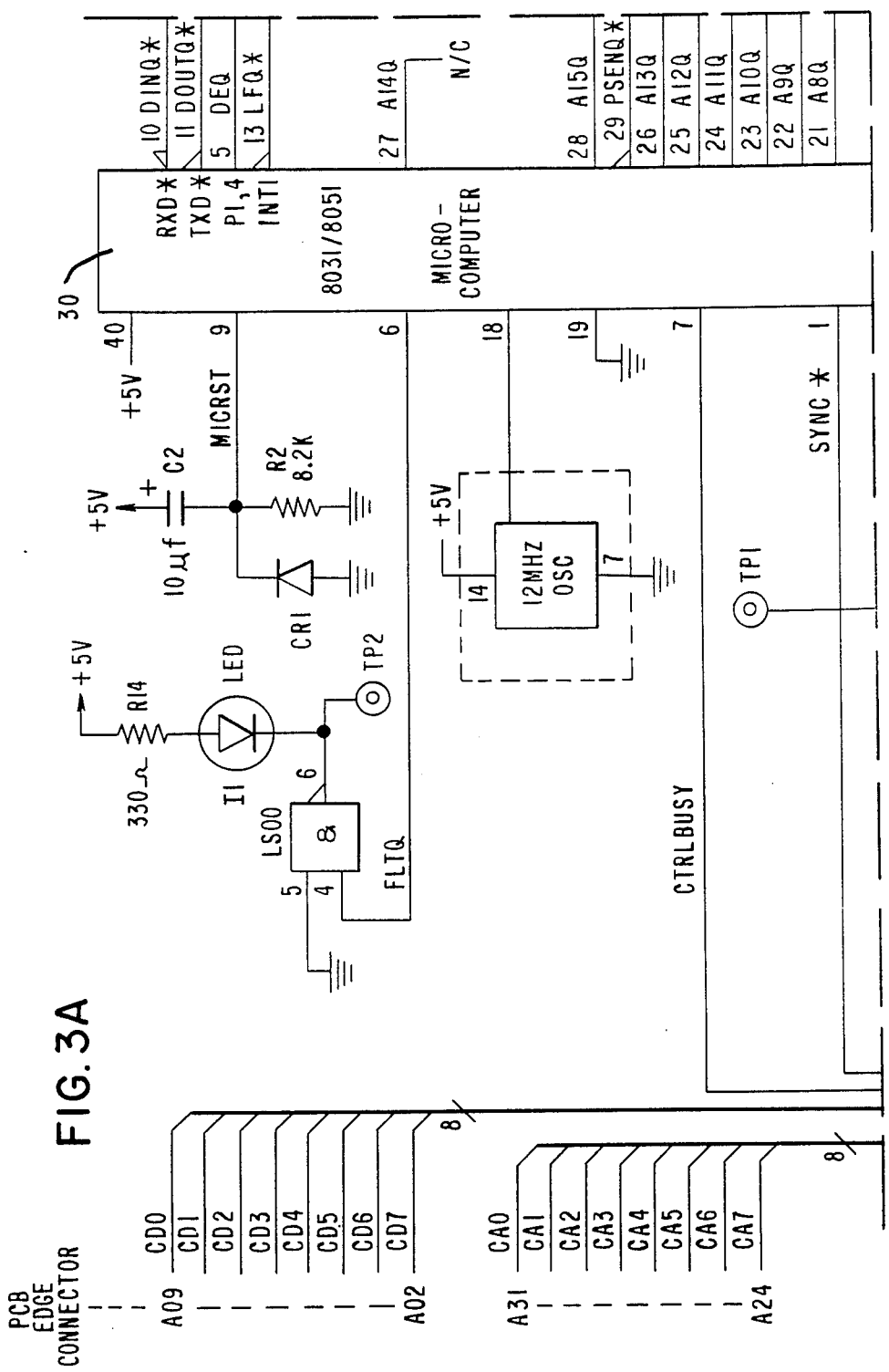
Figure 3C:
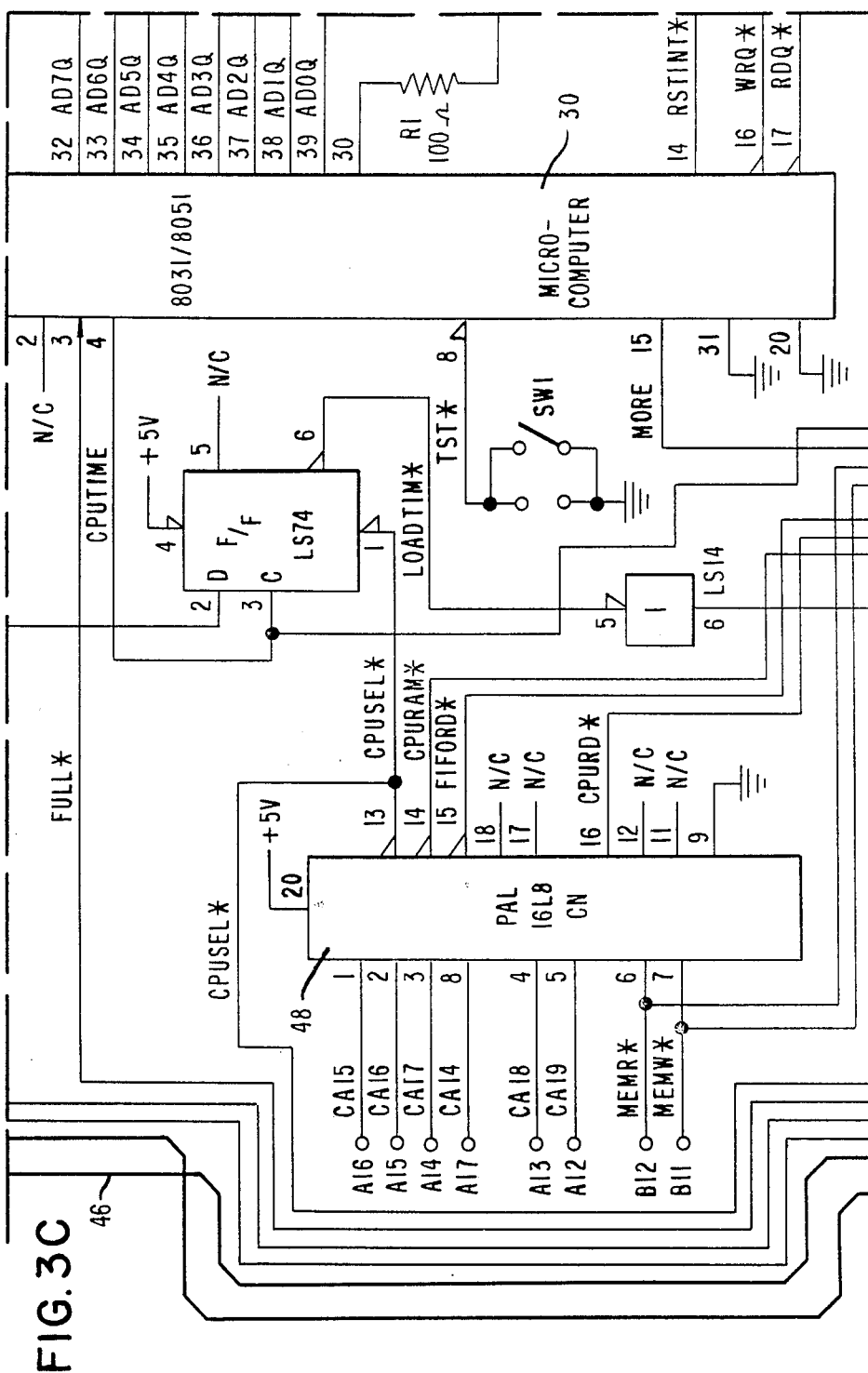
Figure 3D:
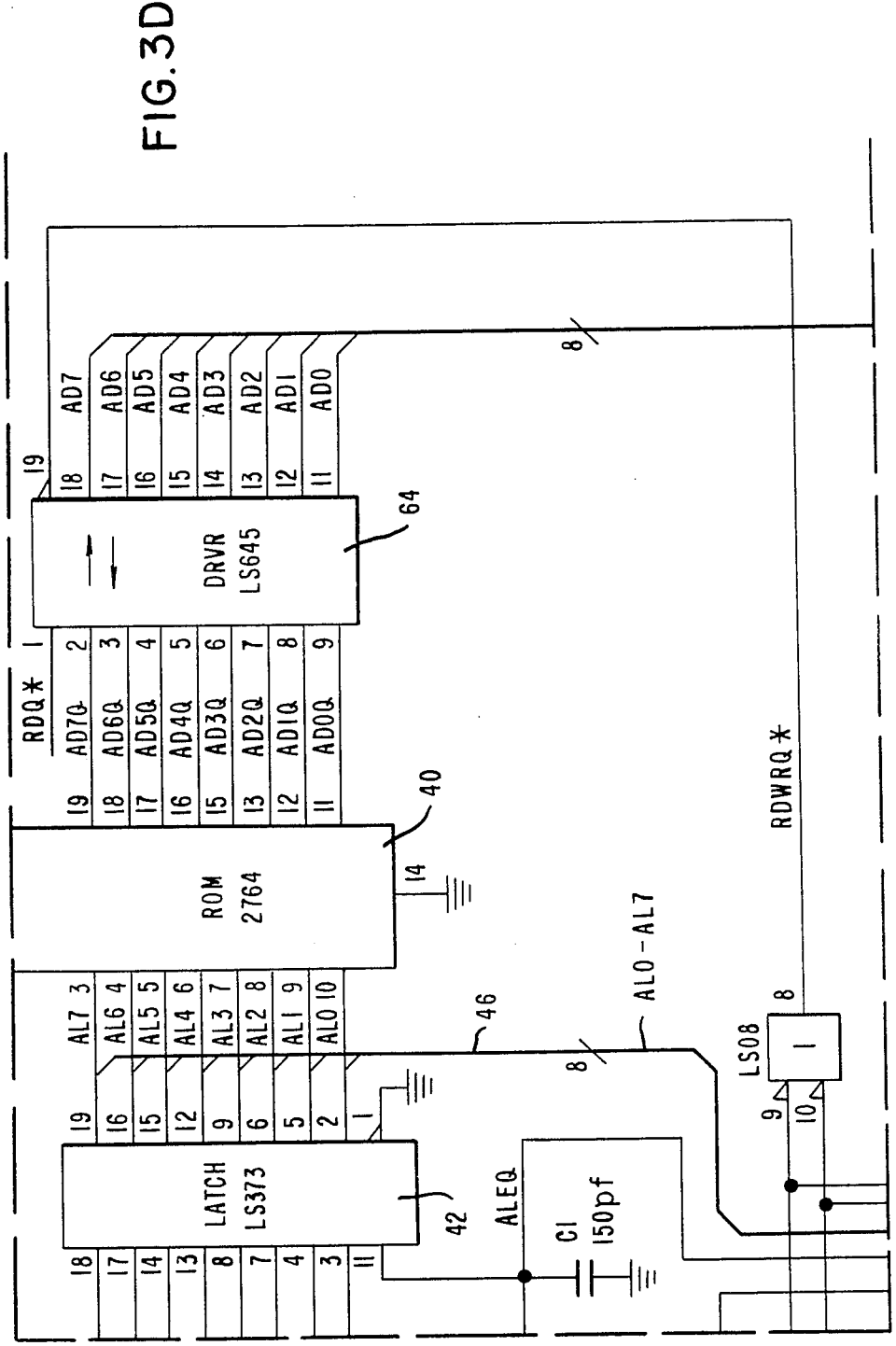
Figure 3E:
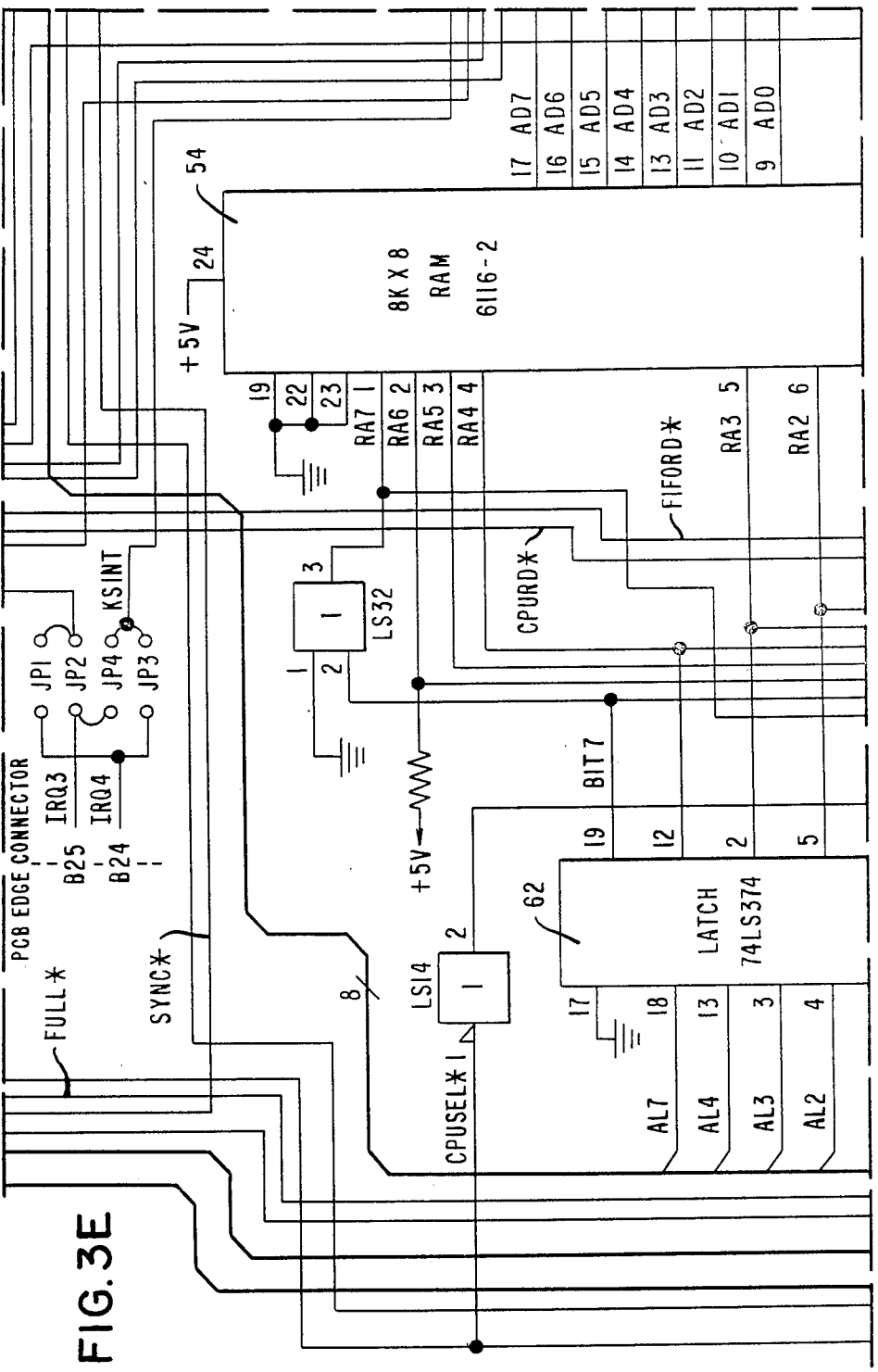
Figure 3F:
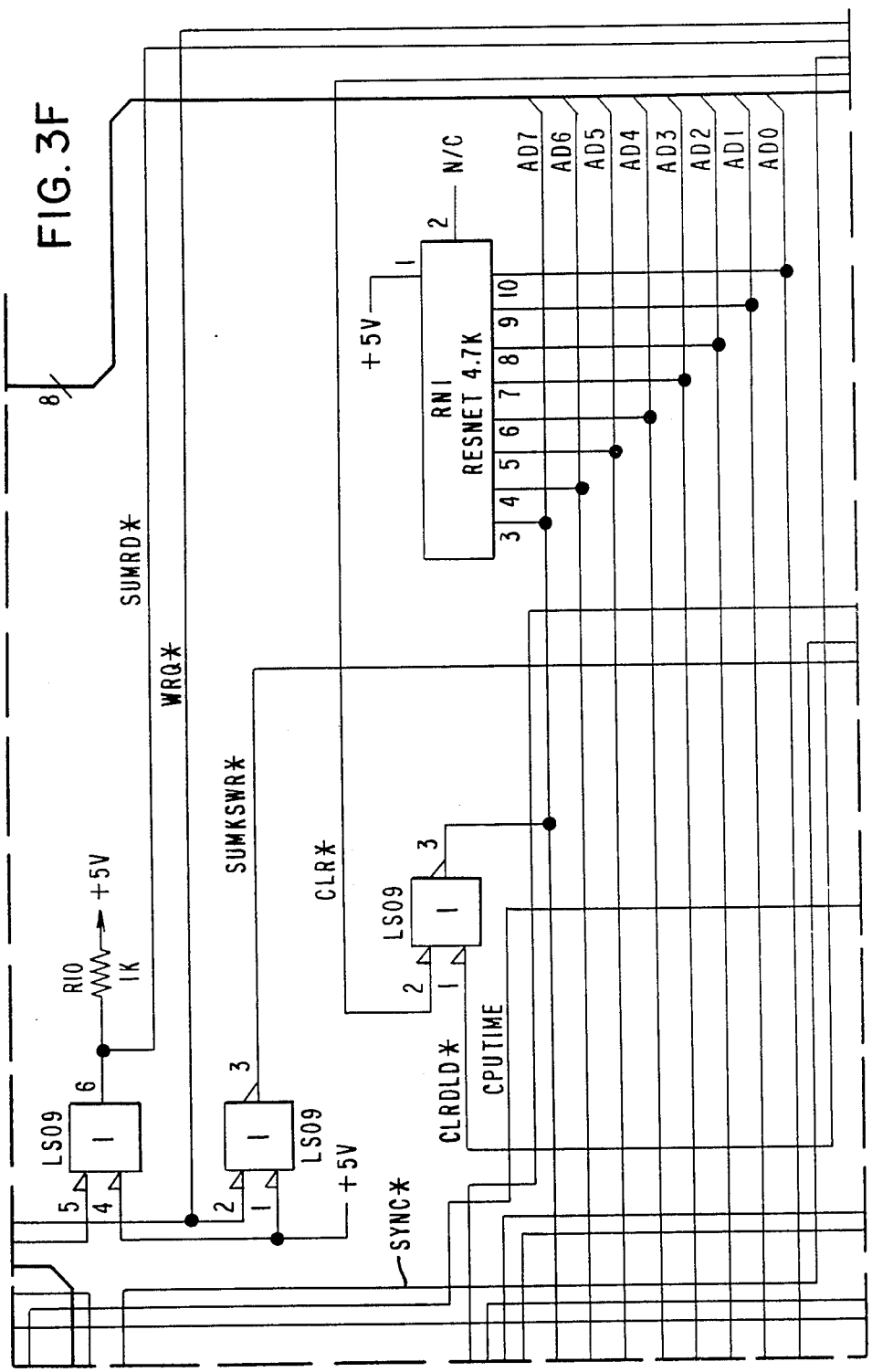
Figure 3G:
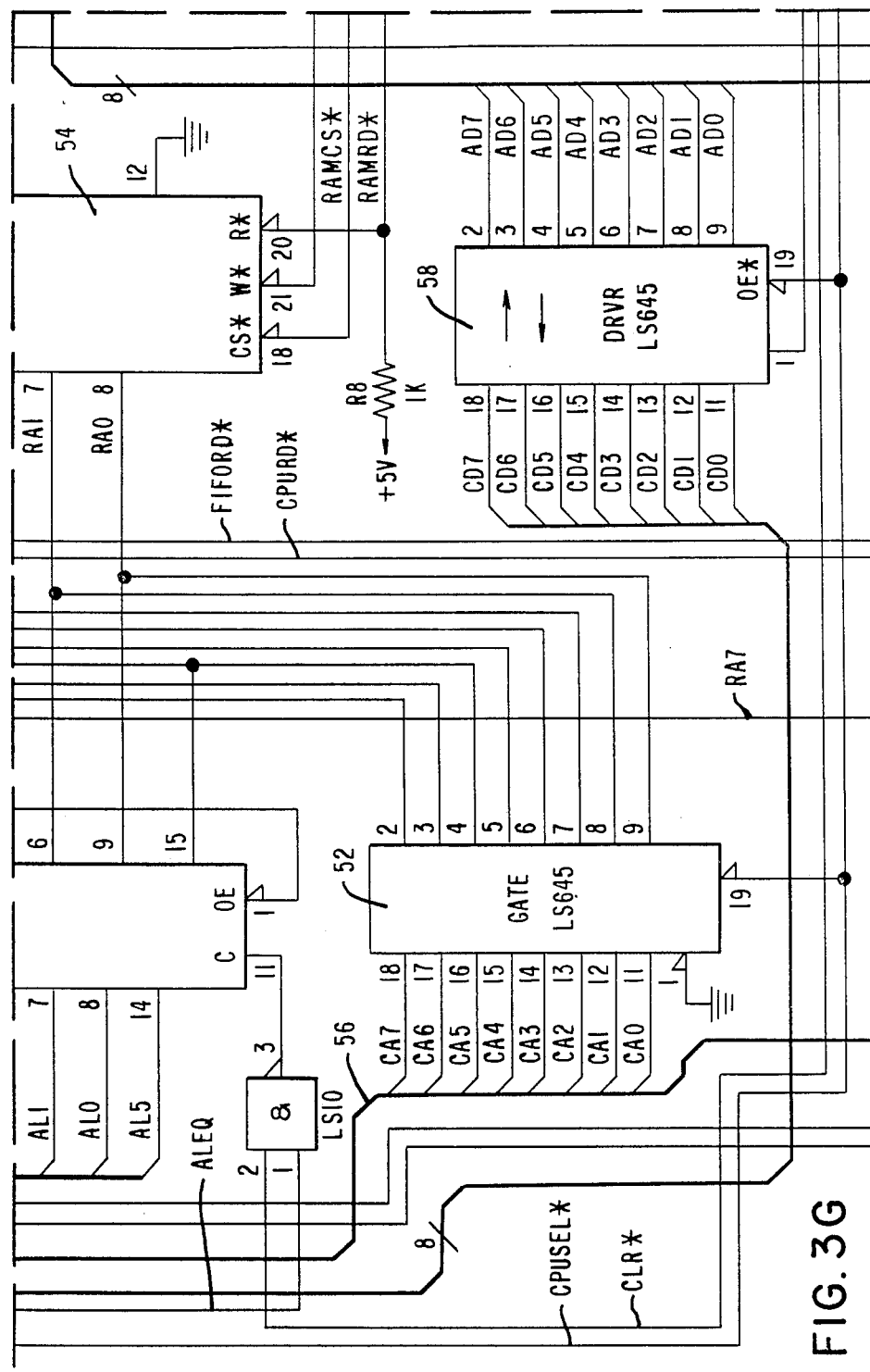
Figure 3H:
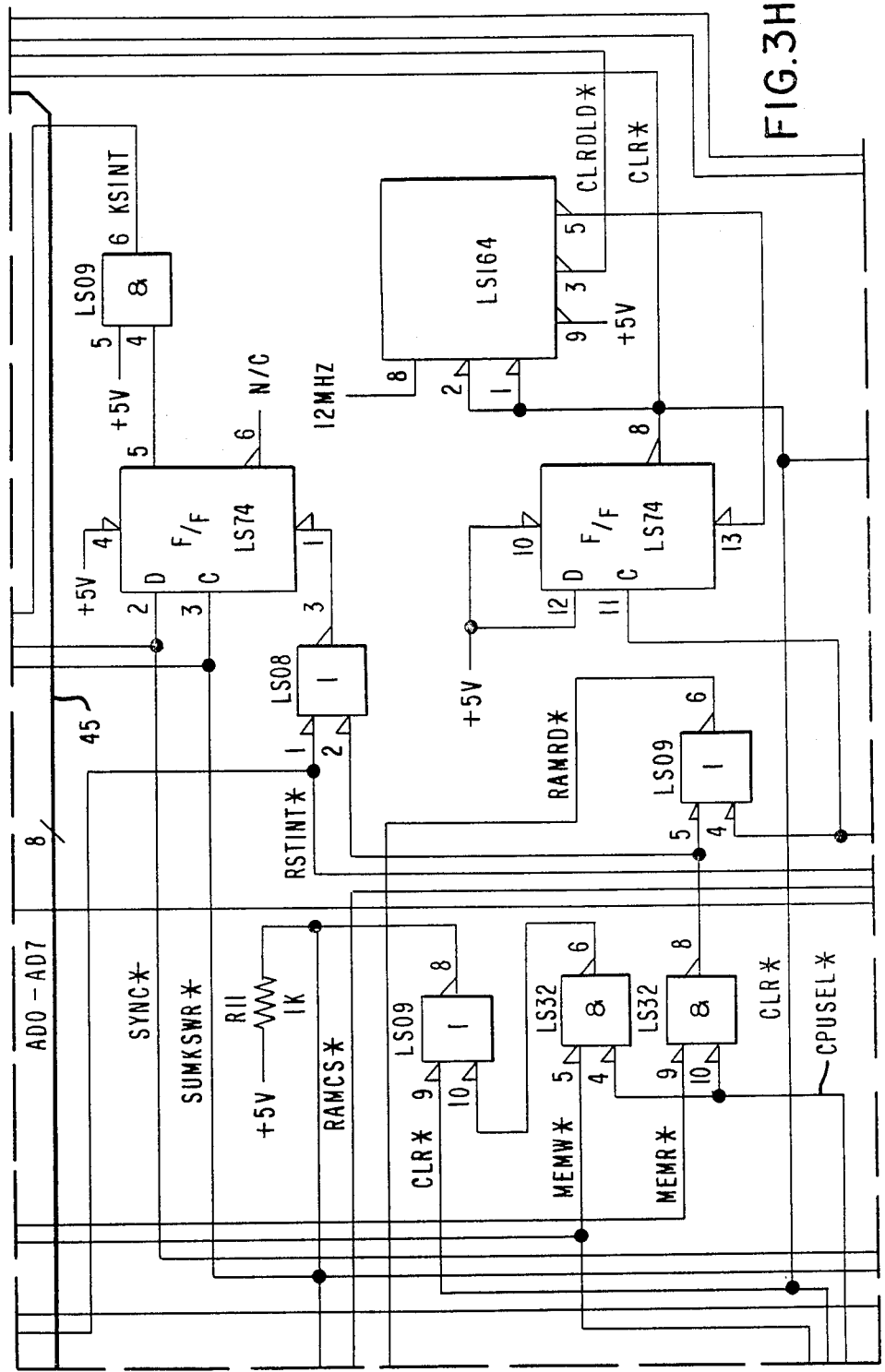
Figure 3I:
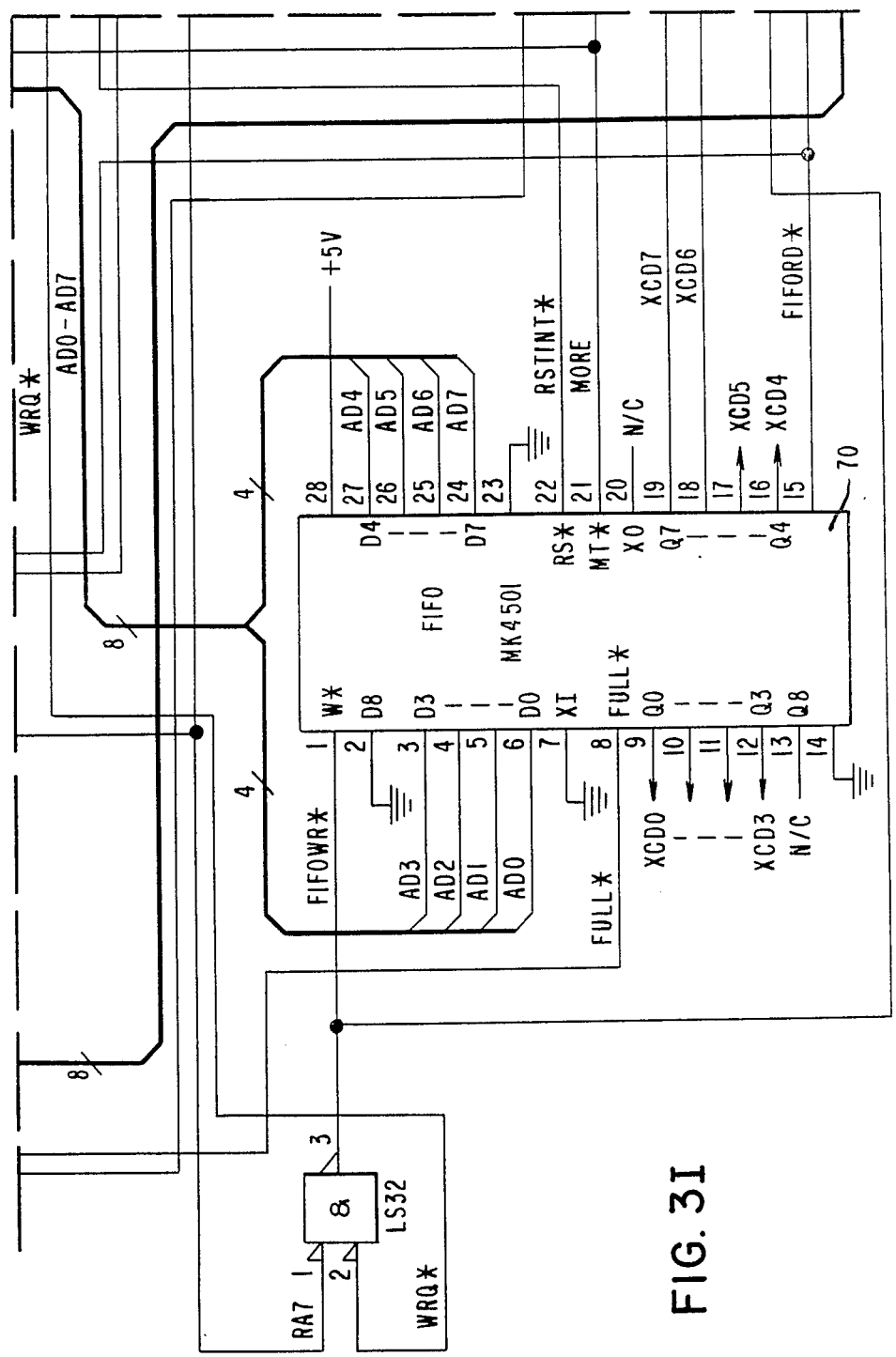
Figure 3K:
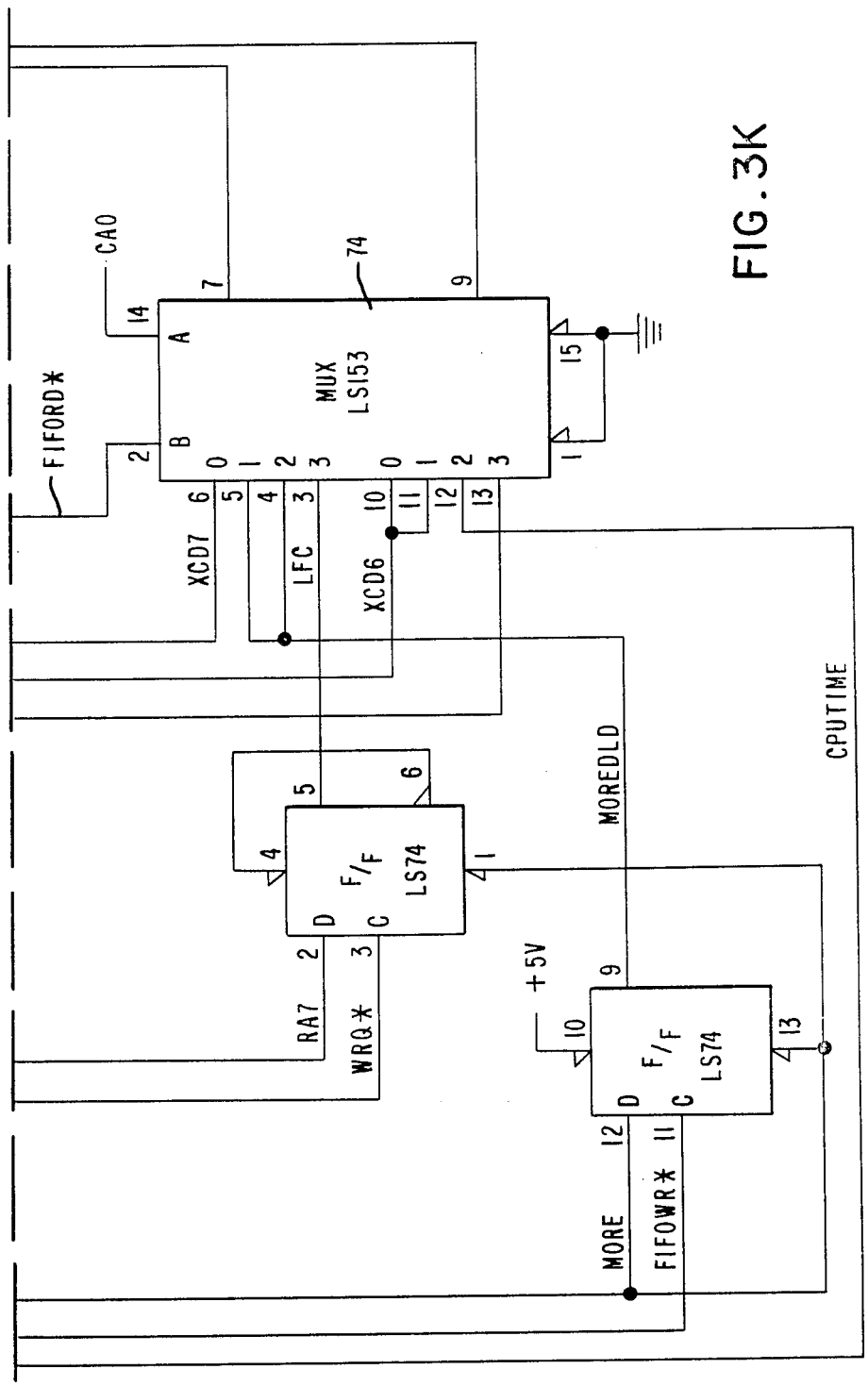

Referring to the multiplexer 74 of FIGS. 2B and 3K, it will be seen that the least significant bit of the address (CAO in FIG. 3K) is connected to pin 14, and the FIFORD* signal is connected to pin 2. When the address C8000 is outputted to the decoder 48 of FIG. 2A by the host computer 12, a low FIFORD* signal is outputted to the RCV FIFO 70 and the multiplexer 74. The least significant bit of the address is also low. The RCV FIFO 70 then outputs bits 0–5 of the next character directly onto the host data bus 75 via the octal gate driver 72. The multiplexer 74 will multiplex the bits 6 and 7 onto the host data bus 75 since the FIFORD* and CAO signals are low (see FIG. 3K). When the address is C8001, the FIFORD* signal remains low, and the CAO signal goes high. Thus, bits 0–5 of the next eight bit character in the RCV FIFO 70 is placed on the host data bus 75, and bit 6 (XCD6) and the MORE (MOREDLD) bit are multiplexed by multiplexer 74 onto the host data bus. In this way, the host computer 12 reads the contents of the RCV FIFO 70.

Figure 11:
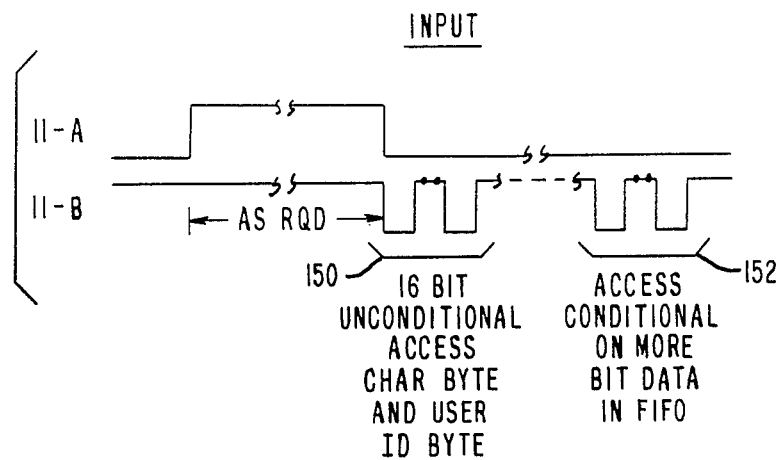
FIG. 11 is a timing diagram of a FIFO device in the communications controller of FIGS. 2A-2B.

FIG. 11 is a timing diagram of a read from the RCV FIFO 70. If the RCV INTR signal (FIG. 11, 11A) is enabled, the host computer 12 will unconditionally read at 150 of 11-B, the first sixteen bits in the RCV FIFO 70 to get the keystroke data or LFC character, and the ID of the user who sent the data. If the MORE bit is enabled, the host computer 12 continues to read the RCV FIFO 70 at 152 of FIG. 11, 11-B until the RCV FIFO 70 is empty.

Figure 12:
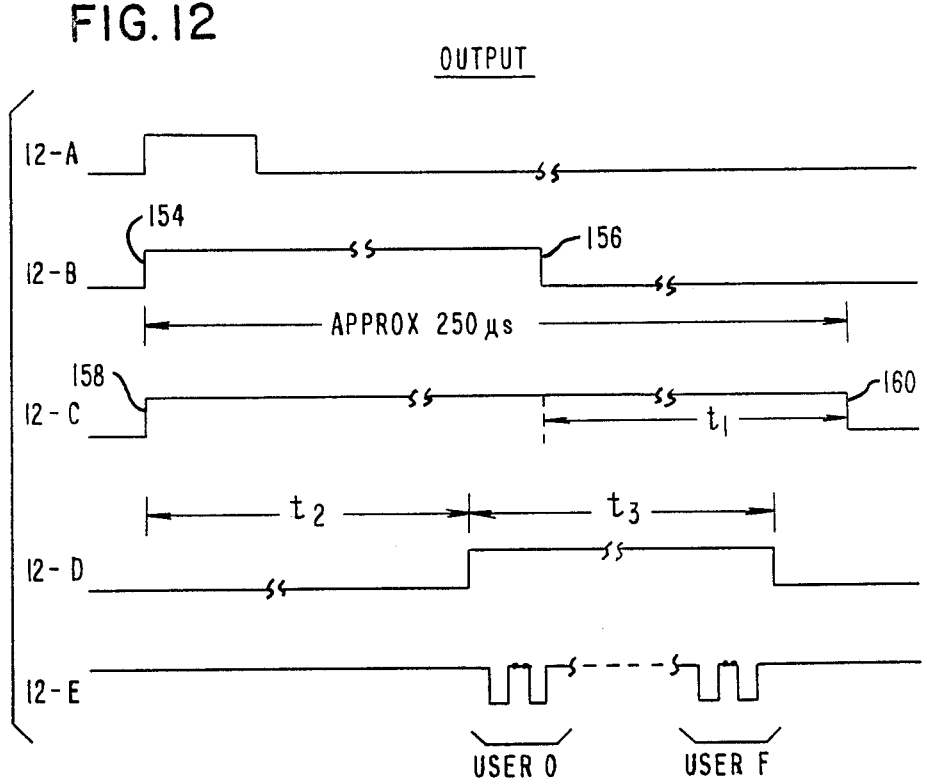
FIG. 12 is a timing diagram of the timing for the writing of character data to the memory of the RAM as illustrated in FIG. 9.

FIG. 12 is a timing diagram of the timing for the writing of character data to the RAM 54 of FIG. 2A by the host computer 12. FIG. 12, 12-A shows the occurrence of the XMIT INTR signal discussed in connection with interrupt circuit 66 of FIG. 2A. If, when the XMIT INTR signal is enabled, the host computer 12 is attending to higher priority task, it will not answer the XMIT INTR interrupt signal until it has completed the higher priority task. It is possible that when the higher priority task is completed, the time allotted for the host computer 12 to write data to the RAM 54 will have elapsed. To prevent interference between the host computer 12 writing to the RAM 54 and the microcomputer 30 reading data from the RAM 54, the host computer 12 reads the CPU TIME signal with a status read command C4000(H) to determine if writes to the RAM 54 by the host computer 12 are still allowed. The use of a dual ported FIFO in place of the RAM 54, as discussed, avoids this restriction.

FIG. 12, 12-B is an illustration of the CPU TIME signal which is enabled at 154 and stays enabled until 156. The negative going edge 156 of the CPU TIME signal occurs at a time when the host computer 12 may still complete a write cycle to the RAM 54 without interfering with a read by the microcomputer 30.

FIG. 12, 12-C is a diagrammatic illustration of the RAM access time in which the host computer 12 may write to the RAM 54. The access time starts at 158 and ends at 160 for a duration, in the present embodiment, of approximately 250 microseconds. It will be seen that the CPU TIME signal ends at 156 which leaves enough time ($t_1$) between 156 and 160 to complete a write cycle to the RAM 54.

FIG. 12, 12-D shows the signal CPUSEL of FIG. 2 which controls the addressing of the RAM 54 by addresses from the host computer 12 through the octal gate 52 of FIG. 2A. The actual occurrence of the CPUSEL of 12-D will vary with the duration of $t_2$, depending upon when the host computer 12 actually responds to the interrupt, and writes data to the RAM 54 ($t_3$). Time $t_3$ must not exceed the time $t_1$ which is necessary for the host computer 12 to complete a write cycle of 16 characters to the RAM 54. After receiving a XMIT INTR signal as shown in 12-A, the host computer 12 reads the CPU TIME status bit (FIG. 12, 12-B) by issuing a C4000(H) address to the decoder circuit 48 of FIG. 2. Responsive to the C4000(H) address, the decoder 48 generates a CPURD* signal which passes the CPU TIME bit through the multiplexer 74 and driver 72 onto the host data bus 75. The host computer 12 then checks the CPU TIME status bit to determine if it is operating within the RAM access time as shown in 12-C. If the CPU TIME status bit is high, a RAM write cycle is completed by the host computer 12 by writing data into the RAM 54 at addresses C0000(H)-C001F(H). Responsive to the addresses C0000(H) through C001F(H), a CPUSEL signal is generated by decoder 48 as shown in 12-D, allowing data to be written into the RAM 54. FIG. 12, 12-E shows a cycle of character data written from the host computer 12 into the RAM 54 during $t_3$.

Figure 13:
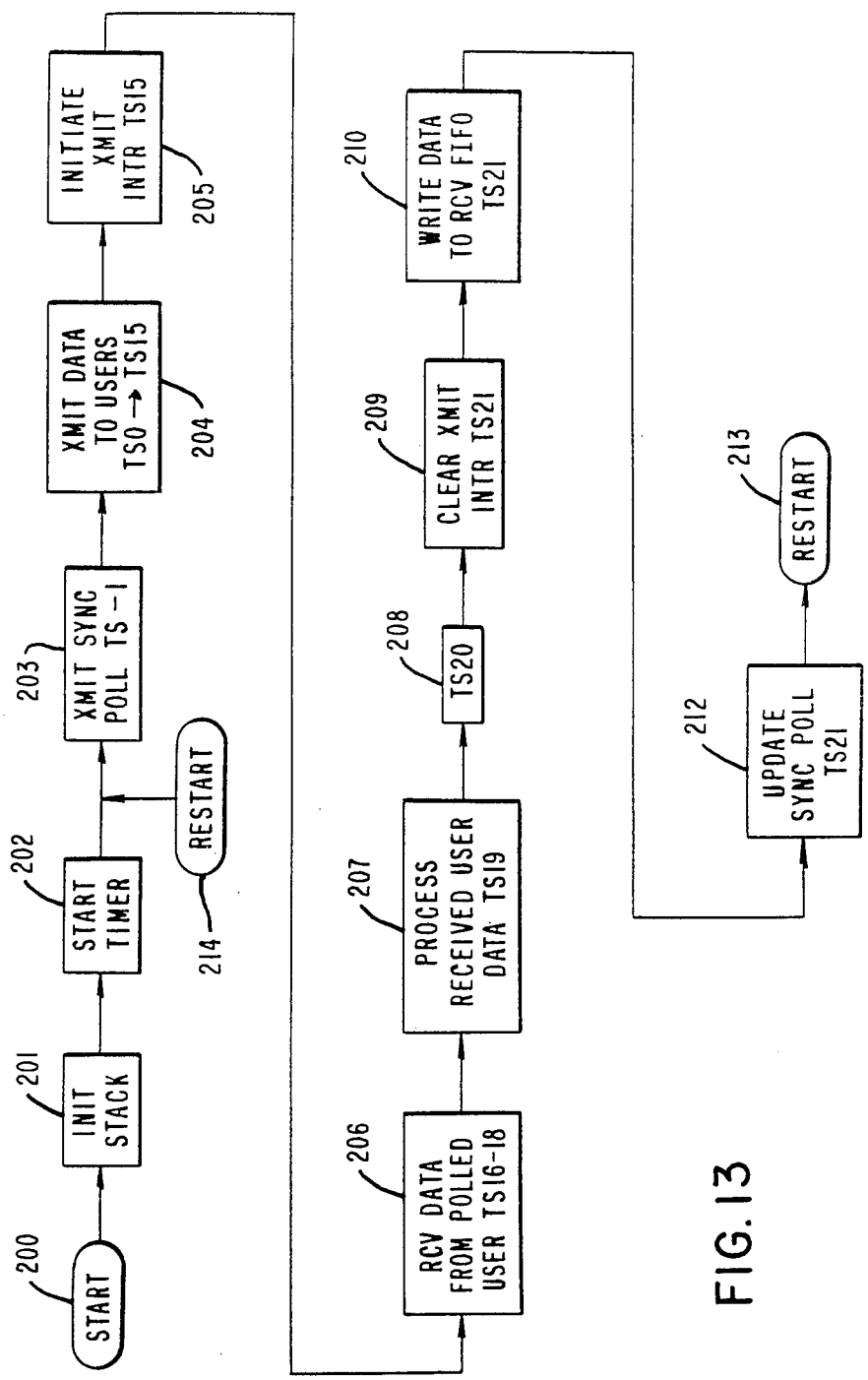
FIG. 13 is an overall flow chart of a program for use by a microcomputer in the communications controller of FIGS. 2A-2B.
Figure 14A:
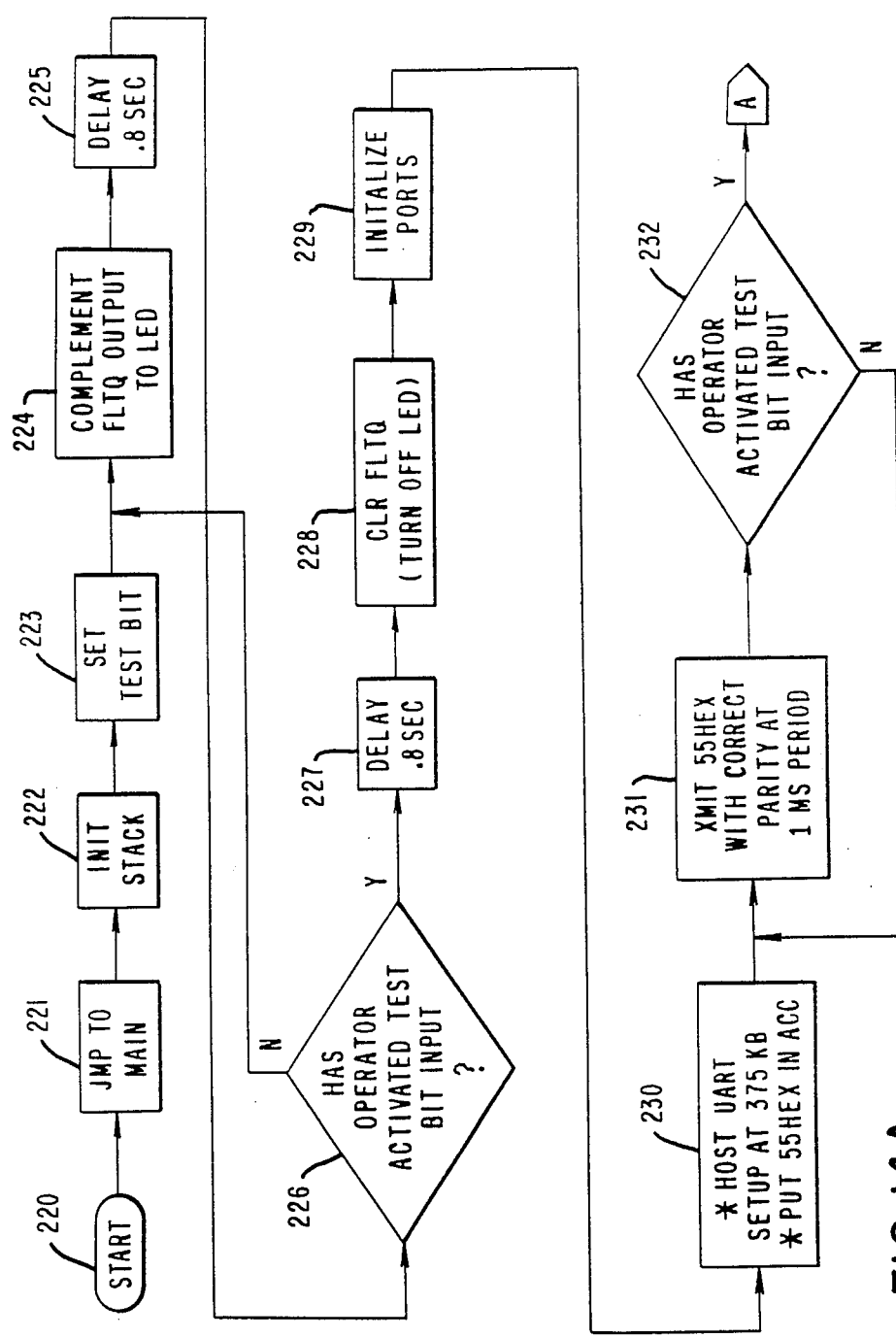
Figure 14C:
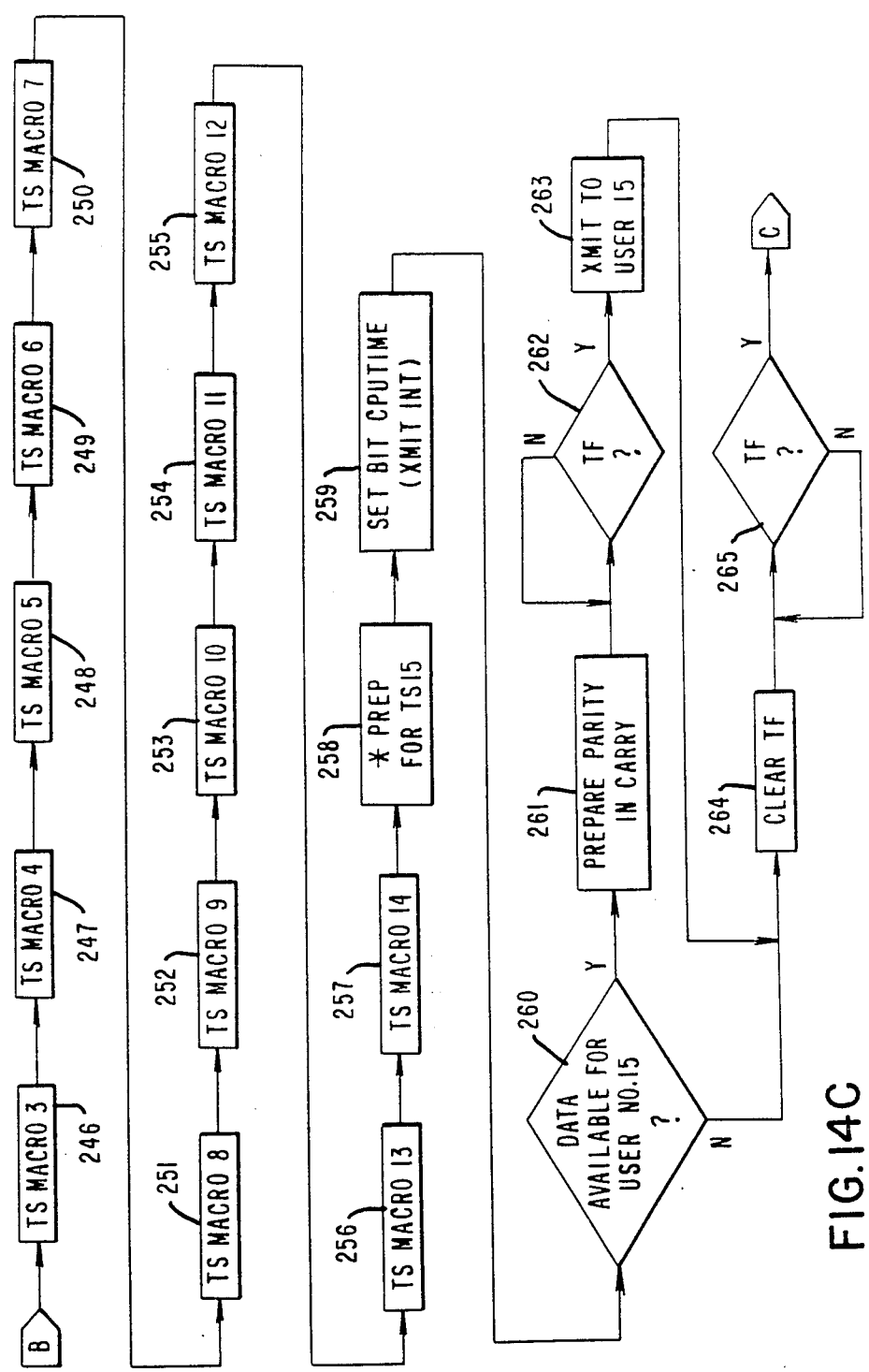
Figure 14D:
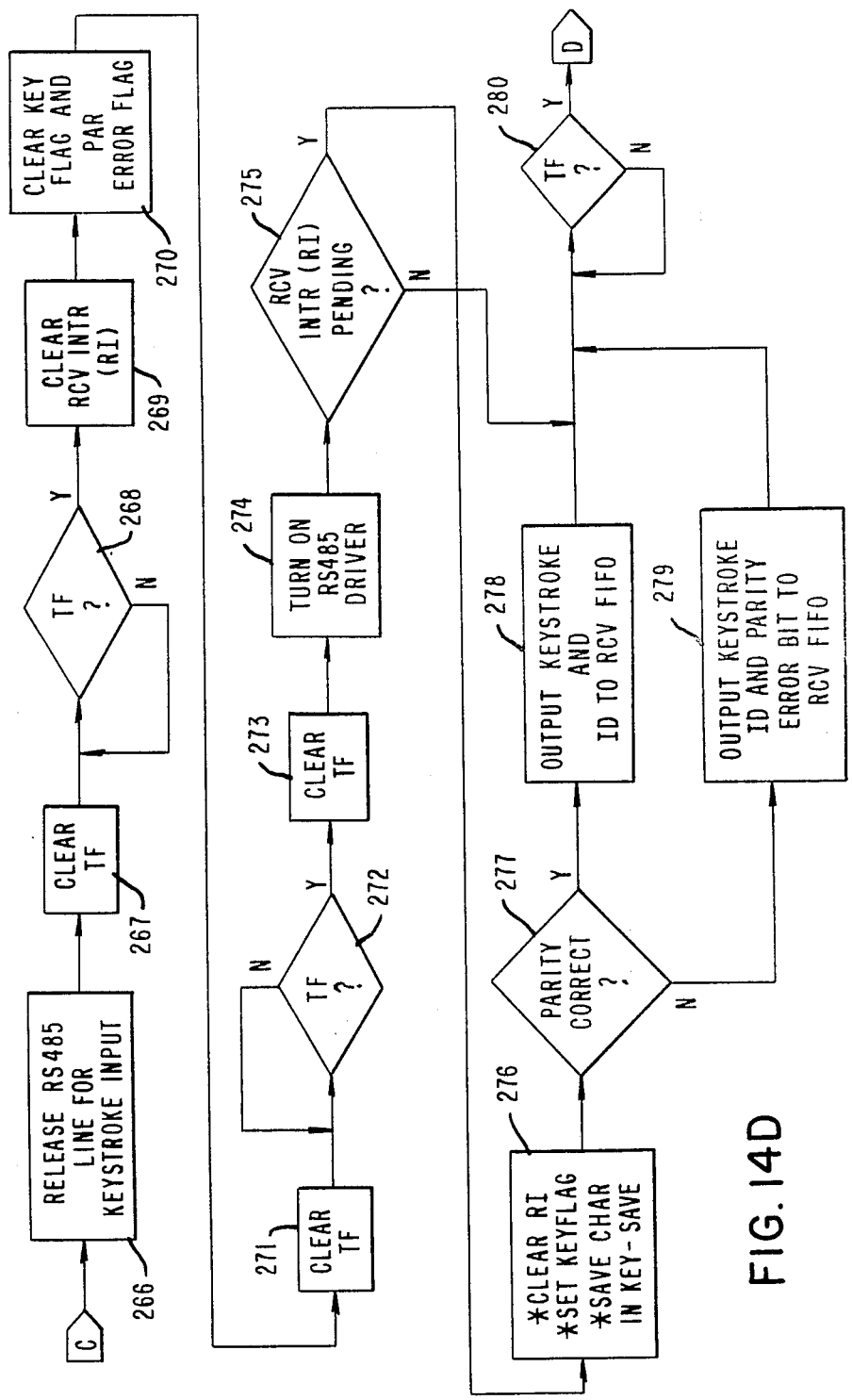
Figure 14E:
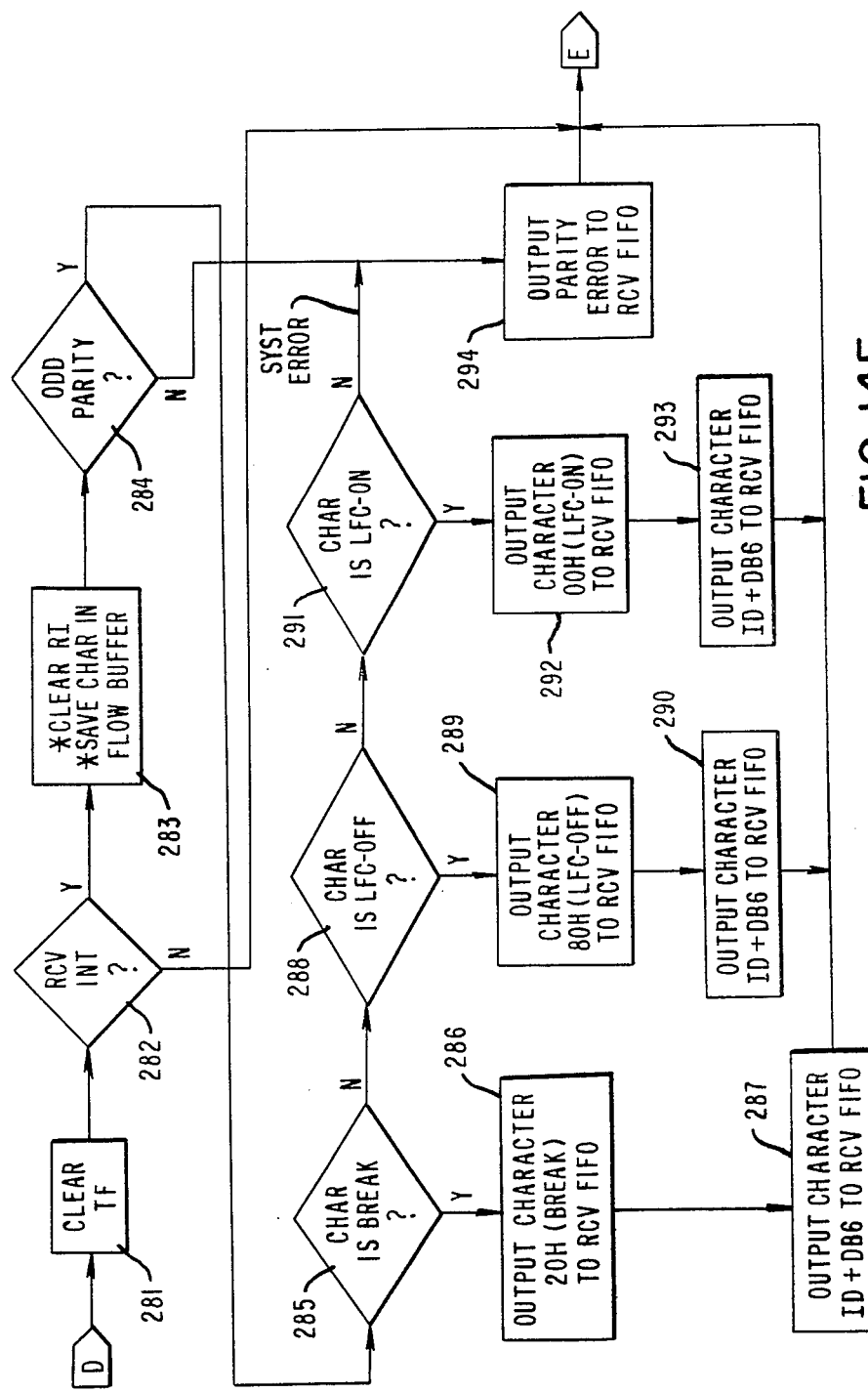
Figure 14F:
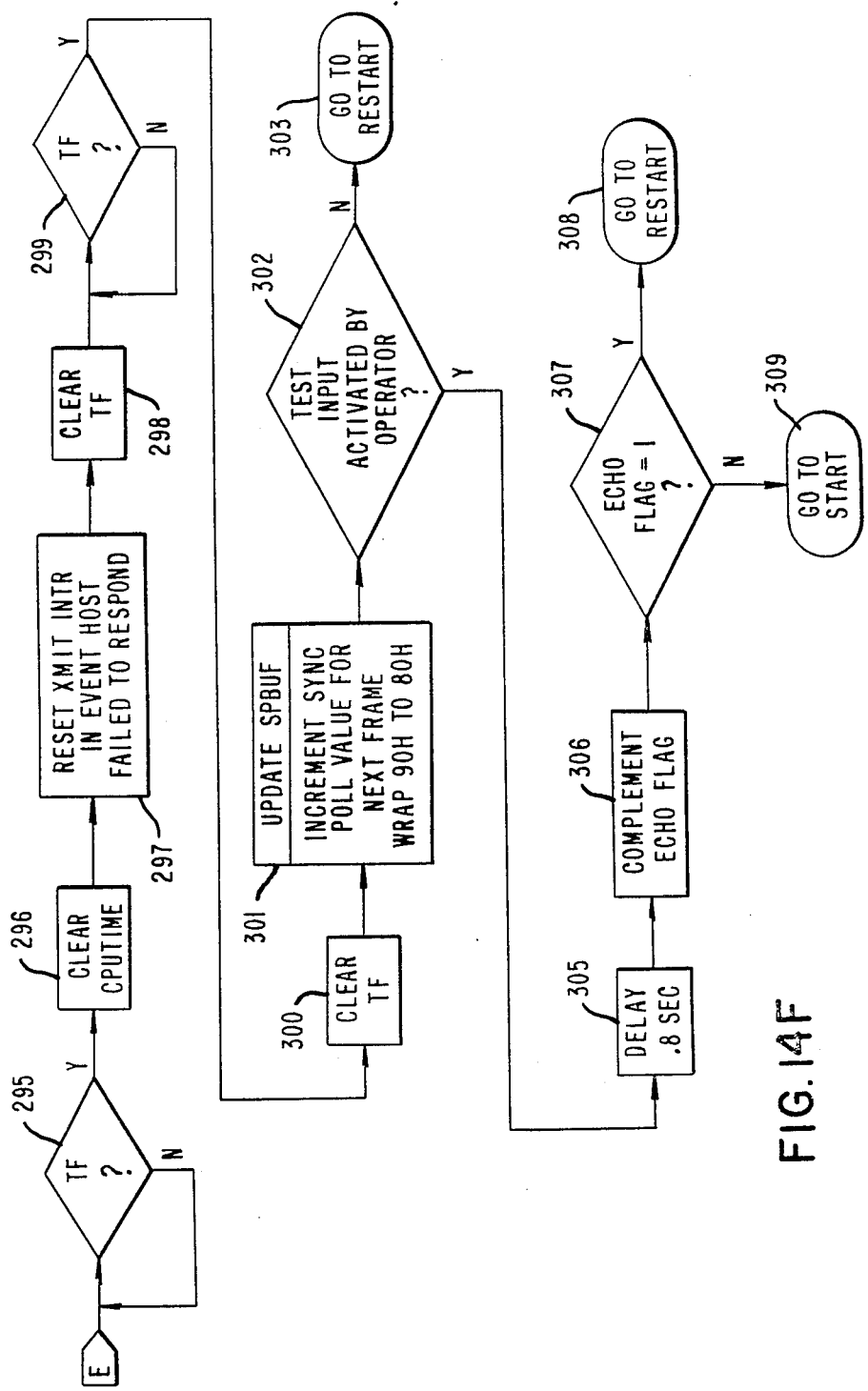

FIG. 13 is a flow chart which presents an overview of the programming for the microcomputer 30 of the controller 20 of the host computer 12. The program starts at 200 and completes an initialization phase 201 wherein initialization procedures for the microcomputer 30 are completed. At 202, the timer 33 internal to the microcomputer 30 is started which, as will be discussed, is used by all of the users 14 to synchronize the time slot protocol herein. At 203, a sync/poll character is transmitted over the twisted pair cable 16 in time slot −1. At 204, characters for the users 14 are transmitted over the twisted pair cable 16 in time slots 0 through 15. At 205, the XMIT INTR interrupt signal is initiated in time slot 15. At 206, data is received by the host computer 12 from the polled user in time slots 16, 17 and 18. At 207, the data received from the user is processed in time slot 19. Time slot 20 is represented in 208. In time slot 21, shown at 209, the XMIT INTR interrupt signal is cleared. Also in time slot 21, shown at 210, the data is written into the RCV FIFO 70 (see FIG. 2B). At 212, also in time slot 21, the sync/poll character is updated with a new user ID and at 213, the program returns to the restart position 214 and restarts at a new time slot −1.

FIGS. 14A–14F, when joined at off page connectors A–E, form a flow chart of the program illustrated in FIG. 13. The program starts at 220 and includes a first command shown at 221 which is a jump to main for starting the program. At 222, the stack in the microcomputer 30 is initialized. At 223, a test bit is set.

For test purposes the FLTQ output at 224 may optionally be complemented to cause the LED I1 (see FIG. 3A) to be energized. At 225, the program performs a 0.8 second delay. At 226, a check is made to see if the operator has activated a test bit input. If not, the program returns to the block 224 wherein the FLTQ output is complemented to cause the LED I1 to blink. At 227, the program performs another 0.8 second delay to debounce any signals coming from the operator. At 228, the FLTQ output is cleared to turn off the LED I1.

At 229, the ports of the microcomputer 30 are initialized. At 230, the host UART 32 of FIG. 2B is set up at 375 kilobaud, and a 55(H) is placed in an accumulator for a transmission to perform an RS 485 test.

Optionally, the 55(H) character may be transmitted at 231 with parity at one millisecond periods to test the RS 485 loop. Also for test purposes a test may optionally be made at 232 to see if the operator has activated a test bit input to proceed. If not, the program returns to the beginning of the RS 485 test at 231.

The program conducts a RAM test at 233 to test the RAM 54 out of FIG. 2A. At 234, the program enables an RS 485 fault interrupt bit for use in detecting cable shorts. At 235, the RS 485 driver is turned on in preparation for transmission. At 236, the timer 33, internal to the microcomputer 30, is set up for an automatic reload at forty-five microseconds. The set up for the internal UART 32 and the internal timer 33 is fully described in the aforementioned publication from Intel for the Intel 8031 microcomputer. At 237, the internal timer 33 is started for putting out a timer pulse (herein referred to as a TIC) every forty-five microseconds. At 238, the program clears a timer flag. At this point, the initialization procedure 201 and the start timer procedure 202, of FIG. 13, have been completed, and the program is ready to start transmitting characters to the users.

At 239, an accumulator is set up with the sync/poll character in preparation for time slot −1. Part of the set up is to assign a user ID in the sync/poll character as previously described. At 240, the timer flag is checked to see if a new time slot has started. The timer flag test at 240 is repeated over and over until the timer flag indicates that a new time slot has started. When a new timer flag is detected, the sync/poll character is transmitted at 241. At 242, the timer flag (TF) is cleared starting a new time slot. Block 243 represents a time slot macro for time slot 0. The macro waits for the timer flag and conditionally transmits character data in time slot 0 to user number zero. The blocks 244–257 (FIGS. 14B and 14C) represent time slot macros for time slots 1 through 14, respectively. The transmission of a character in time slot 15 is shown at blocks 258–265. In block 258, preparation is made for time slot 15. At 259, the CPUTIME bit is set and the XMIT INTR interrupt is raised. A test is made at 260 to determine if data is available for user fifteen. If data is available, the parity bit is prepared at 261 and the time flag is checked at 262 for the beginning of time slot 15. At 263, the character is transmitted to user fifteen. If the test at 260 determines that no data is available for user 15 or that the data has been transmitted to user fifteen at 263, the program goes to block 264 wherein the time flag is cleared. At 265, a check is made for the time flag to wait for the beginning of time slot 16. At 266, the RS 485 line is released to effect line turnaround for the input of keystroke data from a user to the host computer 12. At 267, the time flag is cleared and at 268, a time flag check is made to wait for the beginning of time slot 17.

At 269, the RCV INTR interrupt is cleared, and the key flag and parity error flag are cleared at 270 to prepare for the receipt of keystroke data. At 271, the time flag is cleared, and at 272 the time flag is checked to wait for the starting of time slot 18. At the start of time slot 18 at 273, the time flag is cleared, and the RS 485 driver is turned on at 274. At 275, a check is made to see if a RCV INTR interrupt is pending indicating that a keystroke character has been received. If the test at 275 is yes, the RCV INTR is cleared, the key flag is set and the keystroke is saved in KEY-SAVE at 276. At 277, a check is made to see if the parity of the received keystroke data is correct. If the parity is correct, the keystroke and user ID is stored in the RCV FIFO at 278. If the parity is not correct, the keystroke, user ID and parity error bit is stored in the RCV FIFO at 279. At 280, a check is made for the time flag to wait for time slot 19.

At 281, the time flag is cleared. A check is made at 282 for a RCV INTR interrupt which indicates that an LFC character has been received. If an LFC character has been received, the RCV INTR is cleared at 283, and the character is saved in the flow buffer. At 284, the parity is checked. If the parity is odd, a check is made to determine if the character is a break (55(H)) at 285. If the LFC character is a break, a break character (20(H)) is written to the RCV FIFO at 286, followed by the ID from the sync/poll character and a one in data bit 6 in a second eight bit character at 287, as previously discussed.

If the check at 285 is no, a check is made at 288 to determine if the LFC character is an LFC-OFF (AA(H)). If the LFC character is an LFC-OFF, an LFC-OFF character (80(H)) is written into the RCV FIFO at 289, followed by the sync/poll ID and data bit 6 at 290.

If the check at 288 is no, a check is made at 291 to determine if the LFC character is a LFC-ON (66(H)). If it is, an LFC-ON (00(H)) is written into the RCV FIFO at 292, and the sync/poll ID and data bit 6 is written in the RCV FIFO at 293. If either the odd parity check at 284 or the check at 291 was no, a parity error output is stored in the RCV FIFO 294.

A timer flag check is then made at 295 to wait for the beginning of time slot 20. At the beginning of time slot 20, the CPU TIME bit is cleared at 296 and the XMIT INTR interrupt is reset at 297 in the event that the host computer has failed to respond. At 298, the time flag is cleared. A check is made at 299 to wait for time slot 21, and the timer flag is cleared at 300.

At 301, the sync/poll buffer (SPBUF) is updated, and the sync/poll ID value is incremented for the next frame. At 302, a test is made to determine if the operator has activated a test input. If a test input has not been activated, the program goes to the restart 303 which jumps to 304 at FIG. 14B. If the operator has activated a test input at 302, the program goes to a start diagnostic routine. At 305, a 0.8 second delay is performed to wait for switch bounce to end.

A check is made at 307 to determine if the echo flag is equal to one. If it is, the program goes to restart 308 (see 304 at FIG. 14B). If the echo flag is not equal to one, the program goes to start 309 (see 220 at FIG. 14A).

FIG. 15 is a flow chart of the time slot macro discussed in connection with blocks 243 through 257 for time slots 0 through 14. At 325, the timer flag is cleared. A data character is fetched at 326 from the RAM 54 for the next time slot identified by the data pointer (DPTR) location. The character found in the RAM 54 at the data pointer location is saved at 327 in register R5, and the data pointer is incremented at 328. At 329, the validity character is fetched from the RAM at the new data pointer location. At 330, the data pointer is incremented. A check is made at 331 of the flag character (see FIG. 9) to determine if the character is valid. As discussed earlier, this validation is made by checking the high order bit of the flag, character (see FIG. 9) to determine if it is a one or zero. If the bit is one, the character is valid, and if the bit is zero, the character is not valid. If the character is valid, the correct parity bit is set at 332, and the timer flag is checked at 333 to see if a new time slot has started. At the beginning of the new time slot, the character is transmitted at 334 on the RS 485 transceiver. The macro is then exited at 335. Returning to the character check at 331, if the character is not valid, the program goes to a timer flag check at 336 to wait for the new time slot. At the beginning of the new time slot the program then exits at 335.

Figure 16:
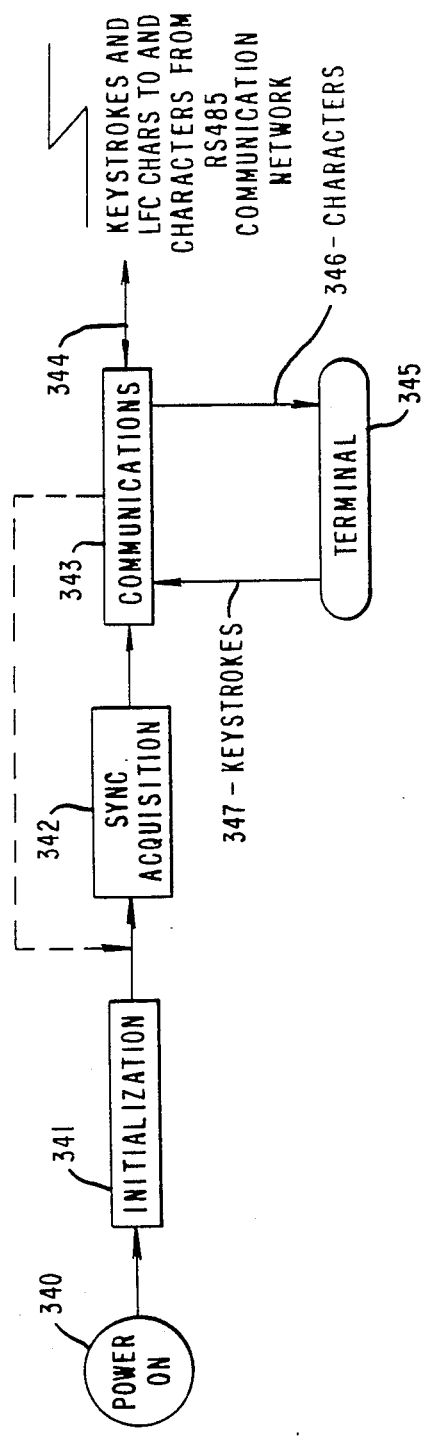
FIG. 16 is an overall flow chart of a program for use by a microcomputer in the terminal element of FIG. 5.

FIG. 16 is an overall flow chart for the program of microcomputer 80 of the terminal element 22 of FIG. 5. The flow chart of FIG. 16 starts at 340 with power on and includes an initialization routine at 341. At the beginning of each frame, the program does a sync acquisition routine at 342 for synchronizing the time slots of the terminal element 22 with the time slots of the controller 20. After the sync acquisition routine at 342, the program engages in a communications routine at 343 to receive data and transmit keystrokes and LFC characters over link 344 to the host computer 12. Data characters are transmitted to the terminal 345 over the data path 346, and keystroke data is received from the terminal 345 over the keystroke path 347, all as previously explained.

FIGS. 17A-17I joined at off page connectors H-R form a flow chart of the program of FIG. 16. The program starts at 350, and at block 351 initializes the stack, clears a parity error flag, establishes a 64 byte host receive queue (HRQ) and clears an LFC flag. The internal UART 92 of the microcomputer 80 (see FIG. 5), is initialized for 375 kilobaud at block 352. The microcomputer 80 then initializes the external terminal UART 100 of FIG. 5 at block 353. The external UART 100 is initialized at 1200 baud with each transmission having eight bits, odd parity and one stop bit. The X-OFF flow between the terminal 345 and the terminal element 12 is made active and the data terminal ready (DTR) is made inactive. At 354, the microcomputer 80 fetches the user ID from nonvolatile user parameter storage 96 (see FIG. 5). The first two bytes of the user ID should match and should be in the hexidecimal ASCII range for the maximum number of users, in the exemplary case sixteen.

A check is made at 355 to see if the two bytes obtained from the nonvolatile parameter storage 96 of FIG. 5 match. A check is made at 356 to see if the ID is within the hexidecimal ASCII range. If either of the checks at 355 and 356 are not met, a default ID of eight is installed at 357. The program at 358 performs a thirty millisecond delay. At 359, the user is prompted with an option to change the user ID. At 360, the program conducts a check to see if the user desires to change the ID. If the user desires to change the ID, the program goes to 361 (off page connector H) wherein the user is prompted to input numbers from 0-F(H), and the response is installed at 362 into the nonvolatile memory 96 of FIG. 5. The program then goes to block 363 which exits from the set up and prompts the user ID routine. If the user does not desire to change the user ID at 360, the program goes directly to block 363 (off page connector I). The prompt messages and ability to change the ID locally is linked to the presence of a jumper on the PROGENA* signal (see FIG. 6D). This provision is made so that a device such as a printer may be used in place of a terminal. It will be understood that if a printer is used, there will be no interactive capability such that a prompt may not be answered.

After exiting from the set up routine at 363, the program goes to 364 wherein it executes a 0.8 second delay. At 365, the ASCII ID is converted to 0-F(H) for use by the program. At 366, the value is incremented and saved in the parameter NVID-NUM for later use.

At 367, the timer 99 in the microcomputer 80 is set up for automatic reload after forty-five microseconds. The aforementioned Intel document fully discloses how an internal timer in the microcomputer 80 may be thus set up. At 368, the microcomputer 80 begins to search for a character received from the host computer 12. At 369, a check is made to see if a character from the host computer 12 is available. If a character is not available at 369, the program returns to 368 to continue searching for a character. If a character is available at 369, the program goes to 370 to see if the character from the host computer is a valid sync/poll character. If at 370, a valid sync/poll character is not found, the program returns to 368 to continue searching for a valid character from the host computer 12. If the character at 370 is a valid sync/poll character, the program goes to 371 where the sync/poll character is saved and the time base is started for time slot 0. It will be understood that all of the terminal elements for all of the users 14 set their time base at zero on the receipt of a valid sync/poll character, and thus all terminal elements 22 are independently operating on the same time base.

A plurality of receive macros 372-387 are provided for time slots 0 through 15 for the receipt of character data from the host computer 12. A check, to be discussed, is provided in each of the macros 372-386 such that the present user can select its character data in its designated time slot, as previously described.

At 388, the timer flag is cleared such that time slot 16 may be started. At 389, the low nibble of the sync/poll character is checked to see if it is equal to the ID of the present user. If the ID is equal to the low nibble of the sync/poll character, the RS 485 driver is turned on at 390. A MYFRAME flag is set at 391 to indicate that the present frame is available by the present user 14 to transmit data to the host computer 12. A check is made at 392 to determine if keystroke data is available for sending to the host computer 12. If keystroke data is available, normal odd parity is prepared at 393. At 394, a keystroke flag (FO) is set for use in time slot 17. At 395, a check is made for the timer flag to determine if time slot 17 has started. If at check 391, keystroke data is not available for sending to the host computer 12, the program goes to the timer flag check at 395 to wait for time slot 17. Also at the check 389, if the low nibble of the sync/poll character is not equal to the ID of the present user, the program goes directly to the timer flag check 395 (off page connector K) to wait for time slot 17.

When the timer flag is found at 395, the program goes to 396 wherein the timer flag is cleared. At 397, a check is made of the keystroke flag FO (see 394) to determine if keystroke data is available. If keystroke data is available, the program goes to 398 to transmit the keystroke data to the controller 20 of the host computer 12, as previously described.

At 399 a check is made to determine if a break LFC character is to be sent in time slot 18. If a break character is to be sent, the program goes to 400 to prepare for time slot 18. In block 400, a TS18 flag is set, a break character 55(H) is placed in the flow buffer and odd parity is set up. It will be noted that a break has priority over other LFC flow characters. The program then goes to timer flag check 401 to wait for time slot 18. If the check at 399 determines that there is no break, the program goes to a check at 402 (off page connector N) where a check of the MYFRAME flag is made.

If the present frame is MYFRAME, the program goes to 403 to determine if the LFC flag has previously been set. If the LFC flag has been set, a check is made at 404 to determine if the HRQ contents is less than eight. If it is, the program goes to 405 to prepare to send an LFC-ON character in time slot 18. In block 405, the TS18 flag is set, an LFC-ON character 66(H) is loaded in the flow buffer, odd parity is set up, and the LFC flag is cleared. The program then goes to a time flag check at 406 to wait for time slot 18. If the check at 404 is no, the program goes directly to check 406.

If the LFC flag is not set at 403, the program goes to 407 to check if the contents of the HRQ is thirty-two or more. If the contents is less than thirty-two, the program goes to 406 to wait for time slot 18. If the contents is thirty-two or greater, the program goes to 408 to prepare to send an LFC-OFF in time slot 18. In 408, the TS18 flag is set, an LFC-OFF AA(H) character is loaded into the flow buffer, odd parity is set up, and the LFC flag is set. The program then goes to 406 to wait for time slot 18. If the check at 402 determines that this is not MYFRAME, the program goes directly to 406 to wait for time slot 18.

At 409, which is the next instruction after either time check 401 or 406, the timer flag is cleared. A check is made at 410 to determine if this is MYFRAME to transmit data to the host computer 12 (see 391). At 411 a check is made to determine if the TS18 flag has been set (see 400, 405 and 408). If the TS18 flag is set, the contents of the flow buffer (see 400, 405 and 408) is transmitted to the host computer 12 at 412, and the TS18 flag is cleared at 414. The MYFRAME flag is cleared at 414. It will be noted that if the MYFRAME check at 410 or the TS18 flag at 411 are no, the program goes to 414. A timer check is made at 415 to wait for time slot 19.

At the beginning of time slot 19, the timer flag is cleared at 416, and the RS 485 driver is turned off at 417. A check is made at 418 to determine if any data is available from the terminal UART 100 (see FIG. 5). If data is available, the character is fetched and saved in the keystroke buffer at 419, and the keystroke flag is set.

The program then goes to a check at 420 to determine which protocol is used for data transfer between the terminal element 22 and the terminal 345. If the X-OFF protocol is used, a check is made at 421 to check for an X-OFF character. If an X-OFF is present, a device flow flag is set at 422. A check is made at 423 to check for an X-ON character. If an X-ON is present, the device flow flag is cleared at 424. If X-OFF protocol is not used at 420, a check is made at 425 to determine if DTR protocol is used. If DTR protocol is used, a check for DTR=1 is made at 426. If the DTR is equal to one, the device flow flag is cleared at 424, and if the DTR is not equal to one, the device flow flag is set at 422. If the check at 425 is no, the device flow flag 424 is cleared.

The output of blocks 422, 424 and the no branch of the check at 423, all go to block 427. In block 427, the CTS signal to the terminal is serviced. This involves activating the CTS signal if the keystroke buffer is empty, or deactivating the CTS signal if the keystroke buffer is not empty. At 428, the device flow flag is checked. If the device flow flag is not set, a check is made at 429 to determine if the HRQ contains data to be sent to the terminal 345. If there is data in the HRQ, the transmit UART 100 of FIG. 5 is checked at 430. If the UART 100 is not busy, the next character in the HRQ is transmitted to the terminal 345 at 431. The read pointer of the HRQ is also serviced in 431. If there is a device flow flag set (check 428) or no data in the HRQ (check 429) or the UART 100 is busy (check 430) or block 431 is completed, the program goes to timer check 432 to wait for time slot 20.

Figure 6D:
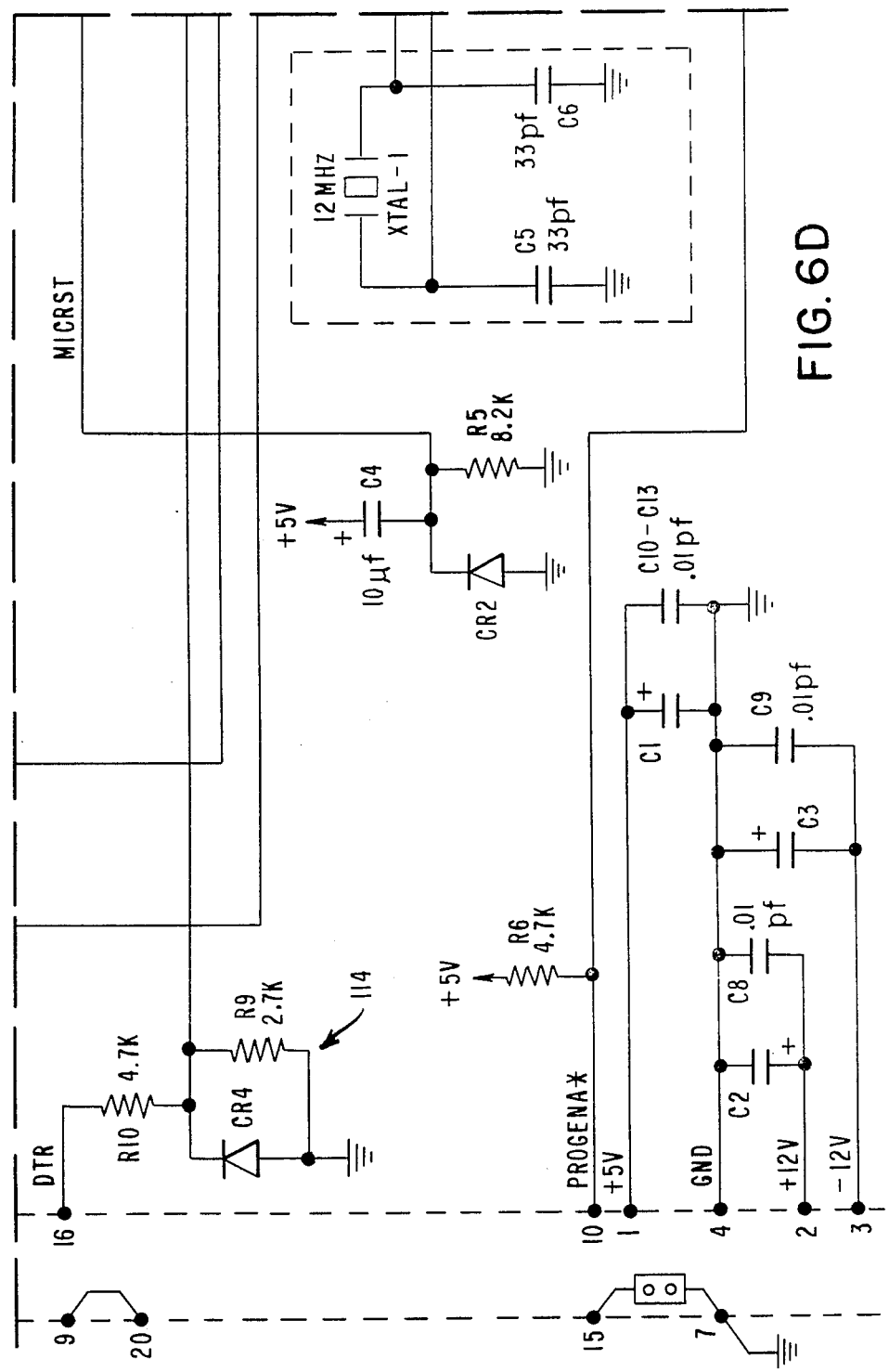
Figure 6E:
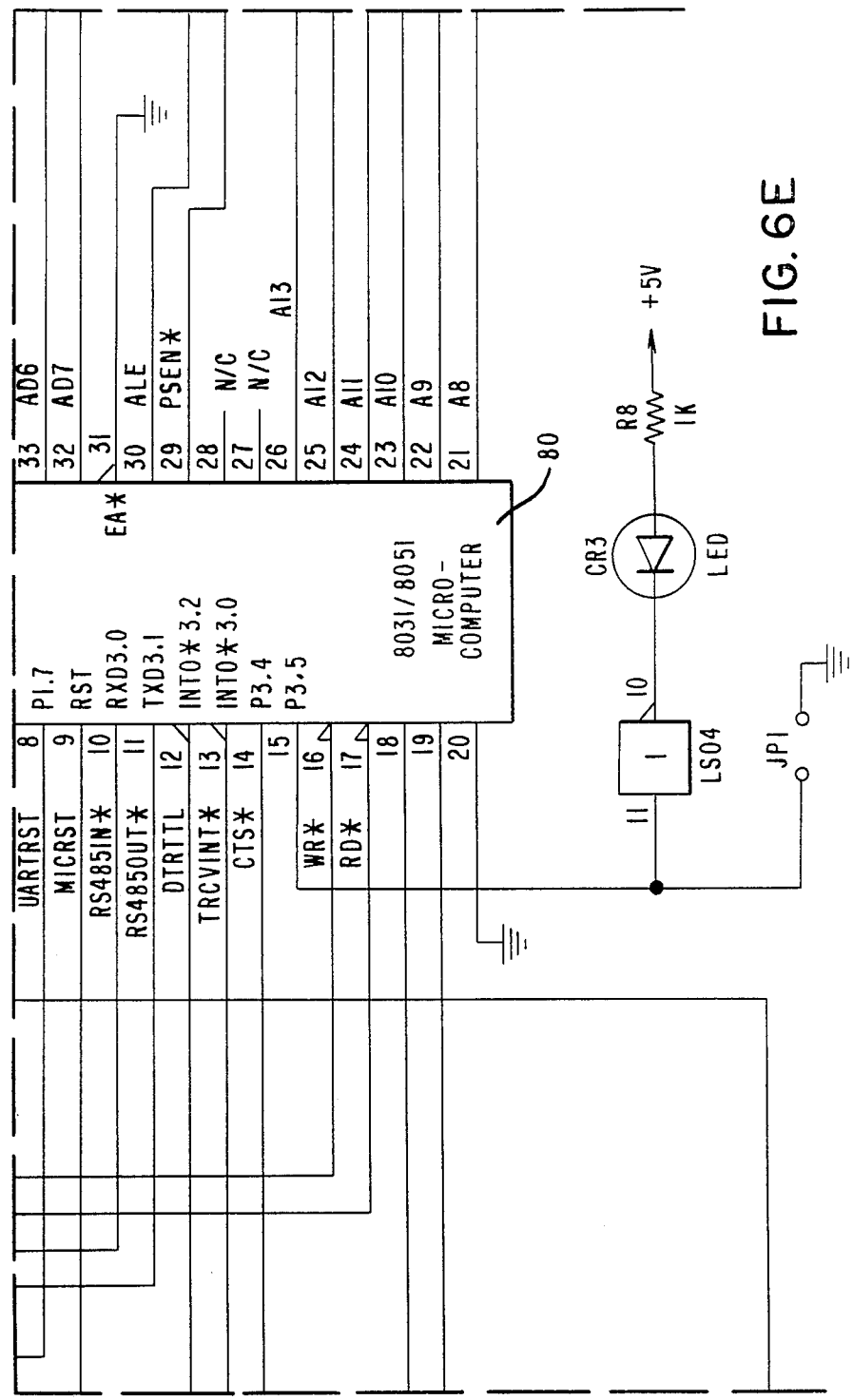
Figure 6F:
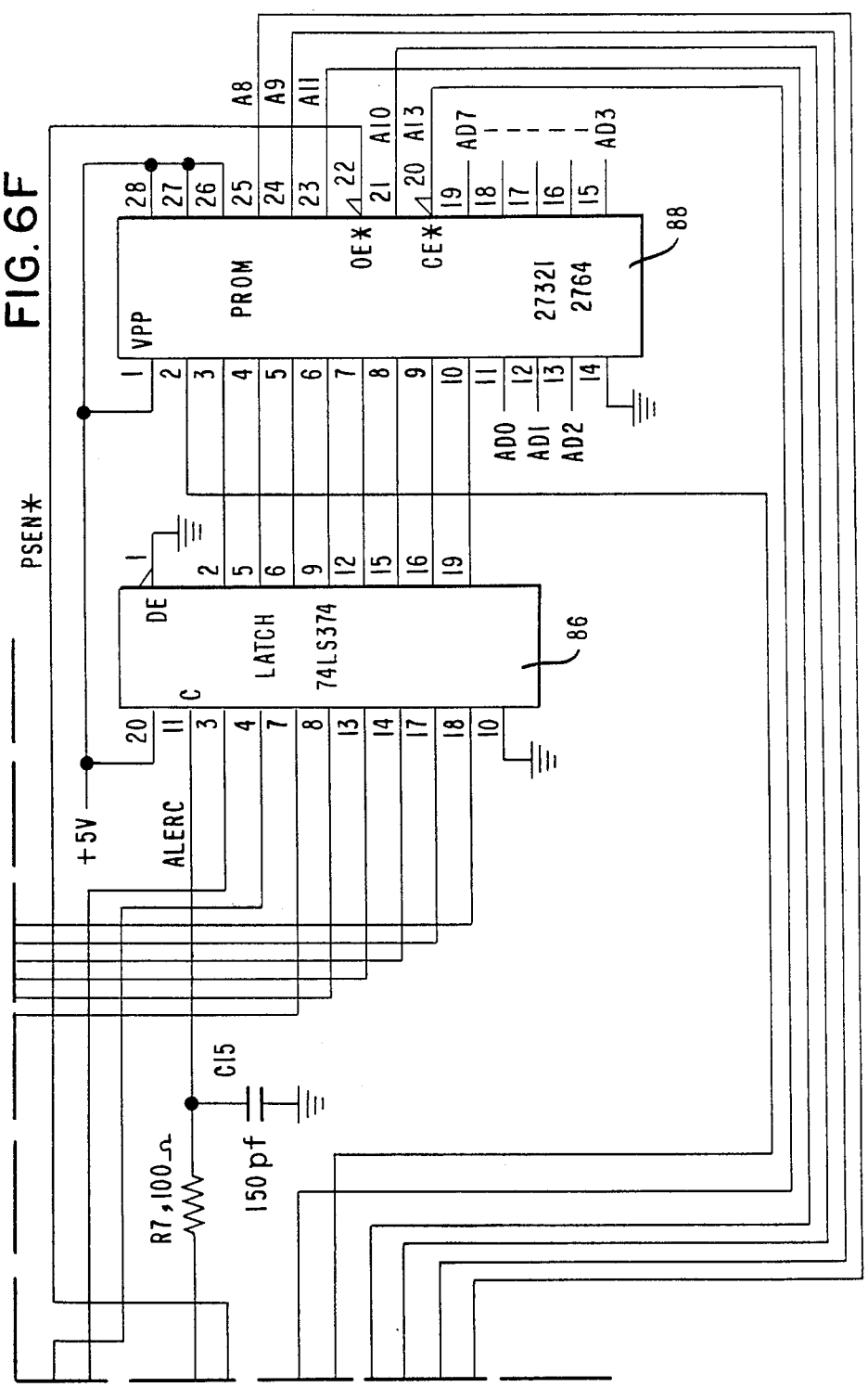

At the beginning of time slot 20, the timer flag is cleared at 433 and a check is made to see if the operator has activated a test switch input at 434. If the operator has activated a test switch input, the program goes back to start (see 350 of FIG. 17A). If the operator has not activated the test switch, the program goes to 435 wherein the LED CR3 of FIG. 6E is activated if the parity error flag is active.

At 436, a timer check is made to wait for time slot 21. At 437, the timer 99 of FIG. 5 is turned off, and the program jumps to re-entry 438 (see 439 at FIG. 17B).

Figure 17A:
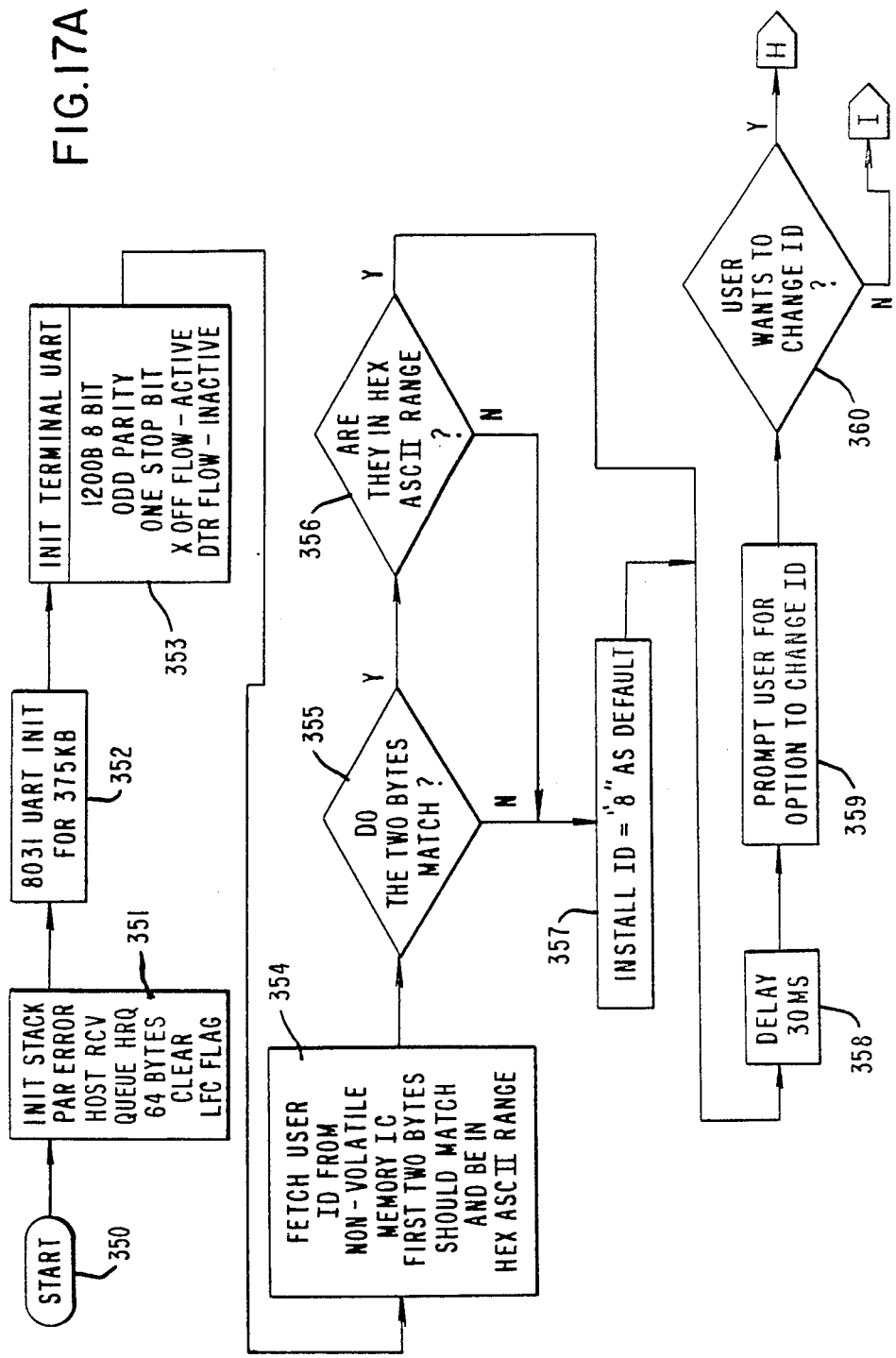
Figure 17B:
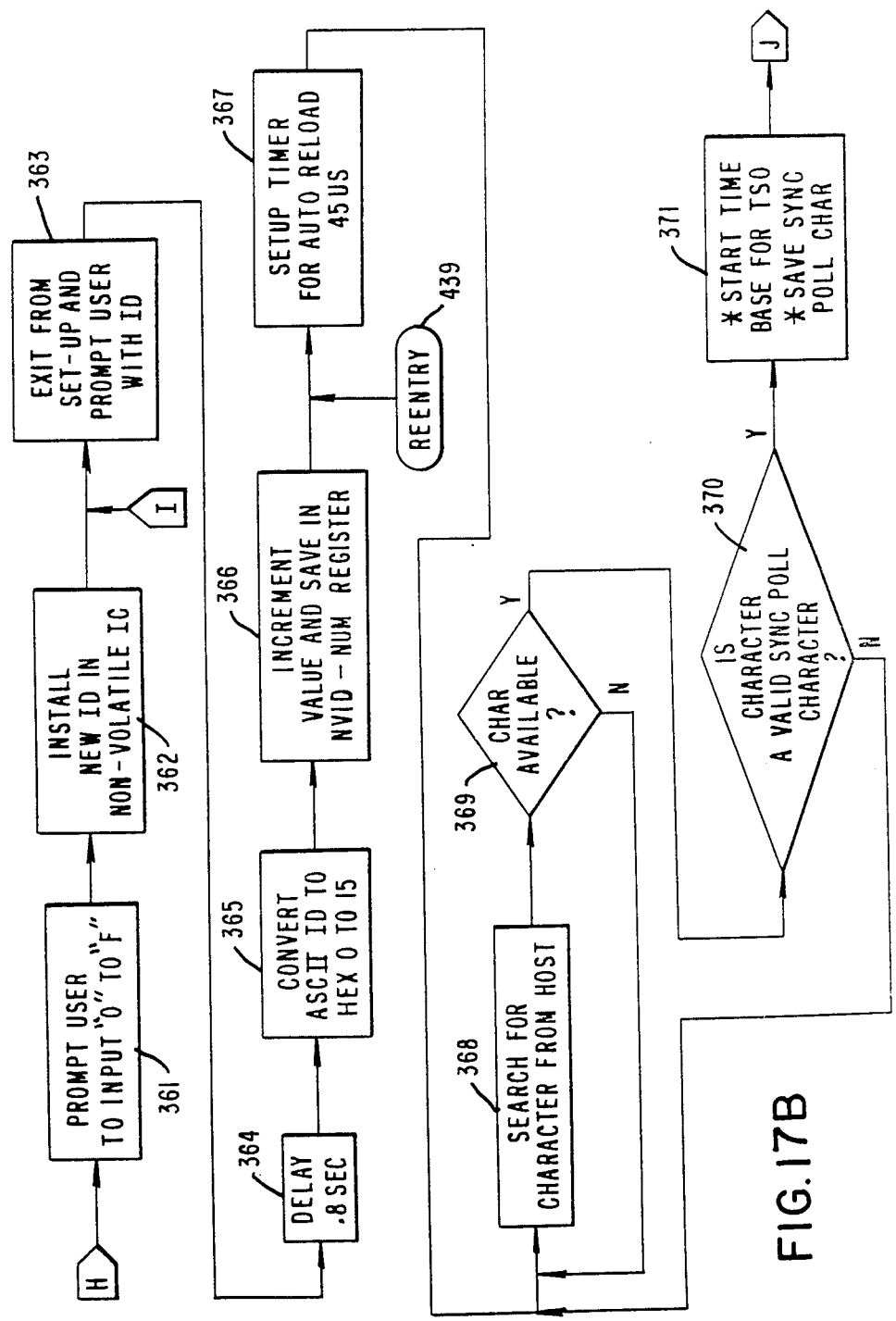
Figure 17C:
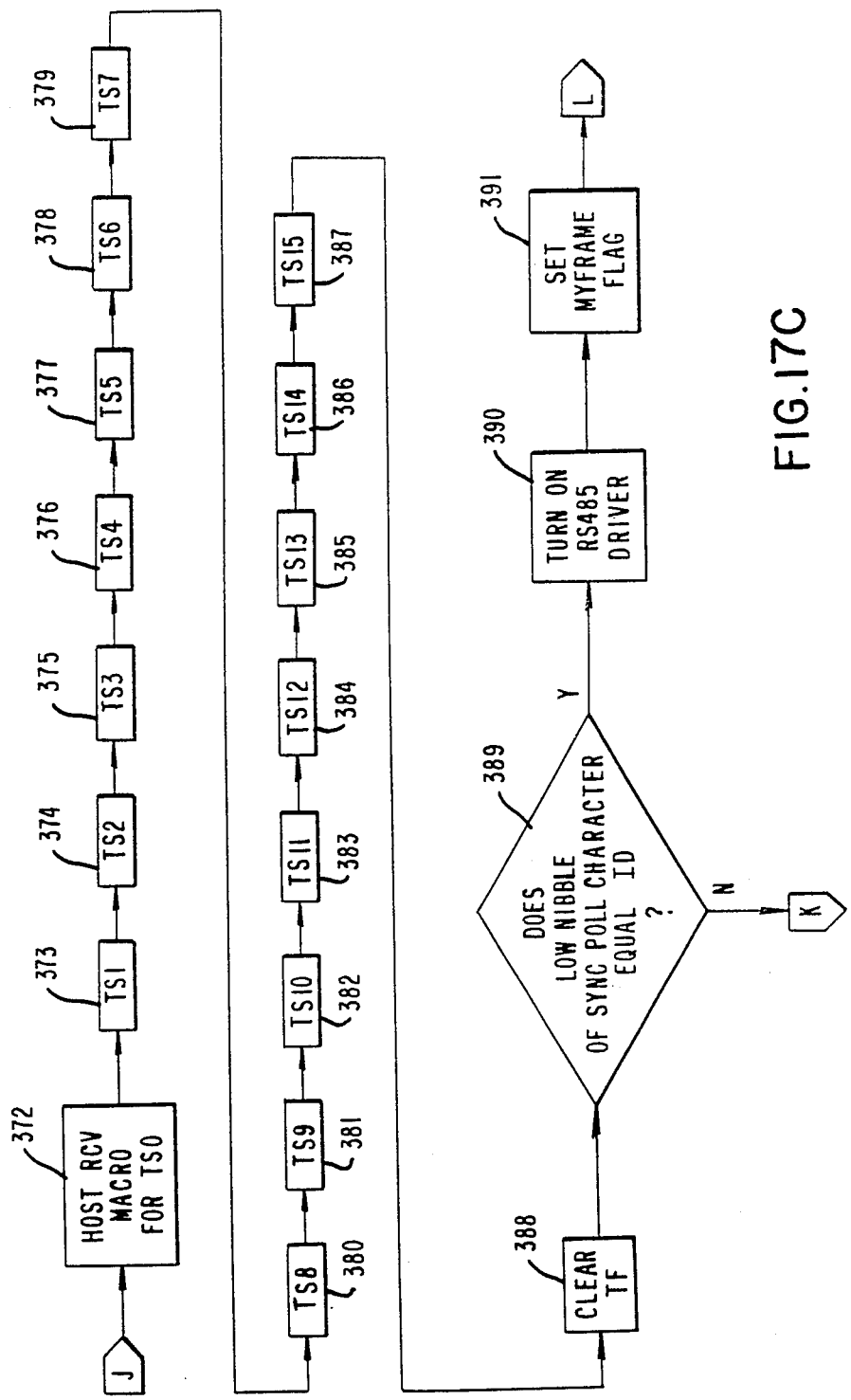
Figure 17D:
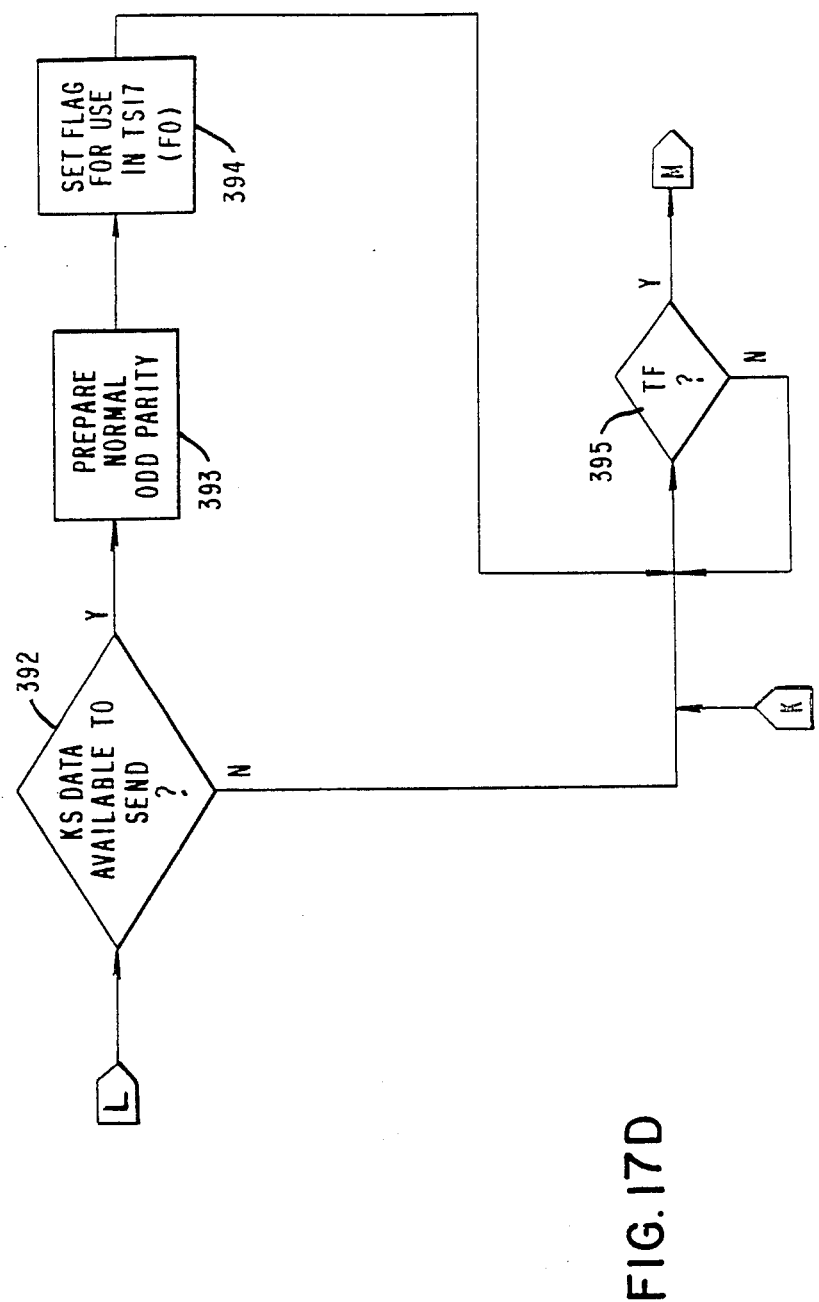
Figure 17F:
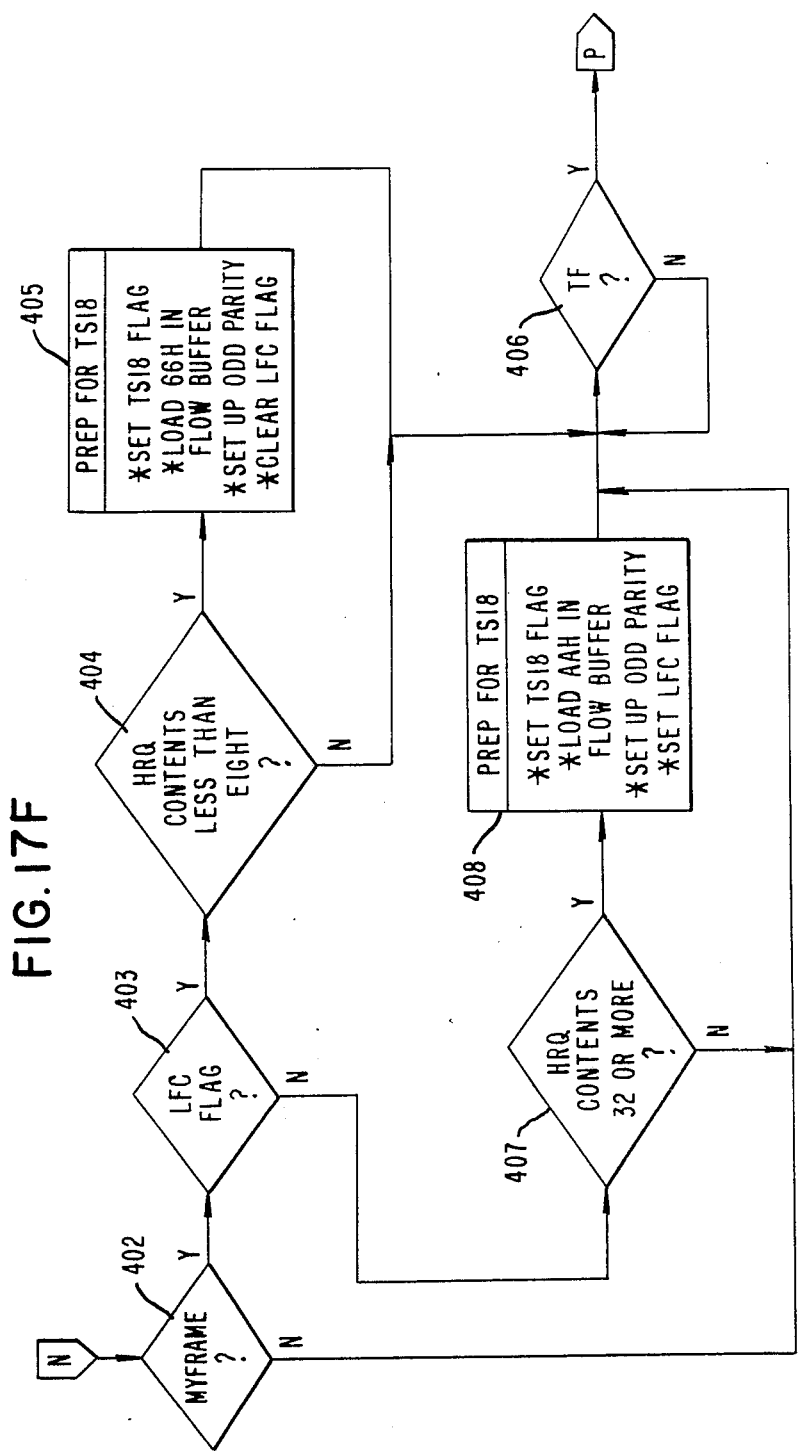
Figure 17G:
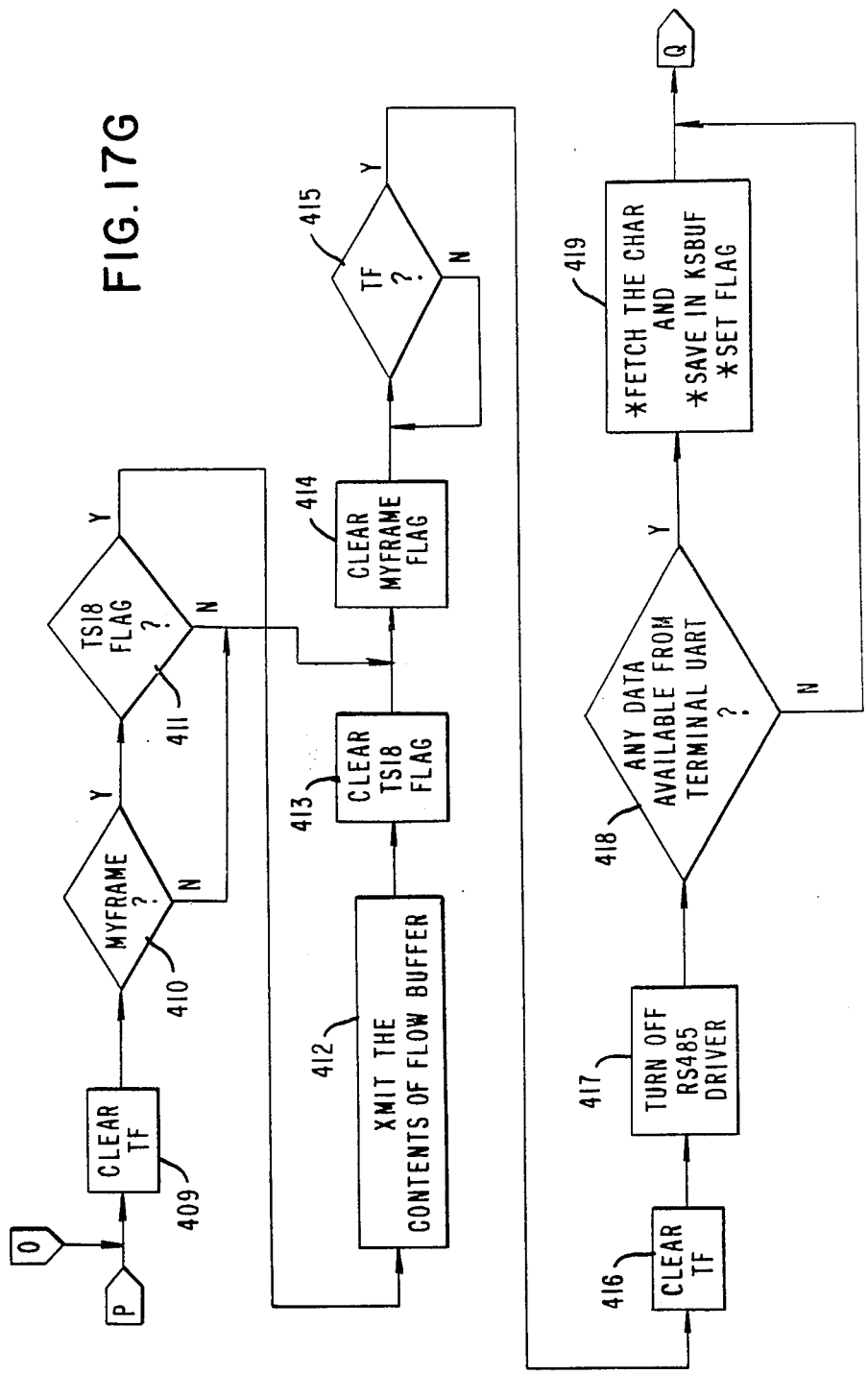
Figure 17I:
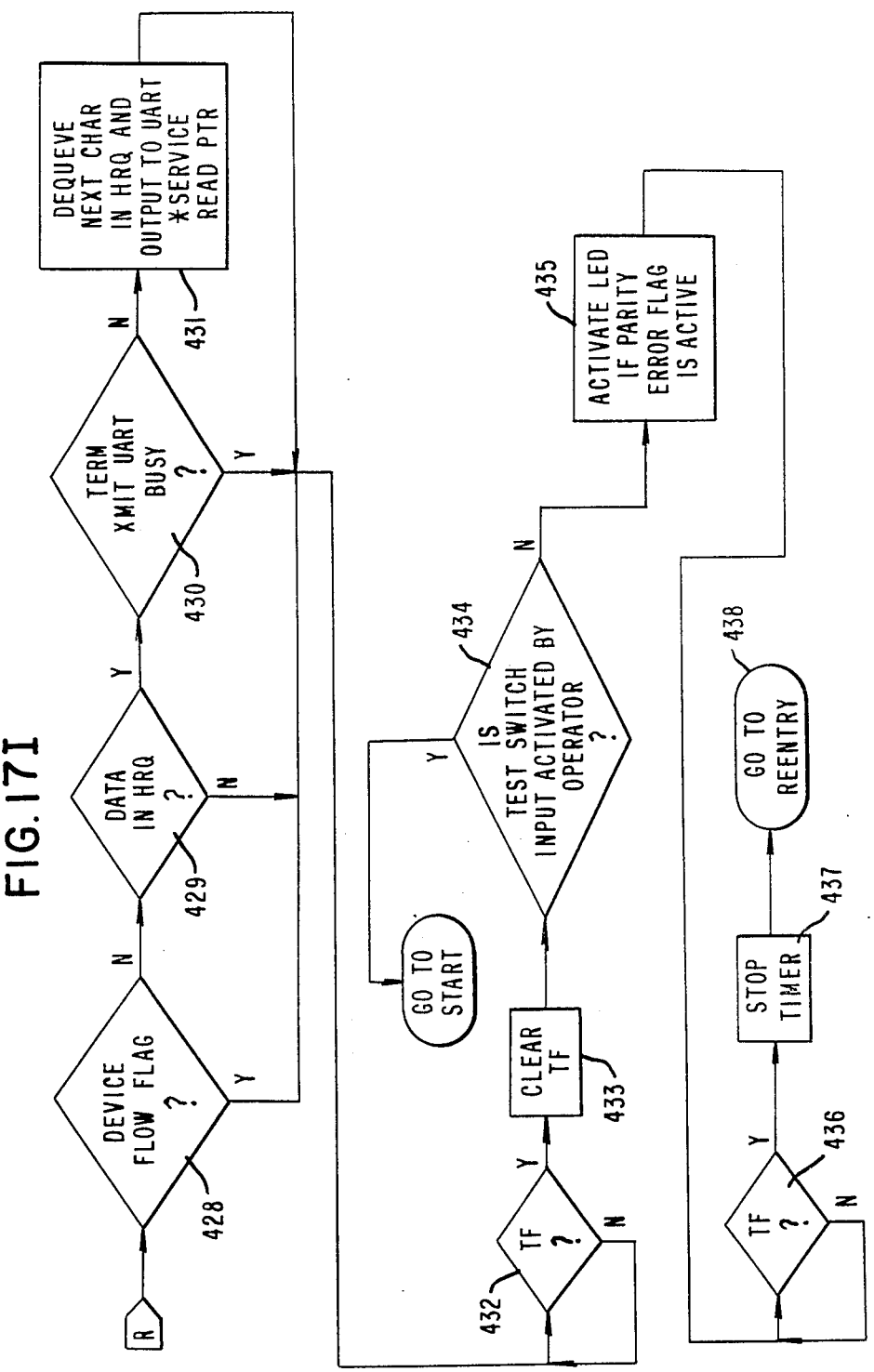
Figure 18B:
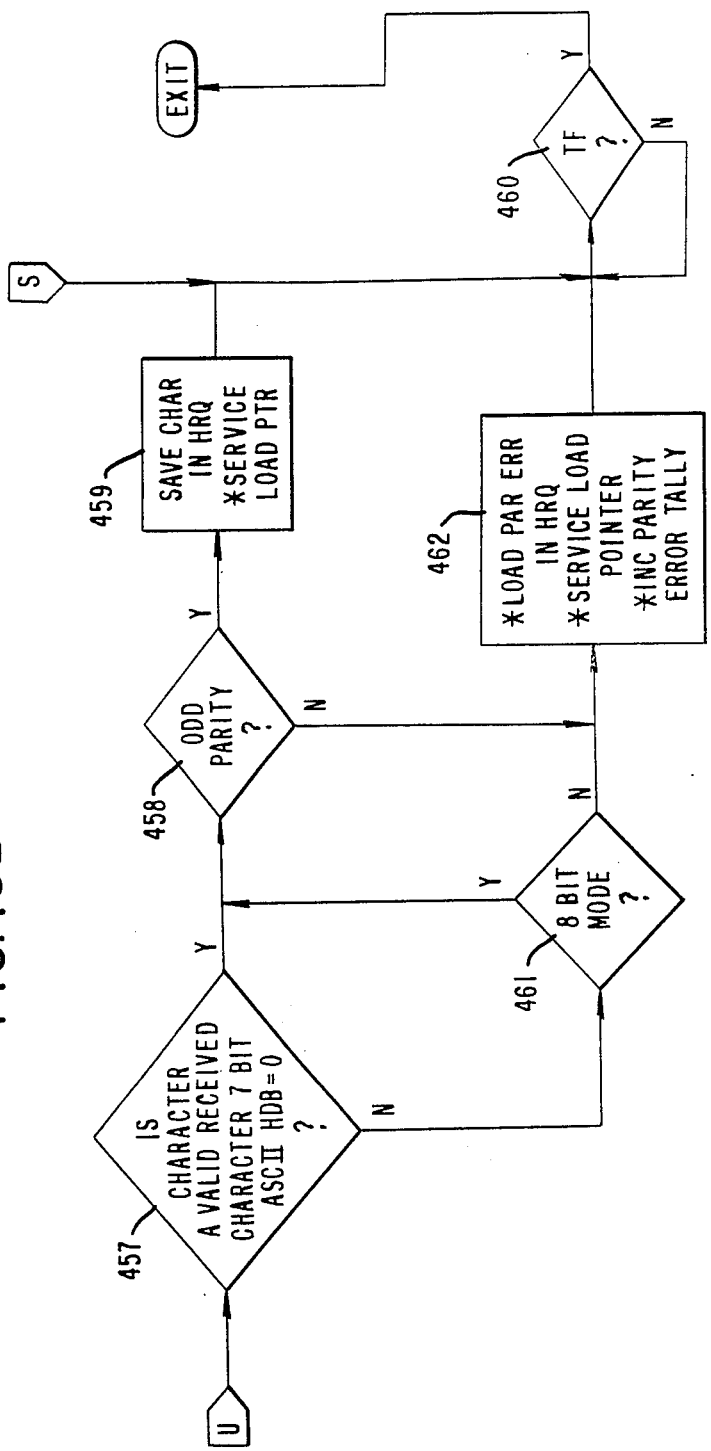

FIGS. 18A and 18B form a flow chart of the host receive macro described in connection with blocks 372–387 of FIG. 17C. At the beginning of the macro at 450 the timer flag is cleared. At 451, the time slot counter in the parameter NVID-NUM discussed in connection with block 366 is decremented. At 452, a check is made to determine if the decremented time slot counter is equal to zero. Blocks 451 and 452 are actually a decrement and jump statement. When the counter decremented in 451 reaches zero, the program recognizes that the present time slot is the time slot designated for the present user. If the check at 452 is yes, the program at 453 prepares to receive data from the host computer 12. In block 453, the RCV INTR signal is cleared and the internal UART 92 of the micro controller 80 of FIG. 5 is prepared to receive data from the host computer 12. At 454, a check is made to see if a character is available. If not, a check of the timer flag is made at 455 to see if the time slot has finished. If not, the program returns to the character available check at 454 waiting for the receipt of a character. If a character is received before the end of the time slot, the check at 454 is yes and the program continues to block 456 to fetch the character from the internal UART 92. The fetched character is checked at 457 to see if the character is a seven bit ASCII character and, if it is, if it is a valid received character by checking to see if the high order bit is zero, as previously described. If the received ASCII character is valid, a check is made at 458 to see if odd parity is present. If odd parity is present at 458, the character is saved in the HRQ at 459, and the load pointer of the HRQ is serviced. The program then goes to the timer flag check at 460 to wait for the end of the time slot. If the character is not valid at 457, a check is made at 461 to see if the system is in an eight bit mode wherein an eight bit ANSI format is used. If the system is in an eight bit mode, the program goes to the odd parity check at 458, and continues as discussed. If the check at 461 is no, or if odd parity is not present at 458, the program goes to 462 wherein the parity error is loaded into the HRQ, the load pointer of the HRQ is serviced, and the parity error value is increased to indicate that a parity error has been detected. After 462, the program goes to the timer flag check at 460. It will be seen that if the present macro is not in the assigned time slot, the check at 452 will transfer directly to the timer flag check at 460 to wait for the end of the time slot. When the time slot ends as determined by the check at 460, the macro exits to go the next macro, or if a total of sixteen macros has been executed, to go to the beginning of time slot 16 (see block 388, FIG. 17C), as previously described.

An alternate implementation to the described approach for communication of BREAK, LFC-OFF and LF-CON to the host in time slot 18 is as follows:

(a) the BREAK event is communicated as data bit zero (DB0) active in the transmitted byte;
(b) LFC-OFF is communicated as DB1 active; and
(c) LFC-ON is indicated by DB2 active.

This approach permits the BREAK event and an LFC event to be communicated to the host in a single byte. Bit DB3 through DB7 are available for other link related functions such as:

(a) reporting parity error status to the host;
(b) reporting acknowledge to the host of a command; and
(c) reporting diagnostic results.

Thus, a system has been described which provides the aforementioned objects. It will be understood by those skilled in the art that the disclosed embodiment is exemplary only, and that the various elements disclosed may be replaced by equivalents without departing from the invention hereof, which equivalents are covered by the appended claims.

What is claimed is:

1. In a communication network having a host computer and a plurality of users, wherein characters of data are sent from said host computer to said users in designated time slots in a time frame and a keystroke is sent from a designated one of said users to said host computer in a designated time slot in said time frame, said communications network comprising:

data bus means connected between said host computer and said users, said data bus means for transmitting data between said host computer and said users;

host receive queue means in at least one of said users connected to said data bus means for receiving and storing characters of data from said host computer in a succession of time frames;

first threshold means responsive to the characters of data in said host receive queue means for generating a first link flow control command responsive to the storage of a set number of characters of data in said host receive queue means;

link flow control transmitting means connected to said data bus means for transmitting said first link flow control command over said data bus means to said host computer in a designated time slot of a designated time frame; and storage means connected to said data bus means in said host computer for storing said first link flow control command for processing by said host computer such that said host computer may detect said first link flow control command and stop sending characters of data to said host receiver queue means responsive thereto.

2. The communications network of claim 1 wherein said host computer comprises:

polling means for polling said users with an identification character, said identification character identifying which one of said users may return said first link flow control command in its time slot in the current time frame; and identification storing means in said host computer for storing in said storage means said identification character with said first link flow control command such that said host computer may identify the user who sent said first link flow control command.

3. The communications network of claim 2 further comprising:

output means connected to said host receive queue for removing characters of data from said host receive queue to be outputted by said user;

second threshold means responsive to the characters of data in said host receive queue for generating a second link flow control command responsive to the reduction of characters of data stored in said host receive queue below a set number; and wherein said link flow control transmitting means transmits said second link flow control command and said storage means stores said second link flow control command for processing by said host computer such that said host computer may detect said second link flow control command and resume sending characters of data to said host receiver queue means responsive thereto.

4. The communications network of claim 3 wherein said link flow control transmitting means includes first formatting means for formatting said first and second link flow control command in a first format for transmission over said data bus means.

5. The communications network of claim 4 wherein said storage means includes second formatting means for formatting said first and second link flow control commands received by said storage means in a second format for storing in said storage means.

6. A terminal device for use in a communications network wherein characters are sent from a host to a plurality of users over a data bus in designated time slots in a time frame, and keystrokes are sent from a single designated user to the host in a designated time slot in said time frame, said terminal device comprising:

input means for connection to said data bus for receiving data from the data bus;

timer means for timing time slots in a time frame;

sync/poll character decoding means connected to said input means and said timer means, said sync/poll character decoding means starting said timer means upon the receipt of a sync/poll character and for decoding said sync/poll character to determine an identification embedded therein;

host receive queue means connected to said input means for storing characters received from the data bus in a designated time slot;

output means connected to said host receive queue means for outputting characters stored in said host receive queue means to a user;

first threshold means responsive to the number of characters stored in said host receive queue means, said first threshold means for generating an LFC-OFF command when the characters stored in said host receive queue means increases above a first specified number; and link flow control transmitting means having an output for connection to said data bus and an input connected to said sync/poll character decoding means, said first threshold means and said timer means, said link flow control transmitting means for transmitting said generated LFC-OFF command to said data bus in a specified time slot when the embedded identification decoded by said sync/poll character means matches a specified identification corresponding to the terminal device.

7. The terminal device of claim 6 further comprising:

second threshold means responsive to the number of characters stored in said host receive queue means, said second threshold means for generating an LFC-ON command when the characters stored in said host receive queue means decreases below a second specified number; and said link flow control transmitting means is further connected to said second threshold means for transmitting said generated LFC-ON command to said data bus in said specified time slot when the embedded identification decoded by said sync/poll character means matches the specified identification corresponding to the terminal device.

8. The terminal device of claim 7 wherein said host receive queue stores a maximum of about sixty-four characters, said first threshold means generates an LFO-OFF command when the characters stored in said host receive queue means increases above about thirty-two characters, and said second threshold means generates an LFO-ON command when the characters stored in said host receive queue decrease below about eight characters.

* * * * *